(12) United States Patent
Ohto

(10) Patent No.: US 7,116,341 B2
(45) Date of Patent: Oct. 3, 2006

(54) INFORMATION PRESENTATION APPARATUS AND METHOD IN THREE-DIMENSIONAL VIRTUAL SPACE AND COMPUTER PROGRAM THEREFOR

(75) Inventor: Yasunori Ohto, Tokyo (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 10/419,961

(22) Filed: Apr. 22, 2003

(65) Prior Publication Data

US 2003/0218617 A1 Nov. 27, 2003

(30) Foreign Application Priority Data

Apr. 25, 2002 (JP) ............................. 2002-123500
Apr. 25, 2002 (JP) ............................. 2002-123511

(51) Int. Cl.
*G09G 5/00* (2006.01)

(52) U.S. Cl. ...................... 345/619; 345/419; 345/629; 345/949; 345/950; 345/951; 345/952; 345/953; 345/954; 345/955

(58) Field of Classification Search ................ 345/419, 345/629, 949, 950, 951, 952, 953, 954, 955, 345/956, 957, 958, 959, 960, 473, 619
See application file for complete search history.

(56) References Cited

U.S. PATENT DOCUMENTS

| 5,796,400 A | * | 8/1998 | Atkinson et al. | 345/420 |
| 6,331,861 B1 | * | 12/2001 | Gever et al. | 345/629 |
| 6,346,938 B1 | * | 2/2002 | Chan et al. | 345/419 |
| 2003/0080957 A1 | * | 5/2003 | Stewart et al. | 345/420 |

* cited by examiner

*Primary Examiner*—Kimbinh T. Nguyen
(74) *Attorney, Agent, or Firm*—Oblon, Spivak, McClelland, Maier & Neustadt, P.C.

(57) ABSTRACT

An information presentation apparatus creates a three-dimensional animation of a specific object in a three-dimensional virtual space on the basis of the human characteristic of paying more attention to a moving object. A user's attention can be drawn to a specific object, such as a destination building, in the virtual space displayed on the screen. Irrespective of whether the specific object is selected by the user or designated at the system side to which the user's attention is to be drawn, the user can easily detect the attention-drawing object.

10 Claims, 58 Drawing Sheets

FINAL SEPARATE CELL

INFORMATION PRESENTATION APPARATUS AND METHOD IN THREE-DIMENSIONAL VIRTUAL SPACE AND COMPUTER PROGRAM THEREFOR

CROSS-REFERENCE TO RELATED APPLICATIONS

The present application claims priority based on JP Application No. 2002-123500 and JP Application No. 2002-123511, the entire contents of which are incorporated herein by reference.

BACKGROUND OF THE INVENTION

1. Field of the Invention

The present invention relates to information presentation apparatuses and methods and computer programs therefor in three-dimensional virtual spaces, and more particularly relates to an information presentation apparatus and method and a computer program therefor in a three-dimensional virtual space including a plurality of architectural structures such as buildings and houses.

More particularly, the present invention relates to an information presentation apparatus and method and a computer program therefor for drawing a user's attention to a displayed object serving as a target in a three-dimensional virtual space, and more specifically relates to an information presentation apparatus and method and a computer program therefor for arousing a user's attention while preventing an architectural structure serving as a target from being hidden in many structure objects including buildings and houses.

2. Description of the Related Art

Due to an improvement in the operation speed and an enhancement of rendering function of current computer systems, research and development of so-called "computer graphics" (CG) technology that uses computer resources to create and process graphics and images have been intensively conducted. Furthermore, such computer graphics technology has been put into practice.

For example, three-dimensional graphics technology generates a more realistic three-dimensional-like two-dimensional high-definition color image by expressing, in terms of a mathematical model, an optical phenomenon that is observed when a three-dimensional object is irradiated with light by a predetermined light source and, on the basis of the mathematical model, shading the surface of the object or pasting a pattern onto the surface of the object. Computer graphics has been increasingly used in CAD (Computer-Aided Design) and CAM (Computer-Aided Manufacturing), which are fields of application of science, engineering, and manufacturing, and in various other fields under development.

Nowadays, computer graphics has been applied to create a three-dimensional virtual space or an augmented reality space. For example, conversations among many logged-in users in a virtual society developed in a three-dimensional virtual space enable the users to have a more realistic, exciting virtual experience. In navigation systems and the like, a stereographic, three-dimensional map image is displayed, taking into consideration the relief of the ground, landscape, and buildings on the ground. As a result, high-quality map information display services are offered. Such three-dimensional map information may be applied to public services such as flood control simulation or systems using virtual spaces.

In navigation systems, more faithful representations of architectural structures such as buildings and houses on the ground in a three-dimensional virtual space are highly demanded. In a three-dimensional virtual space that realizes a society shared with other users, disposition of architectural structure varieties enhances the impact of a more realistic virtual experience.

On the other hand, detection of a target object from a three-dimensional image containing many displayed objects such as buildings is difficult or complicated.

For example, in a navigation system, when a building serving as a destination is behind an architectural structure or is tangled with another displayed object, the effect of destination guidance is degraded.

When a displayed building that in fact requires a user's attention is hidden in other displayed objects in a common society, the user's attention is diverted. As a result, the user cannot have a satisfactory virtual experience.

SUMMARY OF THE INVENTION

Accordingly, it is an object of the present invention to provide an excellent information presentation apparatus and method and a computer program therefor for offering suitable information presentation services in a three-dimensional virtual space including a plurality of architectural structures such as buildings and houses.

It is another object of the present invention to provide an excellent information presentation apparatus and method and a computer program therefor for suitably drawing a user's attention to a displayed object serving as a target in a three-dimensional virtual space.

It is a further object of the present invention to provide an excellent information presentation apparatus and method and a computer program therefor for arousing a user's attention while preventing an architectural structure serving as a target from being hidden in many architectural structure objects such as buildings and houses.

It is yet another object of the present invention to provide an excellent information presentation apparatus and method and a computer program therefor for efficiently generating, when creating a three-dimensional virtual space, a stereographic, three-dimensional map image by taking into consideration the relief of the ground, landscape, and buildings on the ground.

In order to achieve the foregoing objects, according to a first aspect of the present invention, an information presentation apparatus or method in a three-dimensional virtual space is provided including an object selecting unit or step of specifying an object to be displayed in the three-dimensional virtual space; an animation creating unit or step of creating a deformed animation of the object shape; and an animation playing unit or step of playing the animation of the object shape in the three-dimensional virtual space.

The information presentation apparatus or method according to the first aspect of the present invention utilizes the human characteristic of paying more attention to a moving object. Creating a three-dimensional animation of a specific three-dimensional object in the virtual space arouses the user's attention.

Specifically, the user's attention is drawn to a specific object, such as a destination building, in the three-dimensional virtual space displayed on a screen. Irrespective of whether the specific object is selected by the user or designated at the system side to which the user's attention is to be drawn, the user can easily detect the attention-drawing object.

The object selecting unit or step may select and obtain the object on the basis of an information search result in accordance with a search condition input by a user.

The animation creating unit or step may create a control solid defined by many control points that are arranged in a lattice structure around the object shape and may create the deformed animation in a relatively easy manner by mapping a deformation of the control solid onto a deformation of the object shape.

The animation creating unit or step may create an animation of the object appearing from the ground upward in the three-dimensional virtual space, an animation of the object vertically expanding and contracting, an animation of the object swaying from side to side, or an animation of the object disappearing into the ground in the three-dimensional virtual space.

The word "object" refers to the shape of an architectural structure such as a building or a house and has a location such as a lot number at which the object is disposed in the three-dimensional space. The animation playing step or unit may play the deformed animation at a corresponding place in the three-dimensional virtual space on the basis of map data.

The animation creating unit or step may create a plurality of patterns of deformed animations of the object shape. The animation playing unit or step may switch from one deformed animation being played to another in accordance with the object selection result.

For example, when many objects are obtained by information search, animations of all objects that have satisfied the search condition are generated and played so that the objects appear in the three-dimensional virtual space, and, subsequently, a deformed animation for emphasized display, such as that swaying from side to side or that vertically expanding and contracting, of an object with a high presentation intensity level is played. Alternatively, an animation of an object with a low presentation intensity level, disappearing from the three-dimensional virtual space, is played.

According to a second aspect of the present invention, a computer program written in a computer-readable format to perform on a computer system a process for presenting information in a three-dimensional virtual space is provided. The computer program includes an object selecting step of specifying an object to be displayed in the three-dimensional virtual space; an animation creating step of creating a deformed animation of the object shape; and an animation playing step of playing the deformed animation of the object shape in the three-dimensional virtual space.

The computer program according to the second aspect of the present invention defines a computer program written in a computer-readable format to realize a predetermined process on a computer system. In other words, installing the computer program according to the second aspect of the present invention into a computer system exhibits a cooperative operation on the computer system, thereby achieving advantages similar to those of the information presentation apparatus or method according to the first aspect of the present invention.

According to a third aspect of the present invention, a three-dimensional model generating system or method is provided that generates a building model on the basis of elevation data generated by mapping altitude information onto each observation point on a two-dimensional plane. The system or method includes a cell generating unit or step of dividing an observation area in which observation points reside on the two-dimensional plane into a mesh of separate cells and registering a set of observation points that have been fitted to a plane in each of the separate cells; a plane integration unit or step of integrating adjacent cells into a plane; a boundary line extracting unit or step of extracting a boundary line of each integrated plane; and a three-dimensional plane creating unit or step of creating a three-dimensional plane defined by a set of ridges included in the boundary between adjacent planes.

According to the three-dimensional model generating system or method as set forth in the third aspect of the present invention, an observation area is divided into rectangular cells. Subsequently, when adjacent cells can be fitted to a single plane, the adjacent cells are integrated into a plane. As a result, a set of planes is obtained. Each plane's boundary line is extracted as a polyline with a small number of bends. A vertical face is inserted at the boundary between adjacent planes. Accordingly, a building made of three-dimensional polygons is generated.

When generating a building model based on elevation data that is generated by mapping altitude information onto each observation point on the two-dimensional plane, no building map is necessary. Also, observation positions may be unevenly distributed.

Specifically, according to the three-dimensional model generating system or method as set forth in the third aspect of the present invention, a three-dimensional model of a building on the ground is generated only on the basis of altitude information distributed on the plane, which is obtained by irradiating the ground with laser light from space using an airplane or a satellite.

The elevation data obtained by irradiating the ground with laser light from space using an airplane or the like has no regularly distributed observation points. The cell generating unit or step may normalize the position of each observation point from the measurement coordinate system to the processing coordinate system and then divides the observation area into a mesh.

The cell generating unit or step may divide the observation area into a mesh of smallest cells constructing initial planes. Since the observation points are not distributed regularly, the smallest cell in which no observation point resides may be integrated with a surrounding cell that has the lowest average altitude. This is based on empirical rule that many of the cells containing no observation point are behind buildings when measurement is performed using laser, and it is thus considered most proper to integrate such a portion with a portion at the lowest elevation.

Alternatively, the cell generating unit or step need not divide the mesh into smallest cells. The cell generating unit or step may repeat dividing each observation area in which observation points reside into a mesh of cells until a set of observation points that can be fitted to a plane is obtained. Accordingly, as large a cell as possible may remain in the observation area that can be fitted to a plane.

The plane integration unit or step may estimate regression planes on the basis of altitude information at each observation point included in the adjacent cells. When a correlation coefficient exceeds a predetermined value, the plane integration unit or step may integrate the adjacent cells into a plane.

The plane integration unit or step may link vertices shared with a plane to be integrated with and create a new ridge structure of the integrated plane.

The boundary line extracting unit or step may try to fit each ridge to a straight line. The boundary line extracting unit or step may insert a bend into a ridge that cannot be fitted to a straight line and divide the ridge into at least two ridges.

The bend may be obtained at a position at which the ridge cannot be approximated as a single straight line.

For a looped ridge, a circle may be drawn around the center of gravity of vertices constructing the loop. The radius of the circle is reduced to shrink the scan field down to include some midpoints, which are then adopted as bends.

For a ridge that is not a loop and that has endpoints, a perpendicular bisector of the ridge may be drawn. The ridge may be scanned with an arc that has the center on the perpendicular bisector and that passes through the endpoints to extract a bend.

The three-dimensional plane creating unit or step may insert a vertical face in accordance with the altitude difference at a boundary line between two planes adjacent to each other across the boundary line.

When two planes adjacent to each other across a ridge share the ridge, no vertical face may be inserted at the ridge.

When two planes adjacent to each other across ridges share only one endpoint of each ridge, a vertical face defined by the shared endpoint and the remaining unshared endpoints may be inserted between the ridges.

When two planes adjacent to each other across ridges share no endpoint of the ridges, a vertical face defined by the endpoints of the ridges is inserted between the ridges.

According to a fourth aspect of the present invention, a computer program is provided, which is written in a computer-readable format to perform on a computer system a process for generating a building model based on elevation data that is generated by mapping altitude information onto each observation point on a two-dimensional plane. The computer program includes a cell generating step of dividing an observation area in which observation points reside on the two-dimensional plane into a mesh of separate cells and registering a set of observation points that have been fitted to a plane in each of the separate cells; a plane integration step of integrating adjacent cells into a plane; a boundary line extracting step of extracting a boundary line of each integrated plane; and a three-dimensional plane creating step of creating a three-dimensional plane defined by a set of ridges included in the boundary between adjacent planes.

The computer program according to the fourth aspect of the present invention defines a computer program written in a computer-readable format to realize a predetermined process on a computer system. In other words, installing the computer program according to the fourth aspect of the present invention into a computer system exhibits a cooperative operation on the computer system, thereby achieving advantages similar to those of the three-dimensional model generating system or method according to the third aspect of the present invention.

According to the present invention, an excellent information presentation apparatus and method and a computer program therefor are provided that offer suitable information presentation services in a three-dimensional virtual space including a plurality of architectural structures such as buildings and houses.

According to the present invention, an excellent information presentation apparatus and method and a computer program therefor are provided that suitably draw a user's attention to a displayed object serving as a target in a three-dimensional virtual space.

According to the present invention, an excellent information presentation apparatus and method and a computer program therefor are provided that arouse a user's attention while preventing an architectural structure serving as a target from being hidden in many architectural structure objects such as buildings and houses.

According to the present invention, on the basis of the human characteristic of paying more attention to a moving object, the user's attention is aroused by creating a three-dimensional animation of a specific three-dimensional object in the virtual space. In other words, the user's attention can be drawn to a specific object, such as a destination building, in the three-dimensional virtual space displayed on the screen. Irrespective of whether the specific object is selected by the user or designated at the system side to which the user's attention is to be drawn, the user can easily detect the attention-drawing object.

According to the present invention, an excellent three-dimensional model generating system and method and a computer program therefor are provided that suitably generate a three-dimensional model of a building on the ground on the basis of altitude information distributed on a plane, which is obtained by irradiating the ground with laser light from space using an airplane or a satellite.

According to the present invention, an excellent three-dimensional model generating system and method and a computer program therefor are provided that suitably generate a three-dimensional model that represents the outer appearance of a building having a three-dimensional shape on the basis of altitude information that is distributed unevenly on a two-dimensional plane.

According to the present invention, an excellent three-dimensional model generating system and method and a computer program therefor are provided that suitably generate a three-dimensional model of a building including a roof (top face) and an external wall (vertical face) on the basis of altitude information that is distributed unevenly on a two-dimensional plane.

According to the present invention, an excellent three-dimensional model generating system and method and a computer program therefor are provided that suitably generate a three-dimensional model of a building on the ground using only elevation data that is generated by mapping altitude information onto each observation point on the ground, without using additional information such as a building map.

According to the present invention, information can be obtained on the shape of the individual buildings serving as simply-connected polygon objects, each of which is constructed of planes, while reducing the effects of errors of a boundary line of each plane extracted on the basis of elevation data. In generation of a three-dimensional virtual space based on data obtained from the real world, more accurate building data can be generated.

Further objects, features, and advantages of the present invention will become apparent from the following description of the preferred embodiments with reference to the attached drawings.

DESCRIPTION OF THE PREFERRED EMBODIMENTS

With reference to the drawings, embodiments of the present invention will be described in detail.

Figure 1:
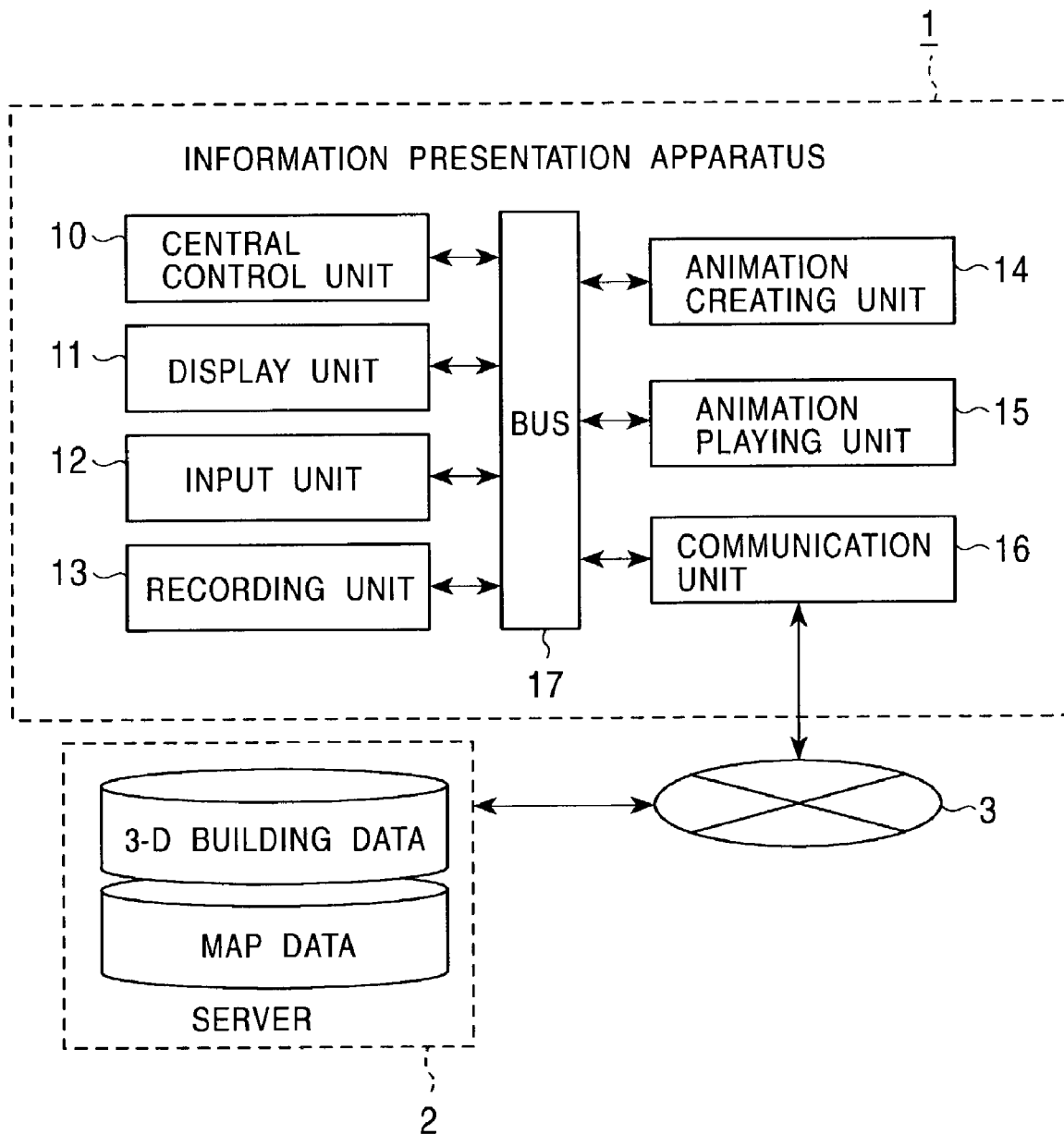
FIG. 1 is a schematic diagram of the functional configuration of an information presentation apparatus according to an embodiment of the present invention.

FIG. 1 schematically shows the functional configuration of an information presentation apparatus 1 according to an embodiment of the present invention. As shown in FIG. 1, the information presentation apparatus 1 includes a central control unit 10, a display unit 11, an input unit 12, a recording unit 13, an animation creating unit 14, an animation playing unit 15, and a communication unit 16. The component units are interconnected via a bus 17.

The central control unit 10 is a main controller of the information presentation apparatus 1 and includes, for example, a CPU (Central Processing Unit), a RAM (Random Access Memory), and a ROM (Read Only Memory). The central control unit 10 controls the overall operation of the information presentation apparatus 1 by executing a program under an execution environment that is provided by an operating system (OS). The program executed by the central control unit 10 includes, for example, a display application for displaying a three-dimensional virtual space such as a three-dimensional map image including buildings on the ground.

The display unit 11 and the input unit 12 provide a user interface of the information presentation apparatus 1. The display unit 11 includes a CRT (Cathode Ray Tube) display or an LCD (Liquid Crystal Display) and is used to display a three-dimensional virtual space, such as a three-dimensional map image including buildings on the ground, other input data, and data processing results. The input unit 12 includes input units such as a keyboard, a mouse, and a touch panel and accepts data and commands input by a user.

The recording unit 13 includes a high-capacity external storage unit, such as a hard disk drive, and is used to install therein a program to be executed by the central control unit 10 and to store other program files and data files. The program installed in the recording unit 13 includes a display application for displaying a three-dimensional virtual space, such as a three-dimensional map image including buildings on the ground. The data stored in the recording unit 13 includes geometric data on a displayed object used to generate an image displayed in the three-dimensional virtual space and other data required for rendering.

The communication unit 16 includes a network interface card (NIC) and connects to a wide-area computer network 3, such as the Internet, via a LAN (Local Area Network) and a public telephone network. On the computer network 3, various information providing services are offered using an information search system, such as a WWW (World Wide Web). For example, a server 2 that provides, free of charge or on payment, map data and three-dimensional building data required to display a three-dimensional virtual space, such as a three-dimensional map image including buildings on the ground, is configured on the computer network 3.

The three-dimensional virtual space displaying application, which is to be executed by the central control unit 10, provides high-quality navigation services by representing architectural structures including buildings and houses on the ground in the three-dimensional virtual space on the display screen of the display unit 11. If necessary, the map data and the three-dimensional building data required to display the three-dimensional virtual space is appropriately obtained via the communication unit 16 from the server 3.

Detection of a target object from a three-dimensional image in which many objects including buildings are displayed imposes a heavy burden on the user. In this embodiment, the human characteristic of paying more attention to a moving object is utilized, and the user's attention is aroused by creating a three-dimensional animation of a specific three-dimensional object in the virtual space.

Specifically, the user's attention can be drawn to a specific object, such as a destination building, in the three-dimensional virtual space displayed on the screen. Irrespective of whether the specific object is selected by the user or designated at the system side to which the user's attention is to be drawn, the user can easily detect the attention-drawing object.

The animation creating unit 14 and the animation playing unit 15 are each activated in response to an instruction from the central control unit 10. The animation creating unit 14 creates animation data on a displayed object, such as a building to which the user's attention is desired to be drawn. The created animation data is accumulated in, for example, the recording unit 13. The animation playing unit 15 plays the animation data, which is created by the animation creating unit 14, in the three-dimensional virtual space displayed on the screen. If necessary, the animation playing unit 15 may change the playing speed, that is, the speed at which the animation moves.

Figure 2:
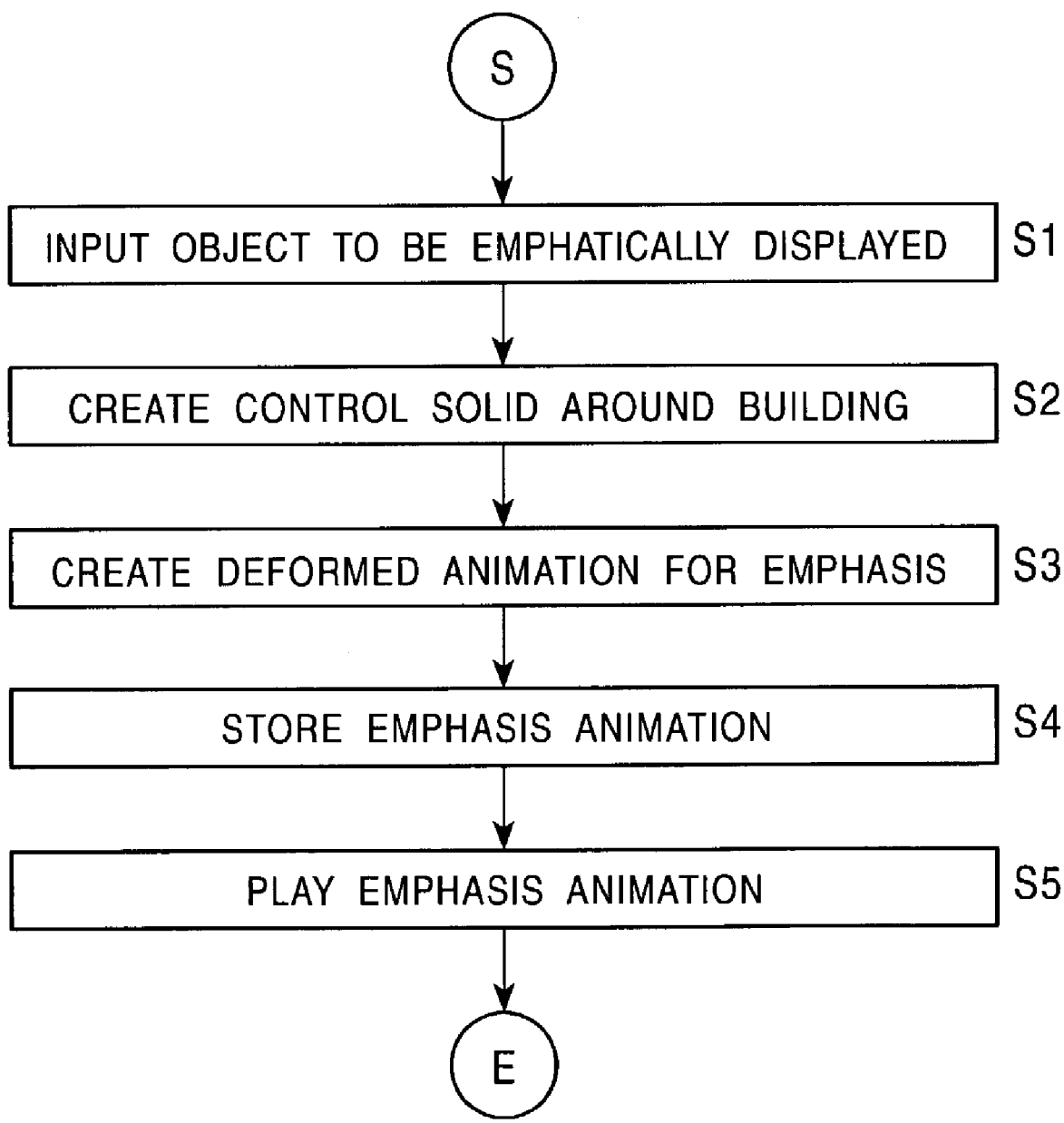
FIG. 2 is a flowchart showing a process of displaying an animation of an object to which a user's attention is desired to be drawn.

FIG. 2 is a flowchart showing a process of creating and displaying a deformed animation of an object to which the user's attention is desired to be drawn. Practically, the process is realized by executing a predetermined program by the central control unit 10.

The process obtains three-dimensional data on an object, such as a building to be emphatically displayed (step S1).

Figure 3:
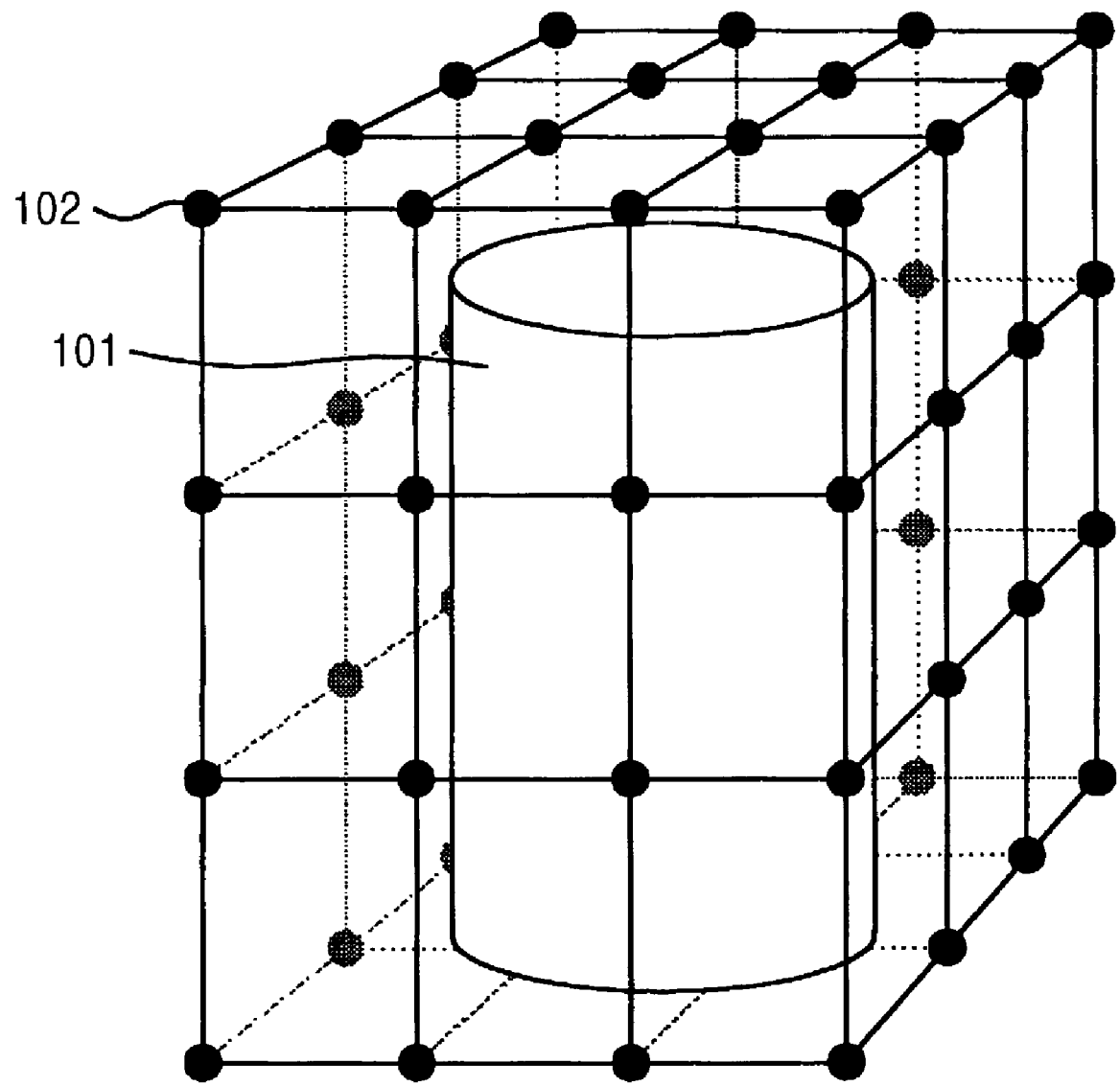
FIG. 3 is an illustration of a control solid created around a displayed object.

The process creates a control solid around the building (step S2). FIG. 3 shows a control solid 102 defined by control points arranged in a lattice. The control solid 102 is created around a displayed object 101. The interior of the lattice of the control solid 102 is defined as a three-directional parameter space, and a point in the interior is determined by a polynomial with three variables. Deformation of the control solid 102 refers to deformation of the parameter space itself. Free deformation is realized by mapping a deformation of the control solid 102 onto a deformation of the target shape.

Figure 4:
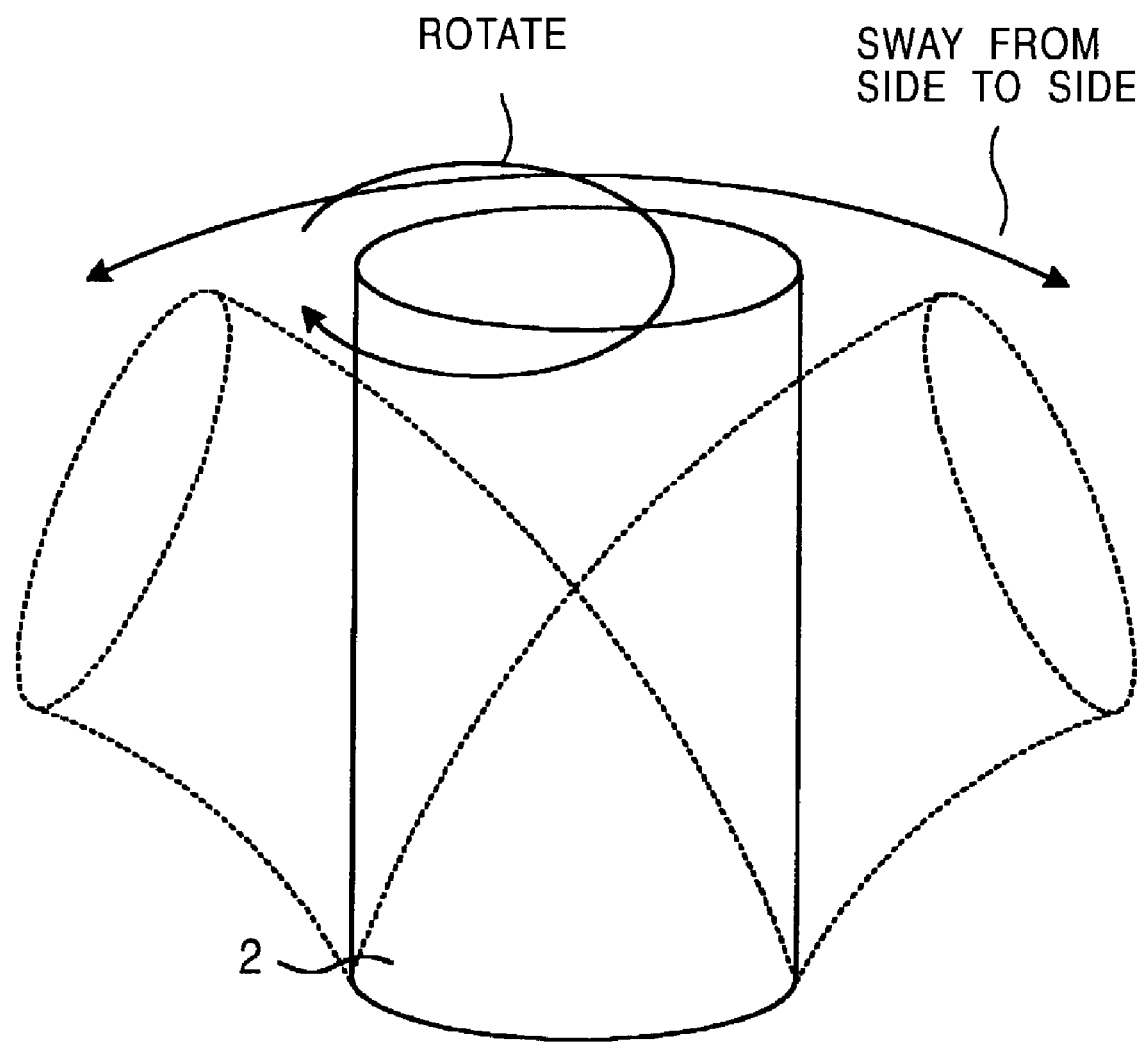
FIG. 4 is an illustration of an example of an object deforming method.
Figure 5:
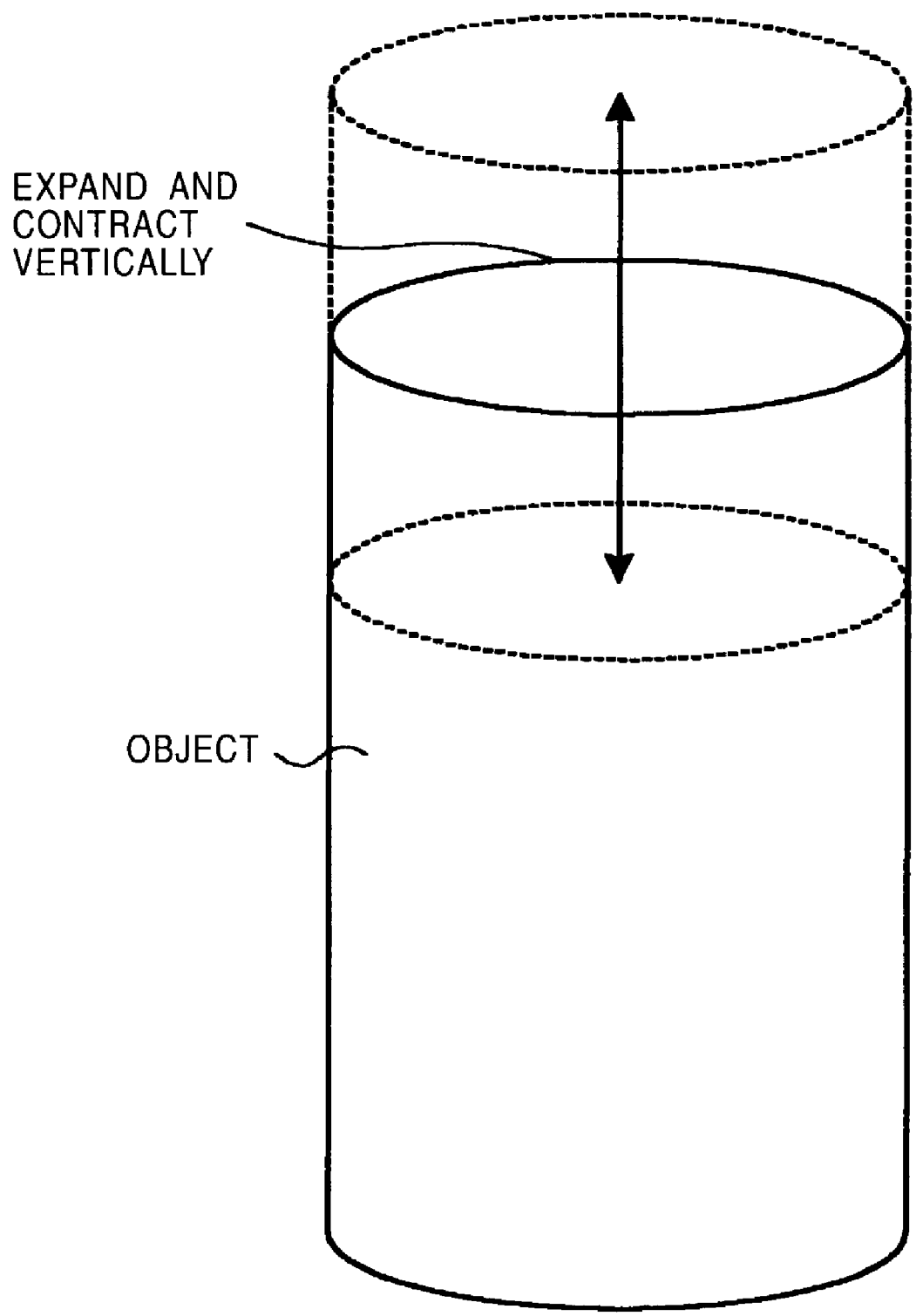
FIG. 5 is an illustration of another example of an object deforming method.

The animation playing unit 15 is activated. The animation playing unit 15 creates a deformed animation for emphasizing the object (step S3). The possible object deforming methods include creating animations such as those of the displayed object rotating around a predetermined rotation axis, the displayed object's upper portion swaying from side to side while the lower portion thereof being fixed (see FIG. 4), the displayed object vertically expanding and contracting (see FIG. 5), the displayed object shaking, and the displayed object appearing from the ground.

The created emphasis animation is stored in the recording unit 13 (step S4). The animation playing unit 15 is activated at a predetermined time and plays the emphasis animation in the three-dimensional virtual space displayed on the screen (step S5).

The three-dimensional virtual space including the emphasis animation can be used by, for example, a navigation system. In other words, the user's attention can be aroused by displaying a deformed animation of a destination building that is specified by the user or a building that corresponds to the information search result obtained by a query expression input by the user.

Figure 6:
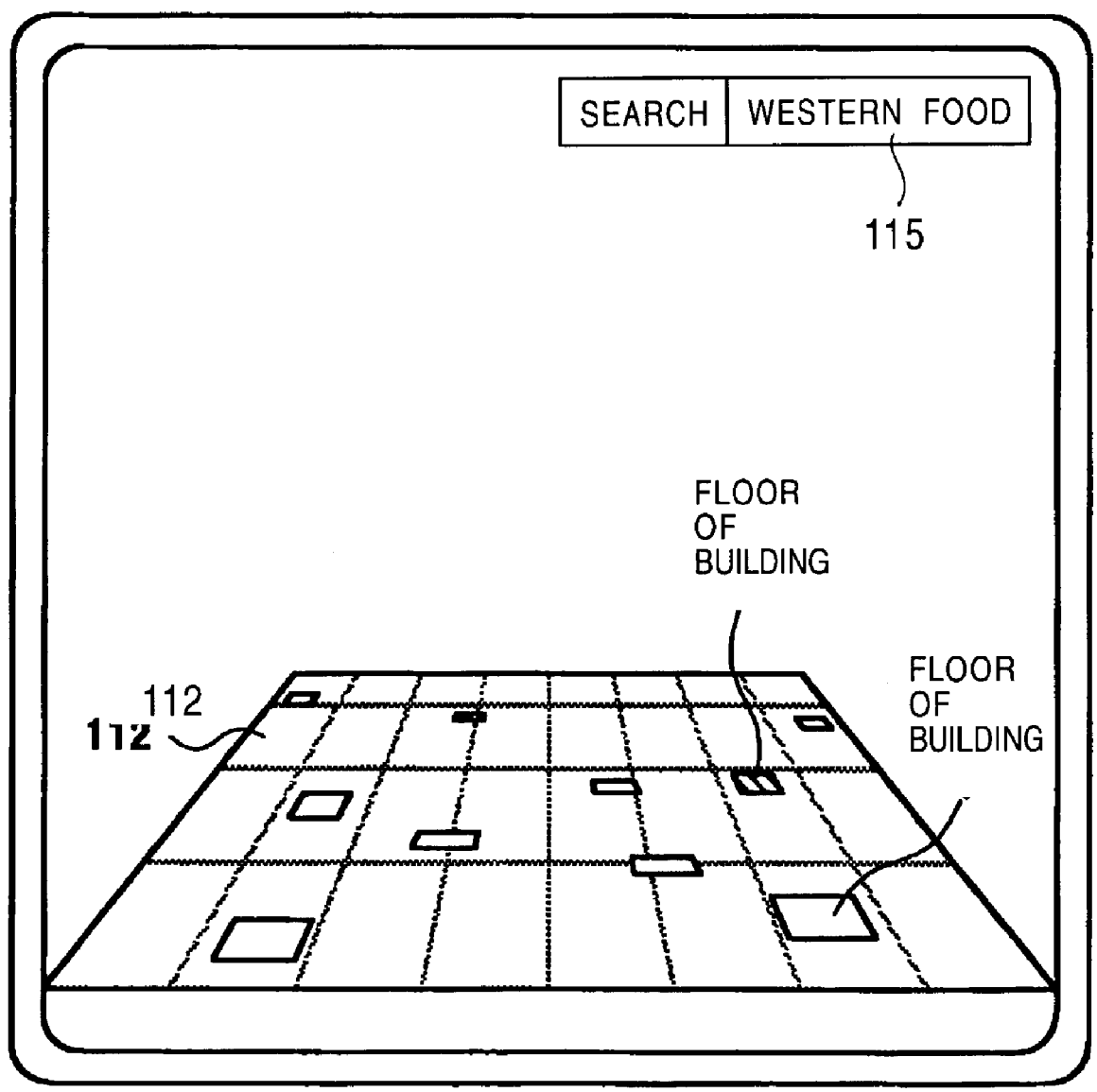
FIG. 6 is an illustration of an example of the configuration of a screen displaying the information search results using deformed animations in a three-dimensional virtual space.
Figure 7:
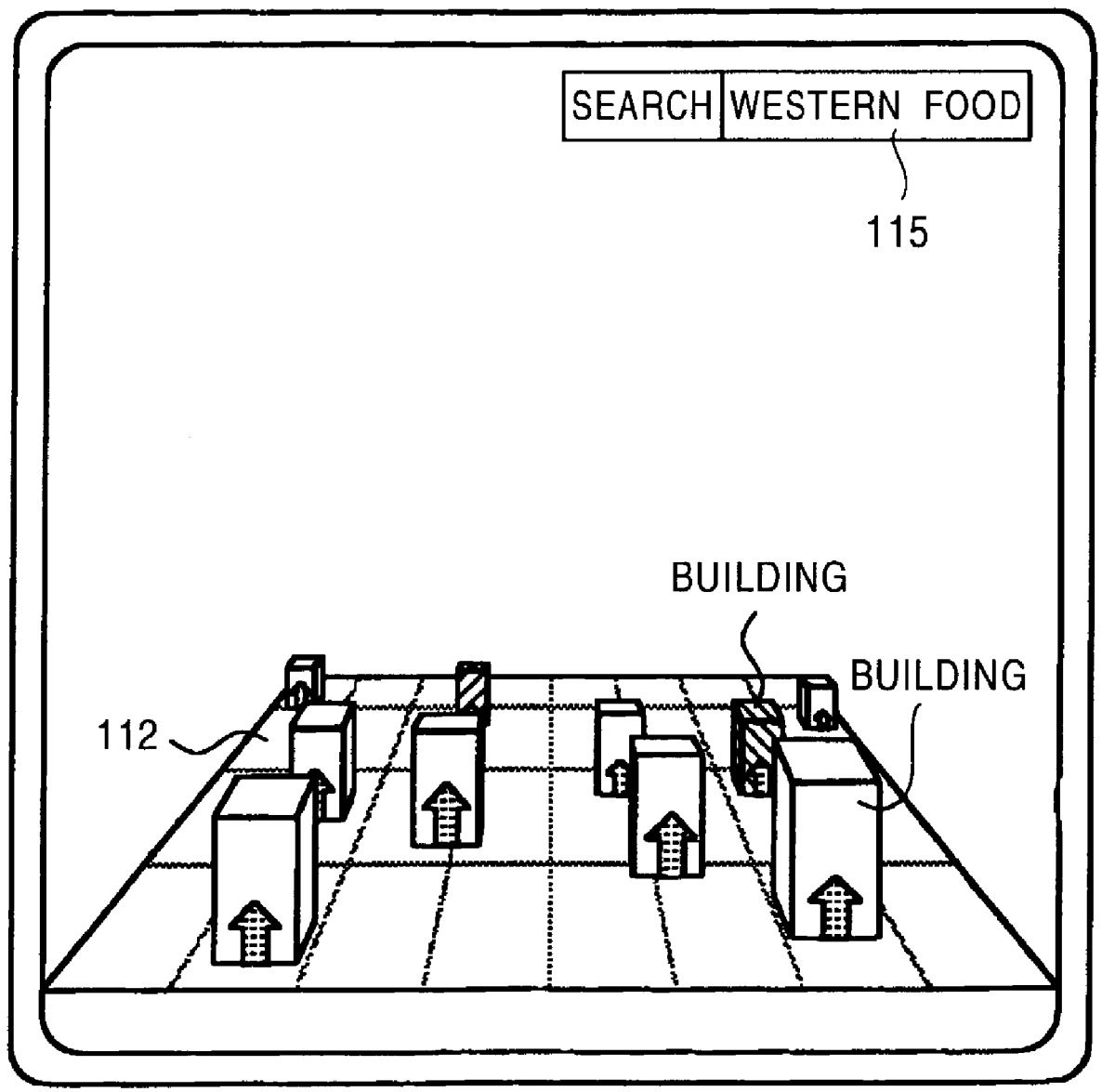
FIG. 7 is an illustration of another example of the configuration of the screen displaying the information search results using deformed animations in the three-dimensional virtual space.

FIGS. 6 and 7 show examples of screens displaying the information search results using deformed animations in the three-dimensional virtual space.

Referring to FIG. 6, an information search screen includes a three-dimensional map 112 and a query expression inputting field 115. The user may input a query expression including a keyword or a set of two or more keyboards using the input unit 12. In the example shown in FIG. 6, the keyword "Western Food" is input.

The central control unit 10 conducts an information search based on the input query expression and obtains the location of a building that satisfies the search condition and the building's three-dimensional building data from the server 3 via the network. A deformed animation of the corresponding building is created and played in the three-dimensional virtual space.

In the example shown in FIG. 7, the three-dimensional shape of each building serving as the search result is displayed using a deformed animation of the building that appears from the ground at the corresponding position. The animation is completed when the building expands up to the corresponding height according to the scale.

Figure 8:
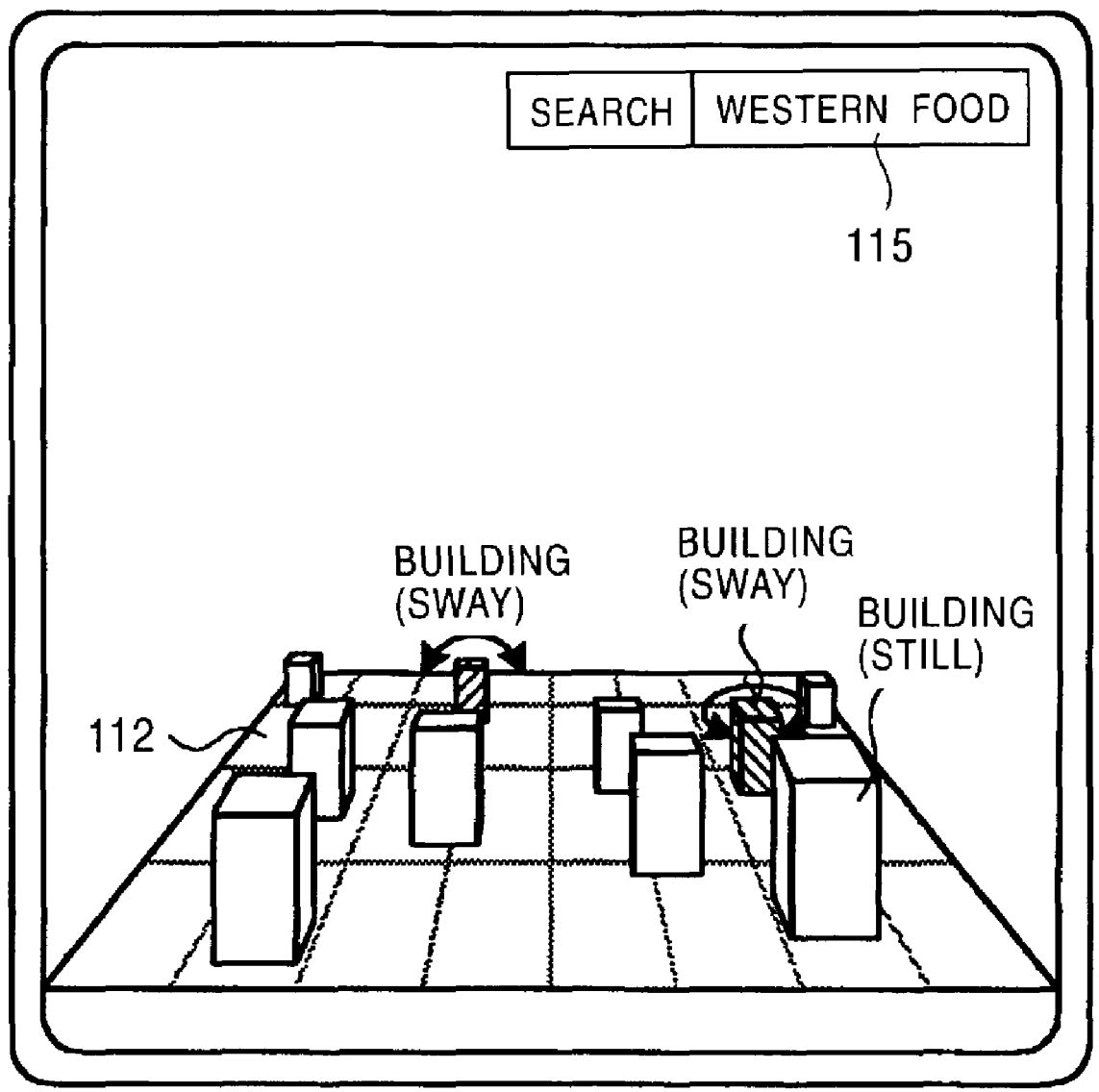
FIG. 8 is an illustration of examples of deformed animations in the three-dimensional virtual space in accordance with information presentation intensity.

The search results are classified in such a manner that those satisfying the query expression have an intensity level of two and those belonging to a category to which the query expression belongs have an intensity level of one. The three-dimensional virtual space may be represented in accordance with the information presentation intensity. In the example shown in FIG. 8, a group of buildings corresponding to the keyword is shown. Of the building group, buildings that are to be emphatically displayed for the user are further animated, such as those swaying from side to side.

Figure 9:
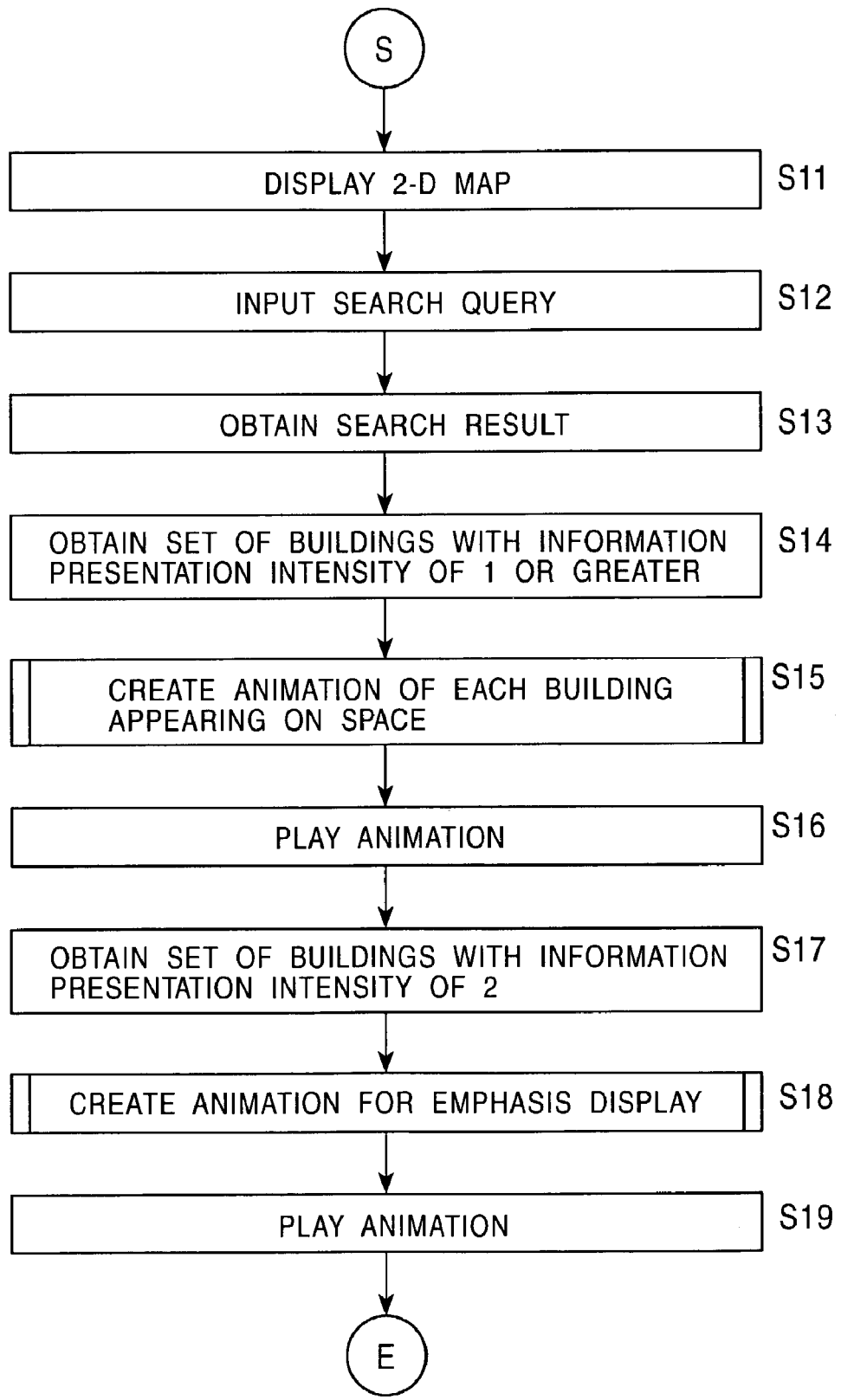
FIG. 9 is a flowchart showing a process of displaying an information search result using a deformed animation in the three-dimensional virtual space.

FIG. 9 is a flowchart showing a process of displaying an information search result using a deformed animation in the three-dimensional virtual space. Practically, the process is realized by executing a predetermined program code by the central control unit 10.

The process obtains two-dimensional map data from the server 2 via the computer network 3 or from the recording unit 13 and develops the map data on the ground in the three-dimensional virtual space on the display unit 11 (step S11).

The user inputs a desired query expression using the input unit 12 (step S12). The user may input a query expression on a text basis or may form a query expression by operating a menu or an icon under a GUI (Graphical User Interface) environment.

The central control unit 10 conducts an information search based on the input query expression and obtains information on buildings that satisfy the search condition (step S13). The search result may be obtained by the internal processing, or a server on the computer network 3 may be designated via the communication unit 16 to conduct an information search.

For example, the goodness of fit with respect to the search condition, that is, the information presentation intensity, is added to the information search result. The process selects and obtains a set of buildings having a predetermined information presentation intensity (=1) or greater (step S14).

The animation creating unit 14 is activated, and the animation creating unit 14 creates a deformed animation of each extracted building appearing in the virtual space (see FIG. 7) (step S15). A control solid including control points that are arranged in a lattice is created around the corresponding building data, and the interior of the control solid is treated as a three-directional parameter space. By mapping a deformation of the control solid onto a deformation of the building shape, an animation is easily created (as described above).

The animation playing unit 15 is activated, and the animation playing unit 15 plays the animation data created by the animation creating unit 14 in the three-dimensional virtual space displayed on the screen (step S16). The deformed animation of each corresponding building, such as that shown in FIG. 7, need only appear from the ground and expand upward. Based on the human characteristic of paying more attention to a moving object, the corresponding building draws more attention.

The process selects and obtains a set of buildings having an information presentation intensity of two or greater (step S17). The animation creating unit 14 is activated, and the animation creating unit 14 creates a deformed animation for emphatically displaying each extracted building (step S18). A control solid including control points that are arranged in a lattice is created around the corresponding building data, and the interior of the control solid is treated as a three-directional parameter space. By mapping a deformation of the control solid onto a deformation of the building shape, an animation is easily created (as described above).

The animation playing unit 15 is activated, and the animation playing unit 15 plays the animation data created by the animation creating unit 14 in the three-dimensional virtual space displayed on the screen (step S19). The deformed animation of each building shape, such as that shown in FIG. 8, need only sway from side to side. On the basis of the human characteristic of paying more attention to a moving object, the corresponding building draws more attention.

Figure 10:
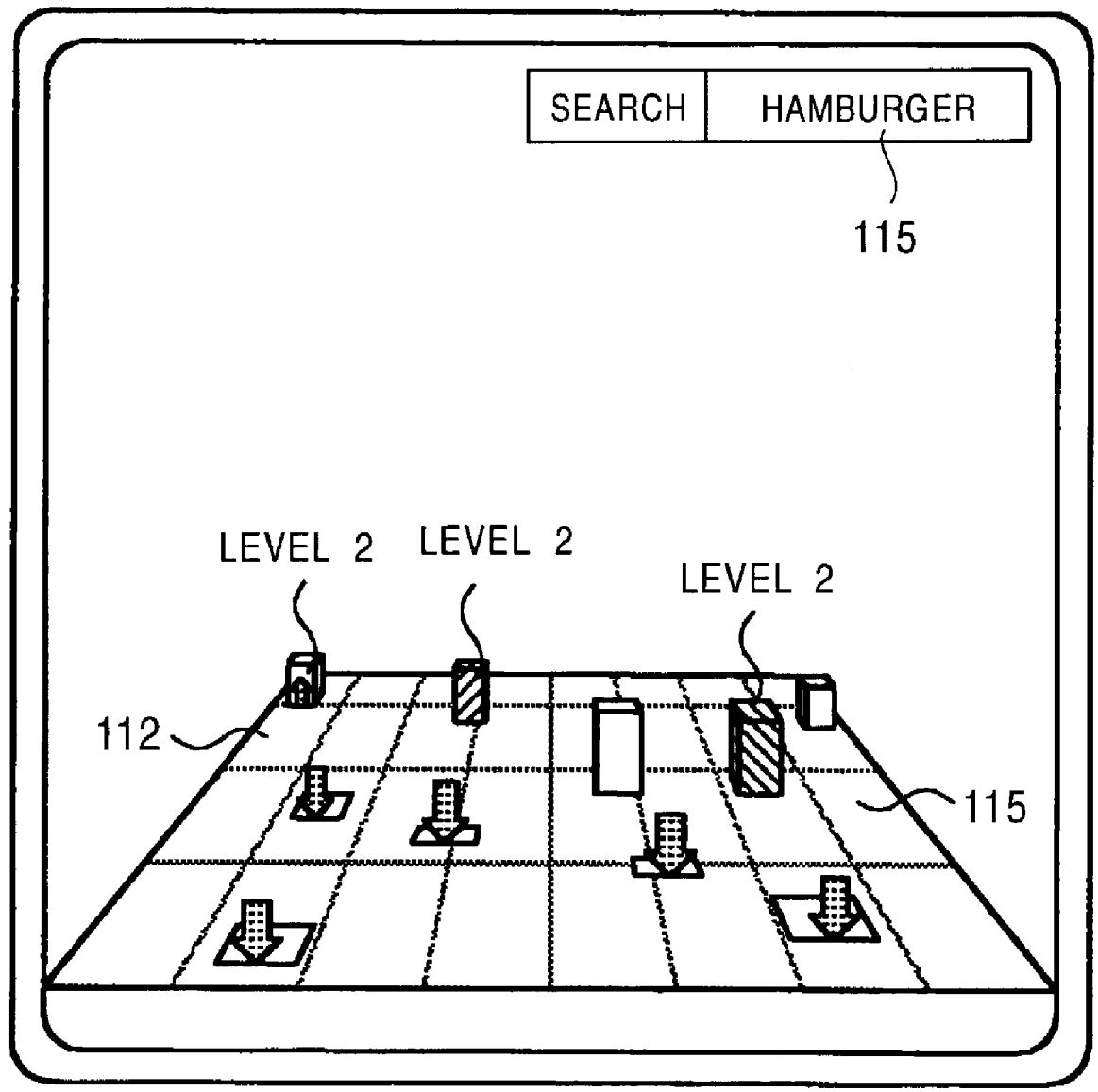
FIG. 10 is an illustration of an example of switching of animations in the three-dimensional space in accordance with the search result.

The animations in the three-dimensional virtual space may be switched in accordance with the search results. In the example shown in FIG. 10, the three-dimensional shape of buildings that are omitted from the search results, as a result of repeatedly narrowing the search, are displayed using animations that sink or disappear from the corresponding locations into the ground. The animations are completed when the shape of the individual buildings disappears.

Figure 11:
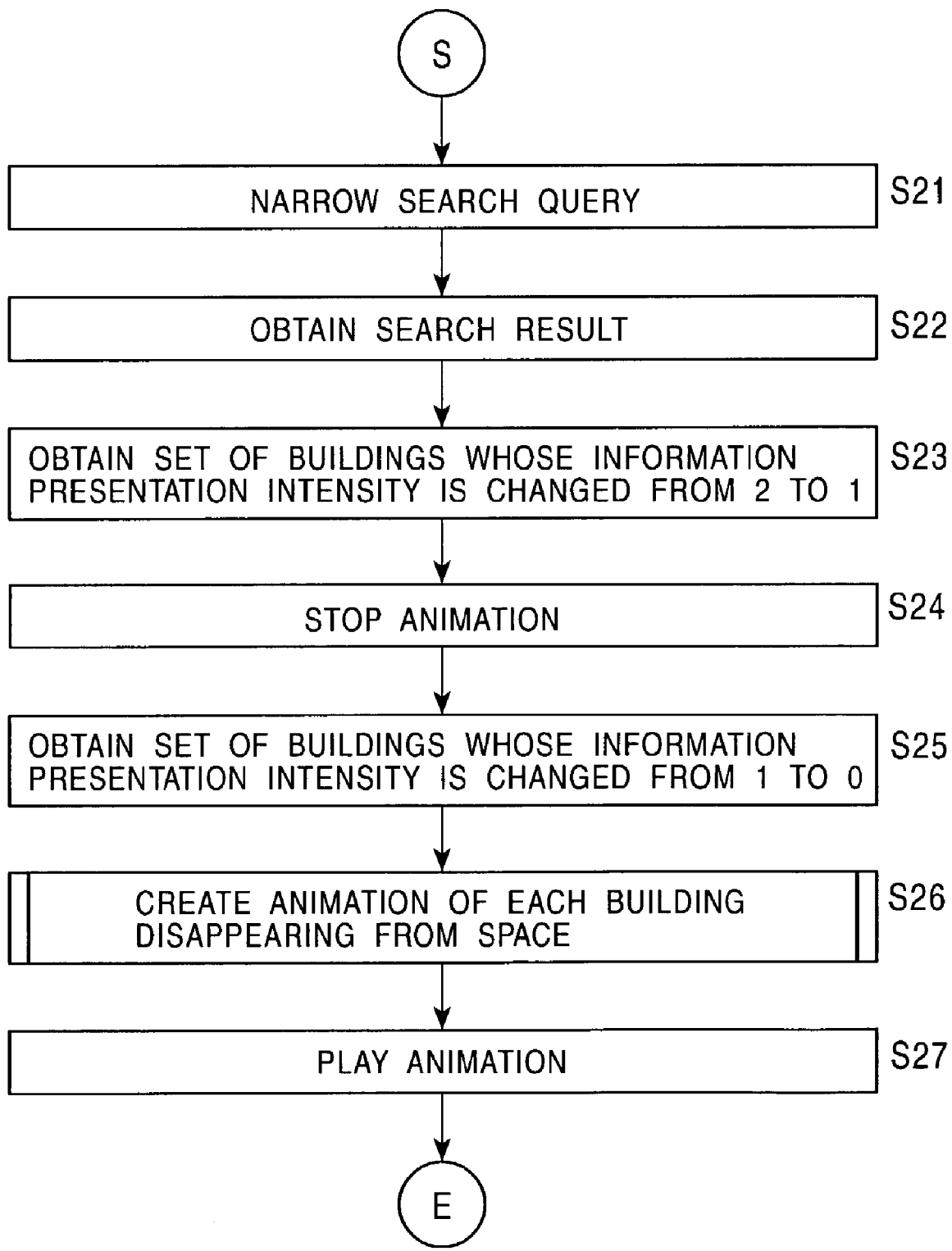
FIG. 11 is a flowchart showing a process of switching from one animation to another in the three-dimensional virtual space in accordance with narrowing of the information search.

FIG. 11 is a flowchart showing a process of switching the animations in the three-dimensional virtual space in accordance with the narrowing of the information search. Practically, the process is realized by executing a predetermined program code by the central control unit 10. observing the three-dimensional virtual space displayed in accordance with the search results (for example, see FIGS. 7 and 8), the user may feel that there are too many buildings that can serve as targets. In such a case, the user uses the input unit 12 to narrow the search condition (step S21). The user may specify to narrow the search condition on a text basis or may specify to narrow the search condition by operating a menu or an icon under a GUI environment.

The central control unit 10 conducts an additional information search based on the input query expression and obtains information on buildings that satisfy the narrowed search condition (step S22). The search results may be obtained by the internal processing, or a server on the computer network 3 may be designated via the communication unit 16 to conduct an information search.

The goodness of fit with respect to the search condition, that is, the information presentation intensity, is added to the information search results. The process detects a set of buildings whose information presentation intensity has been reduced from level 2 to level 1 as a result of narrowing of the search condition (step S23).

An instruction to the animation playing unit 15 is issued to stop the emphasis animations of the obtained set of buildings that sway from side to side (see FIG. 8) (step S24). As a result, the number of buildings that are emphatically displayed is reduced. This makes it easier for the user to narrow down the destination and thus increases attention.

The process detects a set of buildings whose information presentation intensity has been reduced from level 2 to level 1 as a result of narrowing of the search condition (step S25).

The animation creating unit 14 is activated, and the animation creating unit 14 creates a deformed animation of each extracted building disappearing from the virtual space (see FIG. 10) (step S26). A control solid defined by control points that are arranged in a lattice is created around the corresponding building data, and the interior of the control solid is treated as a three-directional parameter space. By mapping a deformation of the control solid onto a deformation of the building shape, an animation is easily created (as described above).

The animation playing unit 15 is activated, and the animation playing unit 15 plays the animation data, which is created by the animation creating unit 14, in the three-dimensional virtual space displayed on the screen (step S27). The deformed animation of each corresponding building, such as that shown in FIG. 7, need only appear from the ground and expand upward. As a result, the less important building shape disappears from the three-dimensional virtual space. The user's attention is not distracted since the buildings are not displayed in a tangled manner. On the basis of the human characteristic of paying more attention to a moving object, the corresponding building draws more attention.

Generation of Three-dimensional Map

In the above-described embodiment, the server 2 can provide map data and three-dimensional building data required to display a three-dimensional virtual space, such as a three-dimensional map image including buildings on the ground. Creation of a three-dimensional model that can be provided by the server 2 will now be described.

Three-dimensional model generation according to an embodiment of the present invention obtains the shape of a building on the ground in terms of a set of three-dimensional polygons on the basis of altitude information distributed on a plane, which is obtained by irradiating the ground with laser light from space using an airplane or the like.

Altitude information measured from space is compensated for geographical errors, and the altitude information is made into an ortho-image on the basis of the accurate geographic information. As a result, the altitude information is mapped to each observation point on a map.

Figure 12:
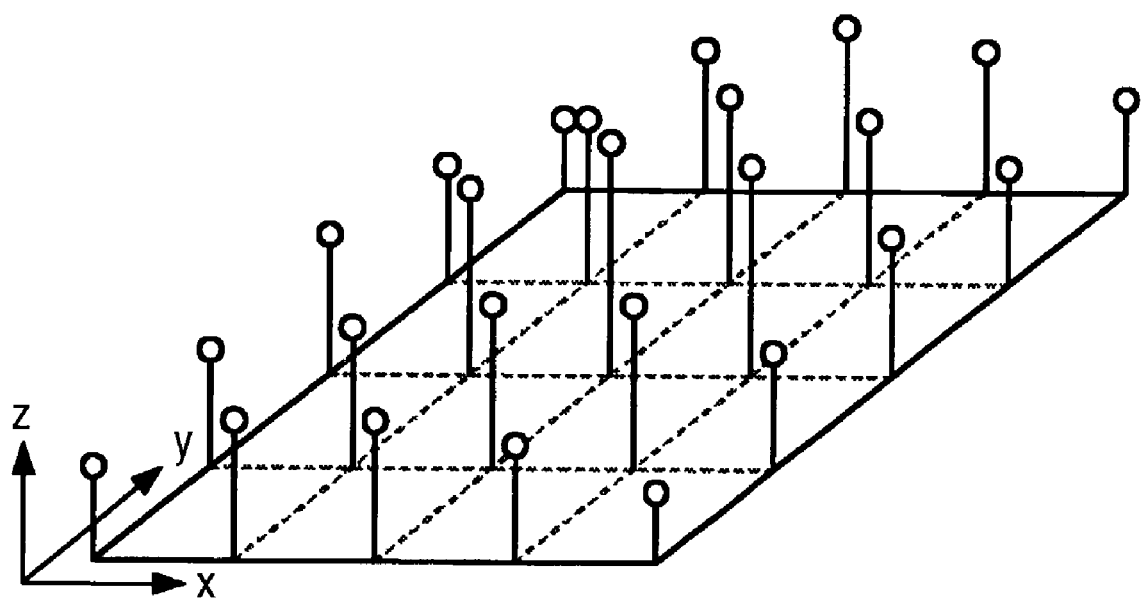
FIG. 12 is an illustration of the mapping of altitude information onto a two-dimensional plane.

FIG. 12 shows the mapping of altitude information onto a two-dimensional plane. The two-dimensional plane shown in FIG. 12 represents the ground surface of a plain, mountain, suburb, or central city. Altitude information (elevation data) is obtained in the x and y directions and represented as a z-coordinate value of each point at the coordinates (x, y).

Figure 13:
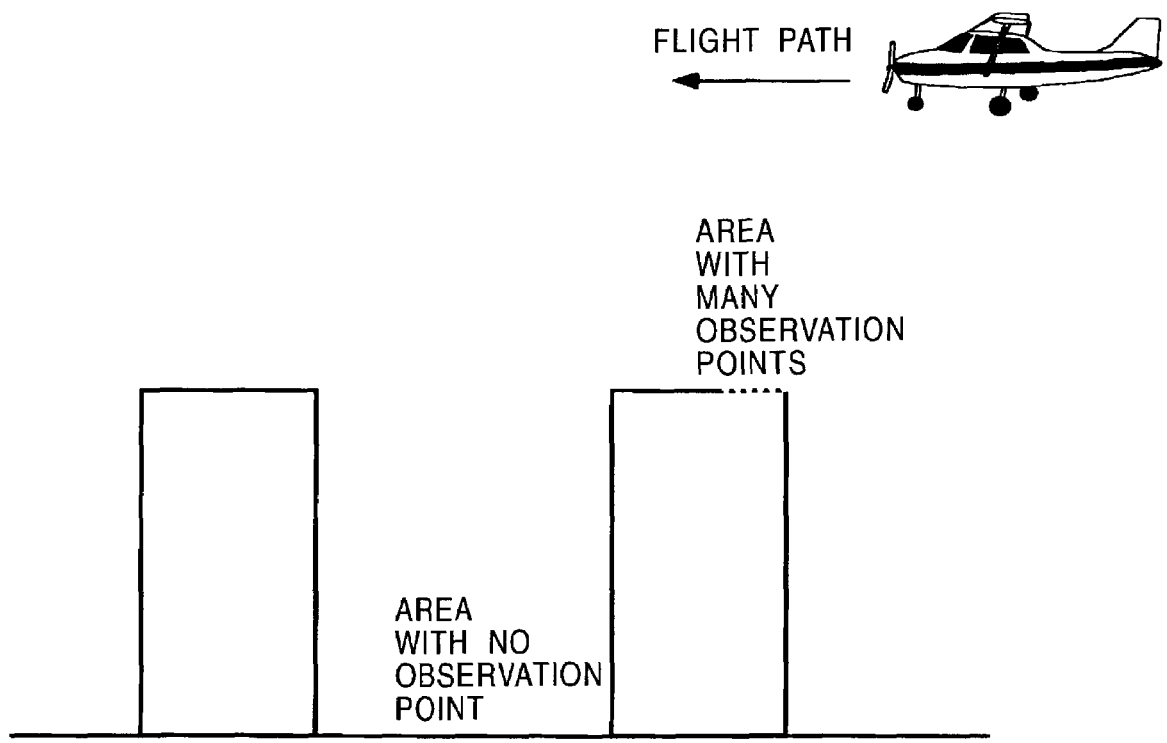
FIG. 13 is an illustration of a distribution of positions of observation points on the plane.

Since the altitude information is measured from space in an unstable measurement environment susceptible to wind and other climate conditions, observation positions tend to be distributed irregularly over the ground in accordance with the flight path of the airplane. In this embodiment, the assumption is made that there is no regularity in the positions of the observation points distributed on the plane and that the distribution thereof is uneven. With regard to the actual data, a distribution of observation points depends on the flight path. A component face of a building that is in front of the flight path, i.e., a component face that is not behind a building, contains many observation points, and hence the observation accuracy becomes high. In contrast, no observation point is distributed behind a building with respect to the flight path (see FIG. 13).

Figure 14:
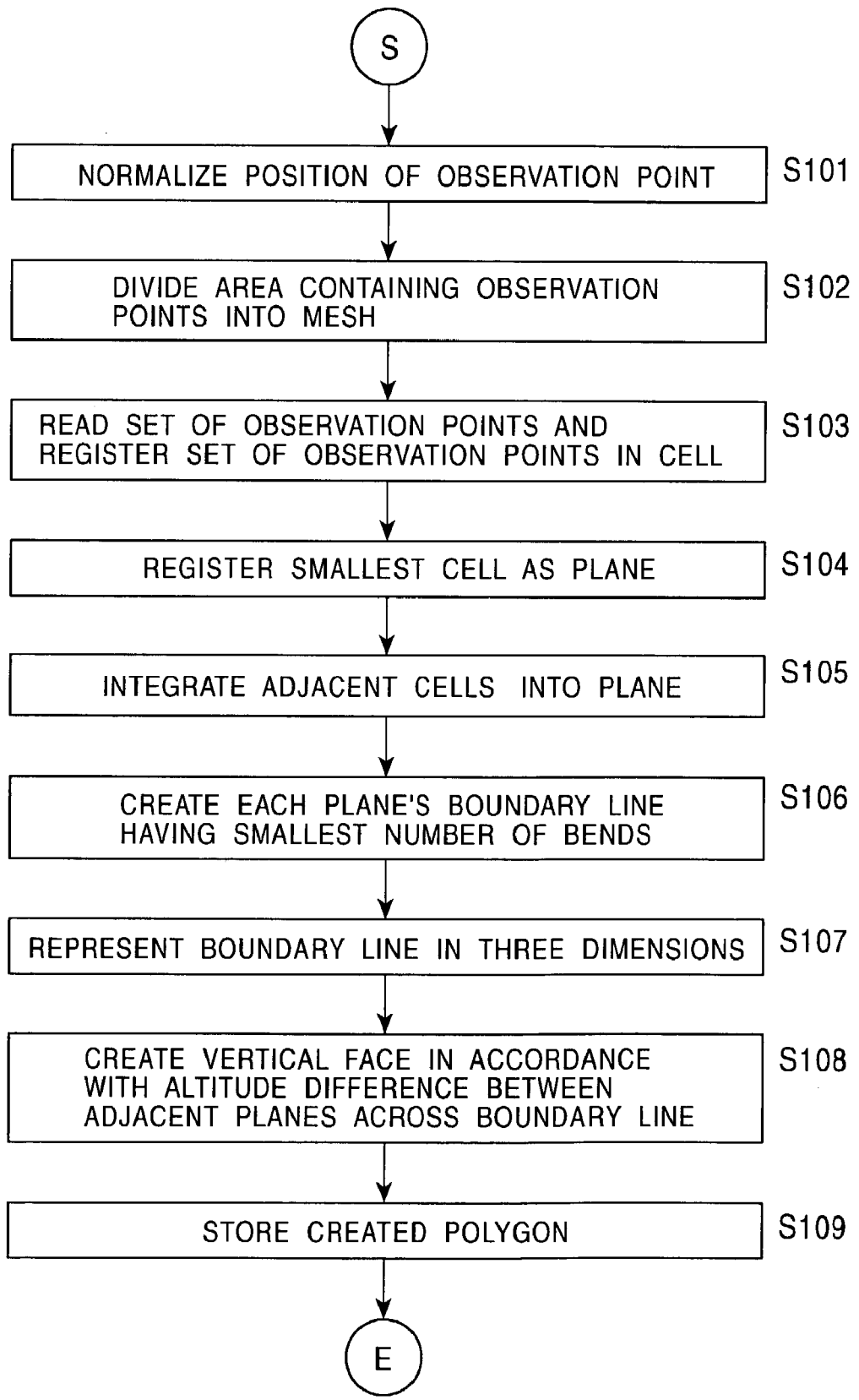
FIG. 14 is a flowchart schematically showing a process of generating a three-dimensional model of a building on the ground on the basis of elevation data that is generated by mapping altitude information onto each observation point on the two-dimensional plane.

FIG. 14 schematically shows a process of generating a three-dimensional model of a building on the ground on the basis of elevation data generated by mapping altitude information onto each observation point on a two-dimensional plane according to the embodiment of the present invention. The process is realized by, for example, executing predetermined application software on a computer system. The process includes the following steps:

(1) Normalize the position of each observation point; (2) divide an area in which the observation points reside into a mesh of cells; (3) read a set of observation points and register the set of observation points in a cell; (4) register the smallest cell as a plane; (5) integrate adjacent cells into a plane; (6) create each plane's boundary line having the smallest number of bends; (7) represent the boundary line in terms of three dimensions; (8) create a vertical face in accordance with the altitude difference between planes adjacent to each other across the boundary line; and (9) store a polygon created by the above-described steps.

A. Normalization of Position of Observation Point

In this embodiment, the assumption is made that the observation points are distributed irregularly (as described above). An area in which the observation points reside is divided into a mesh of mesh cells, and each set of observation points is registered in the corresponding mesh cell. When the range of the observation area is not specified, the pre-processing is performed to detect an area in which the observation points reside.

Figure 15:
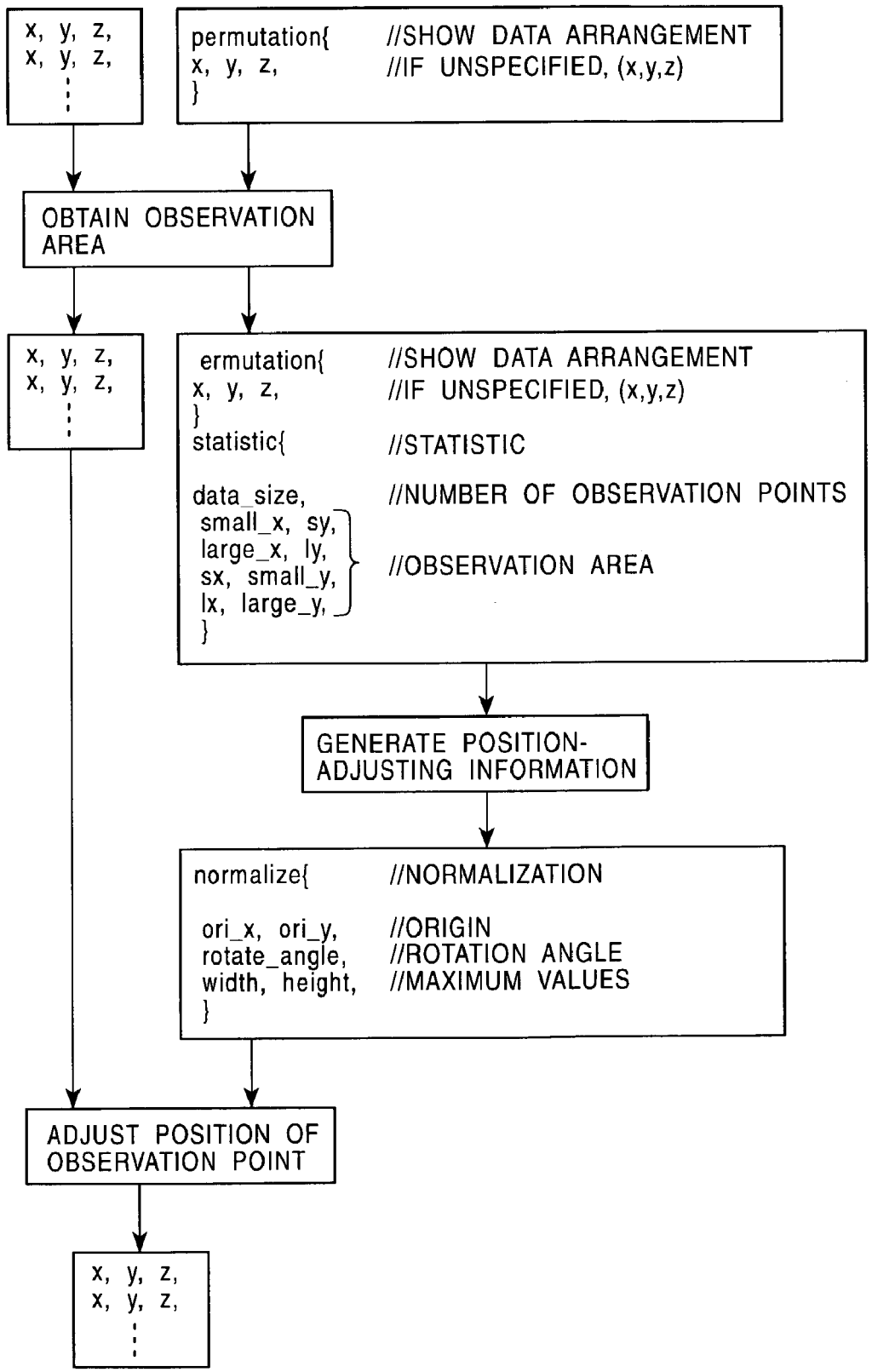
FIG. 15 is a flowchart showing the flow of pre-processing for normalizing each observation point.

FIG. 15 shows the flow of the pre-processing to normalize each observation point. The arrangement of observation point data (x, y, z) is specified. If no arrangement is specified, it is assumed that the arrangement is (x, y, z).

A-1. Obtaining Statistical Information

The process obtains statistical information, that is, the number of observation points and a distribution of the positions thereof. The process generates a piece of adjustment information and normalizes each observation position, which is part of the main processing.

The process flow shown in FIG. 15 is designed to perform the pre-processing by an independent program. When there is no statistical information, the pre-processing is performed in advance to output a file of statistical information for generating positional information. The pre-processing is then completed.

A-2. Normalization of Observation Position

Figure 16B:
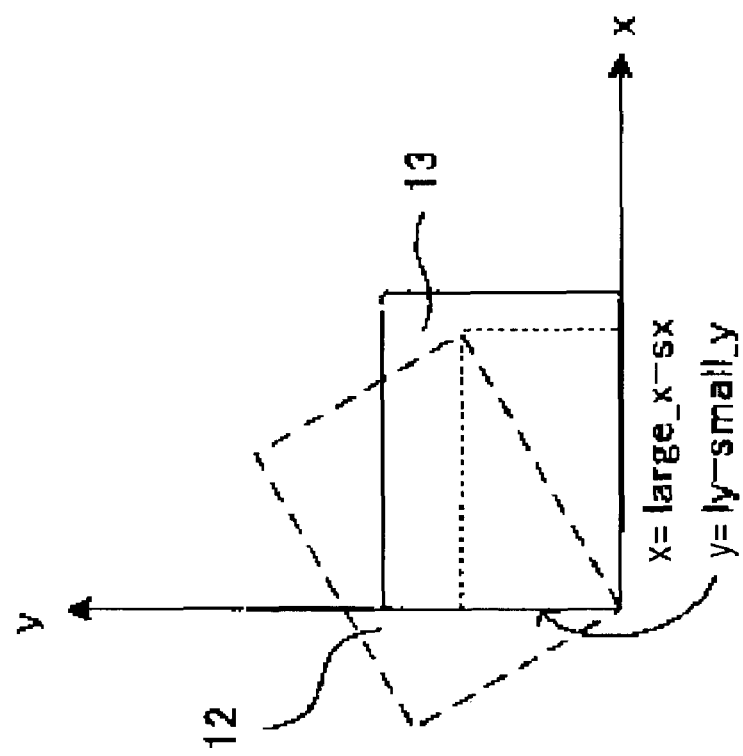
FIGS. 16A and 16B show the manner in which each observation position is normalized when an observation area is a rectangle.
Figure 16A:
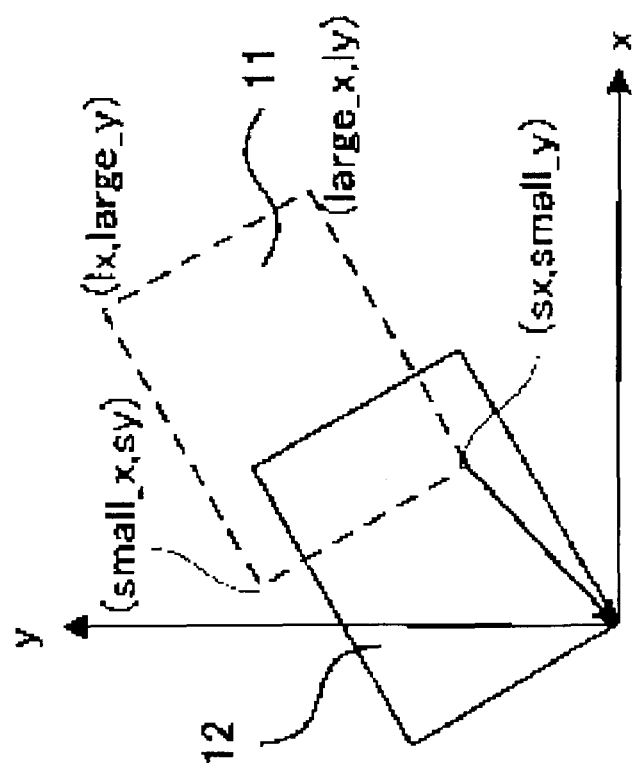

The process normalizes each observation point that is mapped onto the two-dimensional plane from the measurement coordinate system to the processing coordinate system. FIGS. 16A and 16B show the normalization of each observation position when the observation area is a rectangle. As shown in FIGS. 16A and 16B, the observation area is translated and then rotated to normalize each observation position.

Figure 17B:
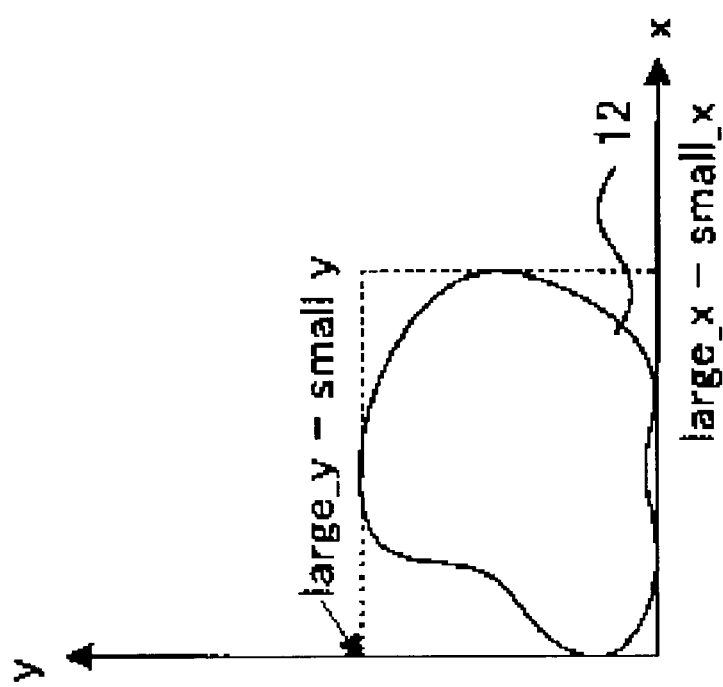
FIGS. 17A and 17B show the manner in which each observation position is normalized when an observation area is free-form.
Figure 17A:
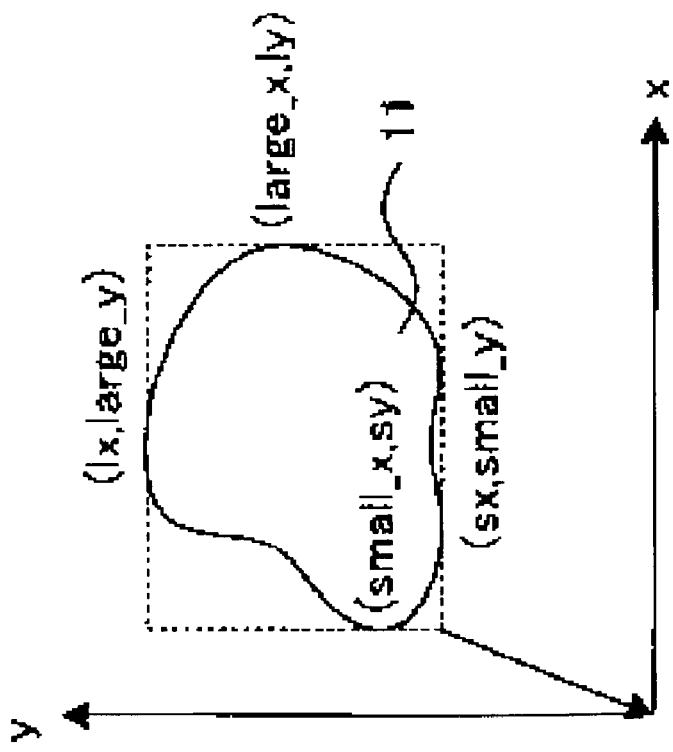

In contrast, when the observation area is free-form, as shown in FIGS. 17A and 17B, each observation position is normalized only by translation.

B. Registration in Mesh Cell

Figure 18:
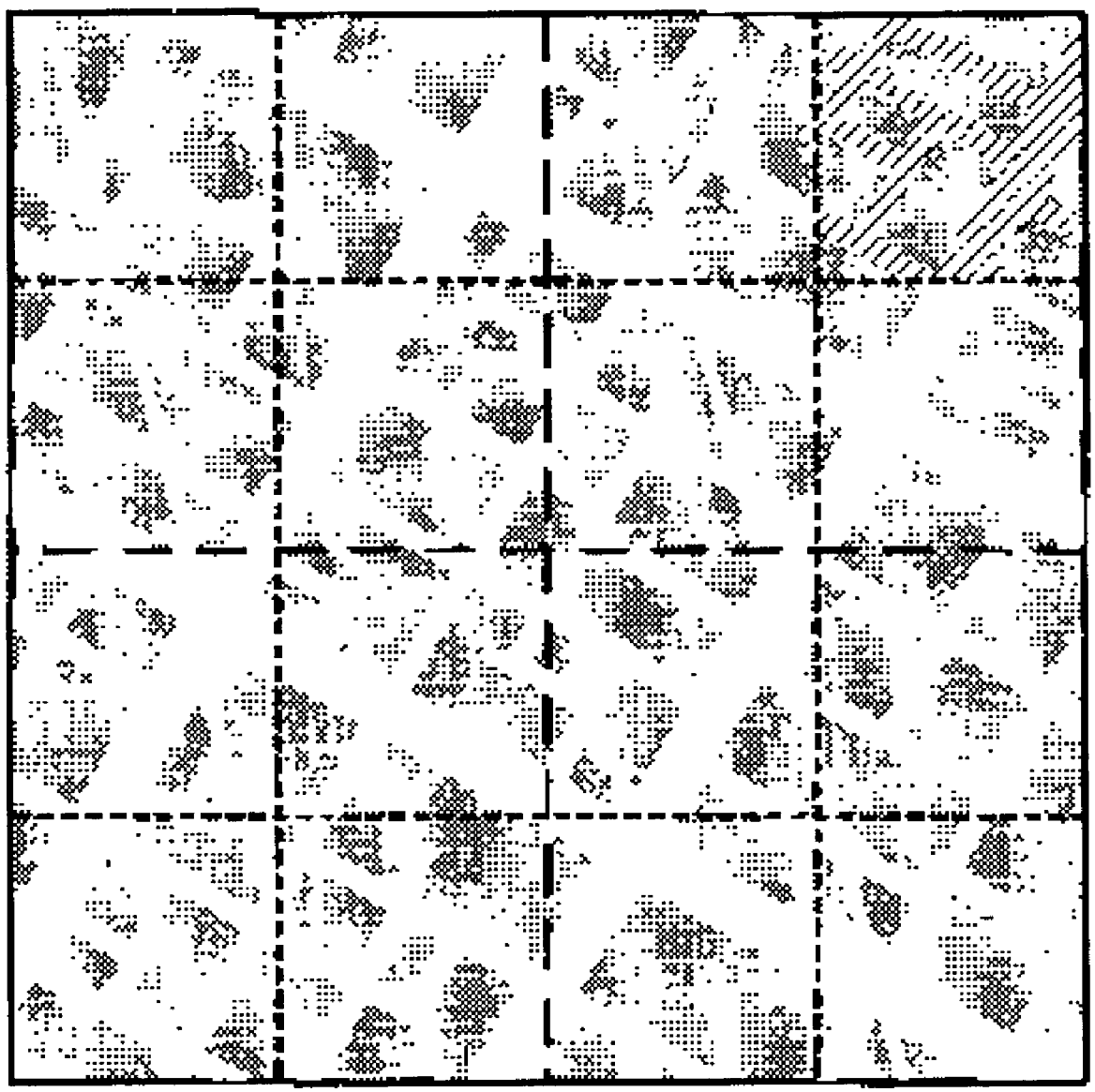
FIG. 18 is an illustration of the manner in which the observation area is divided into a mesh of cells.
Figure 19:
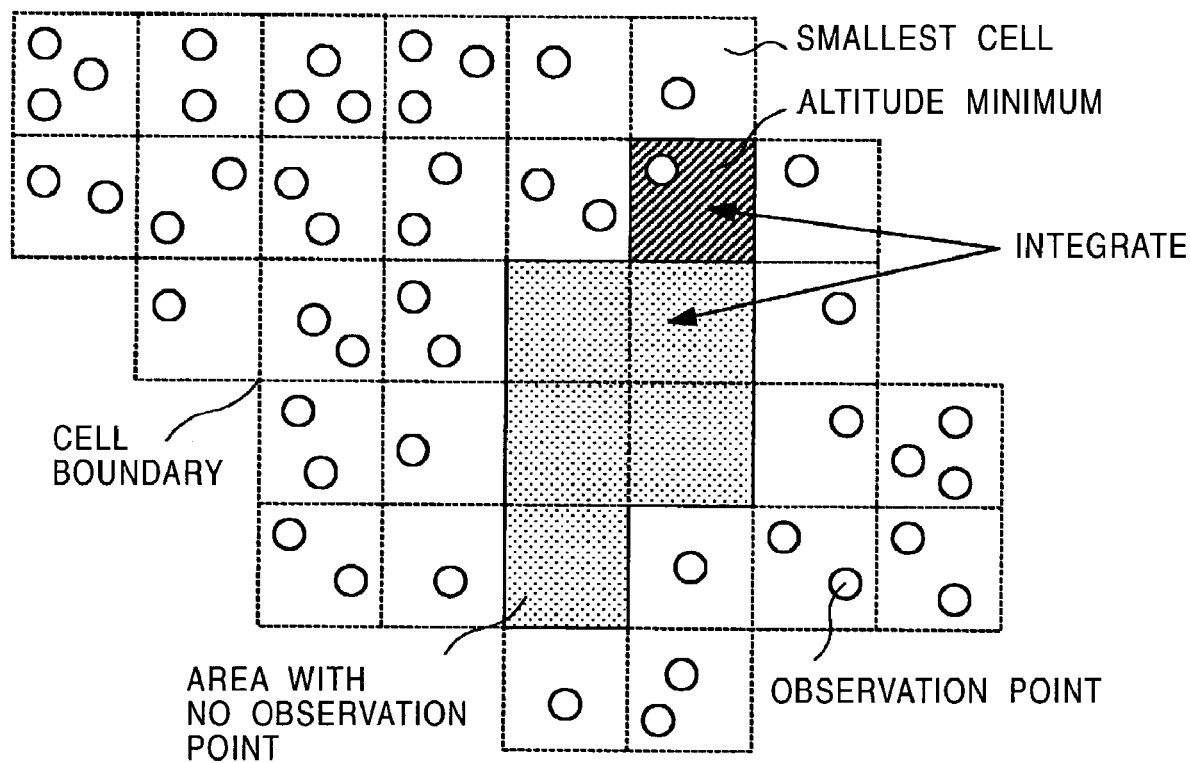
FIG. 19 is an illustration of the manner in which a cell containing no observation point is integrated with a surrounding cell having the lowest average altitude of observation points contained therein.

After the observation area has been normalized as described above, the observation area is divided into a rectangular mesh of cells. The individual cell serves as the minimum unit of processing and is registered as an initial plane. FIG. 18 shows division of the observation area into a mesh of cells.

In this embodiment, the observation points are distributed unevenly. As is clear from FIG. 18, there are some cells that contain no observation point. Since these cells cannot construct a plane, these cells need be eliminated prior to the plane integration (described below) (see FIG. 2). Each of these cells containing no observation point is integrated with a surrounding cell having the lowest average altitude of observation points contained therein. This is based on empirical rule that many of these portions containing no observation point are behind buildings when measurement is performed using laser. It is thus considered most proper to integrate such a portion with a portion at the lowest elevation.

C. Creation of Initial Plane to be Integrated

A plane serving as the smallest unit of integration is allocated to each mesh cell.

Figure 20:
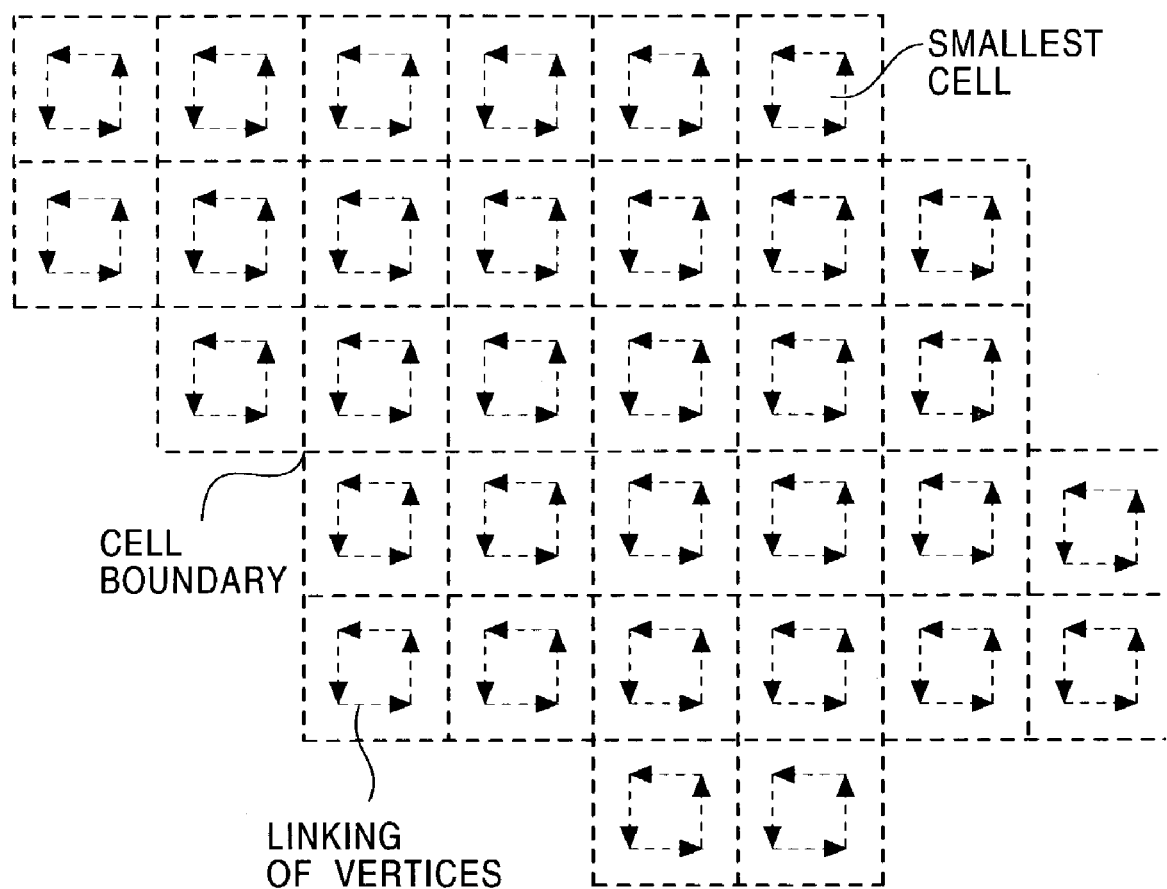
FIG. 20 is an illustration of the fitting of a plane serving as the smallest unit to each mesh cell.

FIG. 20 shows allocation of planes serving as the smallest units to the corresponding mesh cells. Each plane serving as the smallest unit has a cell boundary defined by a ridge loop of linked vertices. Each plane can access plane information that is adjacent thereto via the ridge. In other words, each plane at this point is defined by the corresponding cell's vertices and boundary.

Created planes are registered in a plane list. In the plane list, the planes are arranged in ascending order of area.

When creating the plane list, not all the areas need be divided into the smallest unit cells. Specifically, an area having a high contribution rate relative to a regression plane (see FIG. 21) need not be divided into cells to increase the number of cells to be processed.

Figure 22:
FIG. 22 is an illustration of a modification for creating a plane list.
Figure 23:
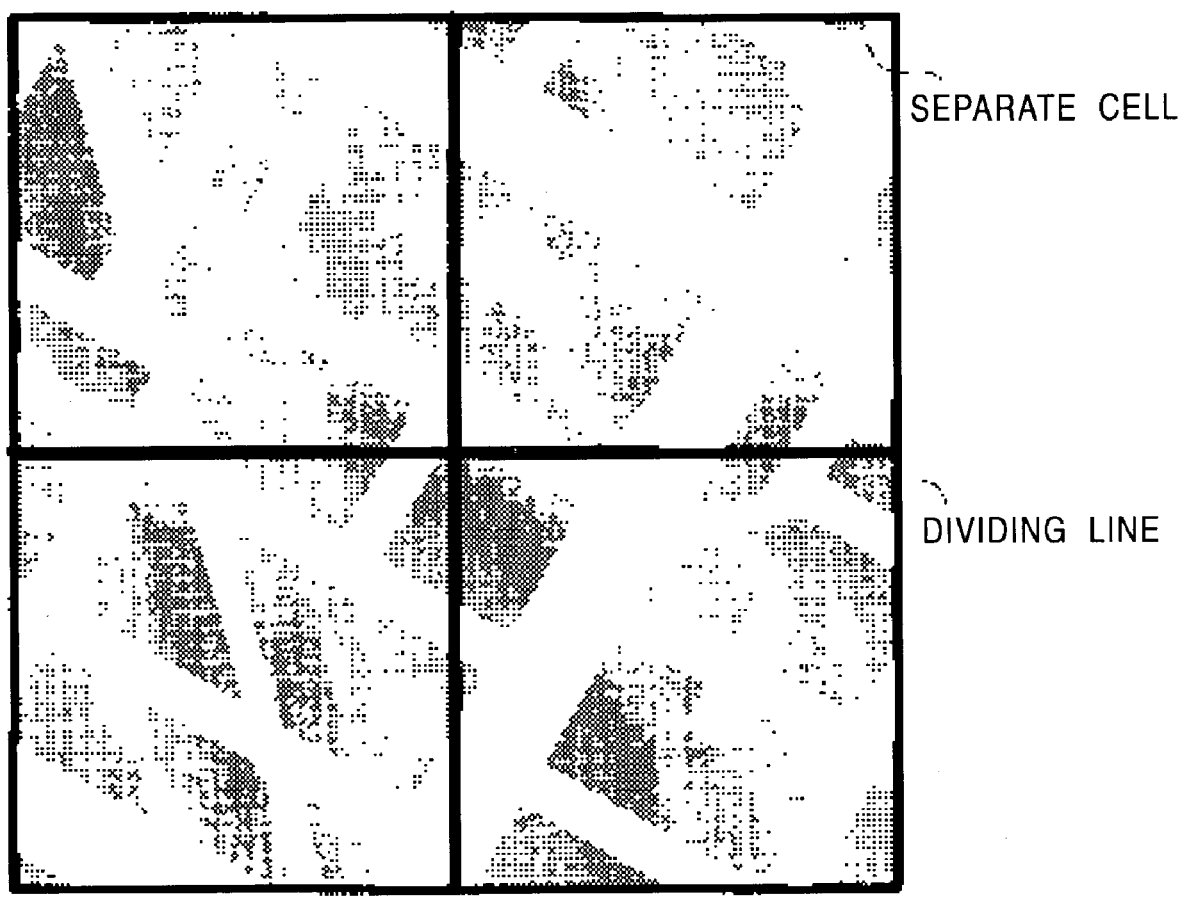
FIG. 23 is an illustration of the modification shown in FIG. 22.
Figure 24:
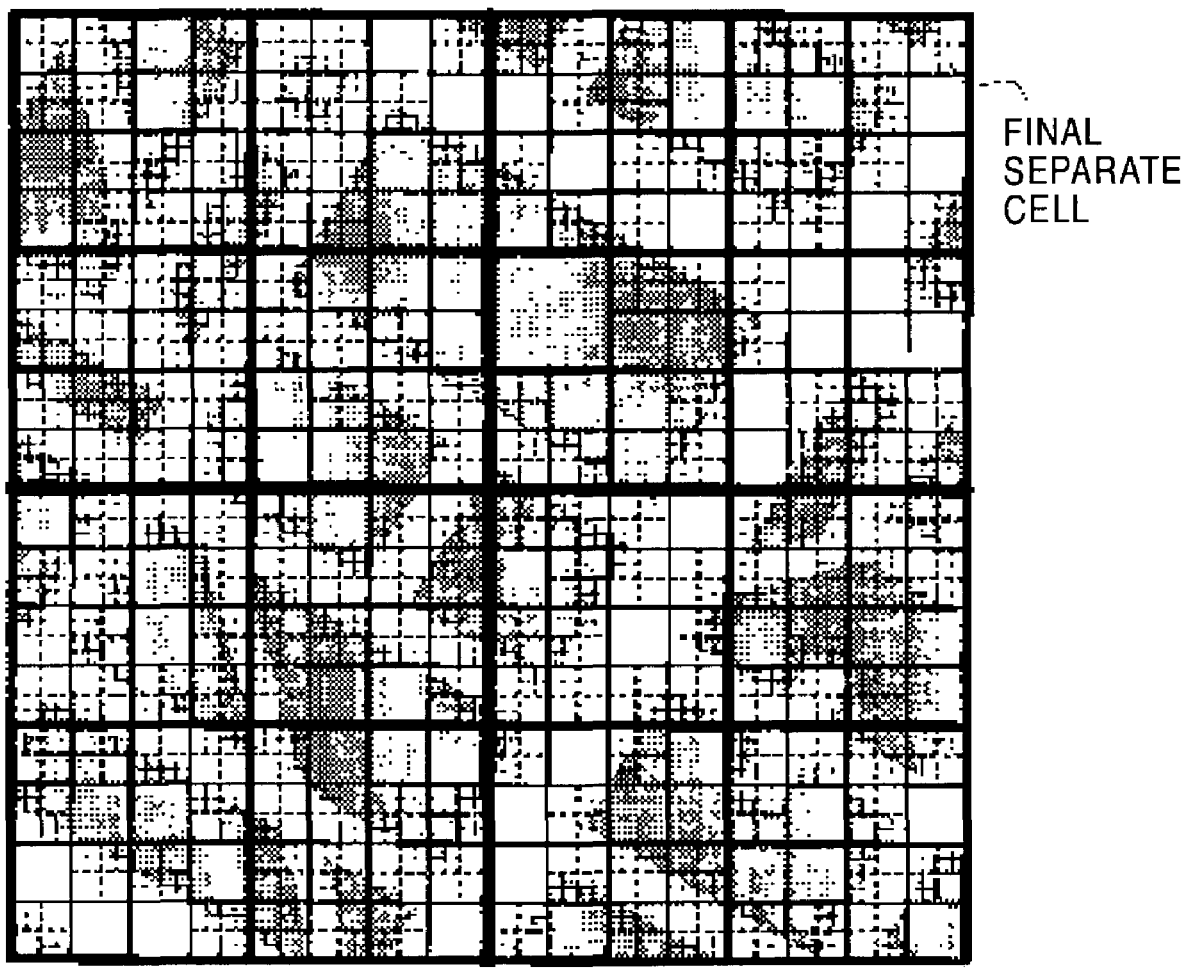
FIG. 24 is an illustration of the modification shown in FIG. 22.

FIGS. 22 to 24 show a modification for creating the plane list. In an observation area shown in FIG. 22, a fitted regression plane is estimated by the least squares method on the basis of altitude information at each observation point. If a correlation coefficient of the regression plane is greater than a predetermined value, the observation area is regarded as a single plane, which is not subjected to further division.

On the other hand, if the correlation coefficient of the estimated regression plane falls below the predetermined value, it is determined that the observation area cannot be fitted to a single plane. As shown in FIG. 23, the area is divided into four cells by bisecting the horizontal and vertical sides. For each separate cell, a regression plane is similarly estimated. It is then determined whether or not the separate cell can be fitted to a single plane, conversely, whether or not the further cell division is necessary, on the basis of the value of the correlation coefficient.

As shown in FIG. 24, repetition of the regression plane evaluation and cell division consequently leads to generation of final separate cells in different sizes depending on the number of divisions, that is, whether or not each of the cells can be fitted to a plane. The final separate cells are registered in the plane list. In this case, the cells are arranged in ascending order of area.

Figure 25:
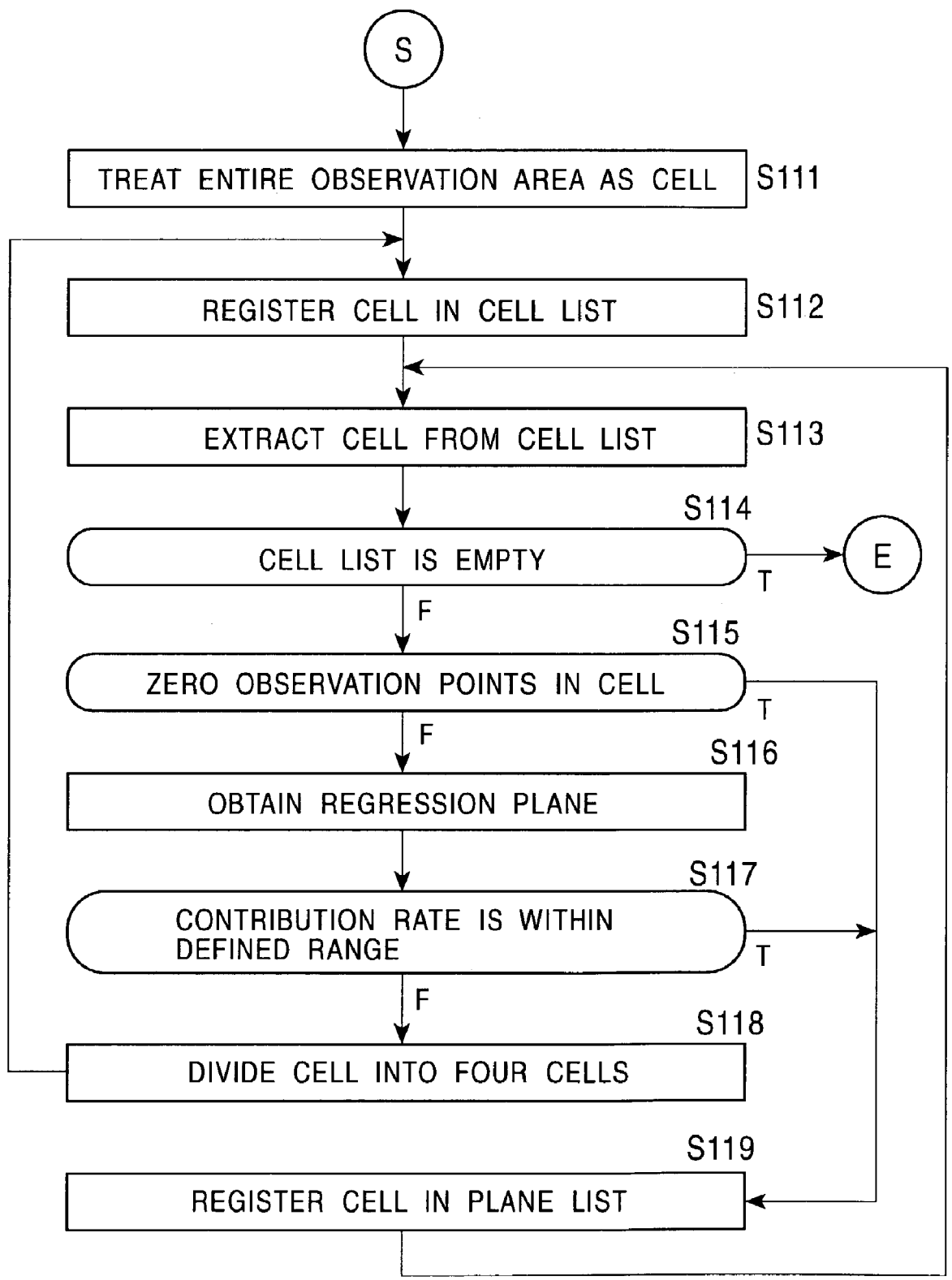
FIG. 25 is a flowchart showing a process performed in the modification shown in FIG. 22.

FIG. 25 is a flowchart showing a process of creating the plane list in the modification.

The process treats the entire observation area as a cell (step S111) and registers the cell in a cell list (step S112). The process extracts one cell at a time from the cell list (step S113). The following steps are repeatedly performed on each cell until the cell list becomes empty (step S114).

The process determines whether the extracted cell contains zero observation points (step S115). When the extracted cell contains no observation point, the cell is registered in the plane list (step S119). Then, the process returns to step S113 and performs the processing on the next cell in the cell list.

In contrast, when the extracted cell contains at least one observation point, a regression plane is estimated by the least squares method on the basis of altitude information at each observation point in the cell (step S116). The contribution rate is determined on the basis of whether or not a correlation coefficient of the estimated regression plane falls below a predetermined value (step S117).

When the contribution rate is within a range defined by the predetermined value (e.g., when the contribution rate falls below the predetermined value), the corresponding cell is registered in the plane list (step S119). Then, the process returns to step S113 and performs the processing on the next cell in the cell list.

In contrast, when the contribution rate is outside the defined range, it is considered that the corresponding cell cannot be fitted to the regression plane. The corresponding cell is divided into four cells by bisecting the horizontal and vertical sides (step S118). The process returns to step S112 and registers the cells in the cell list.

D. Plane Integration

Figure 21:
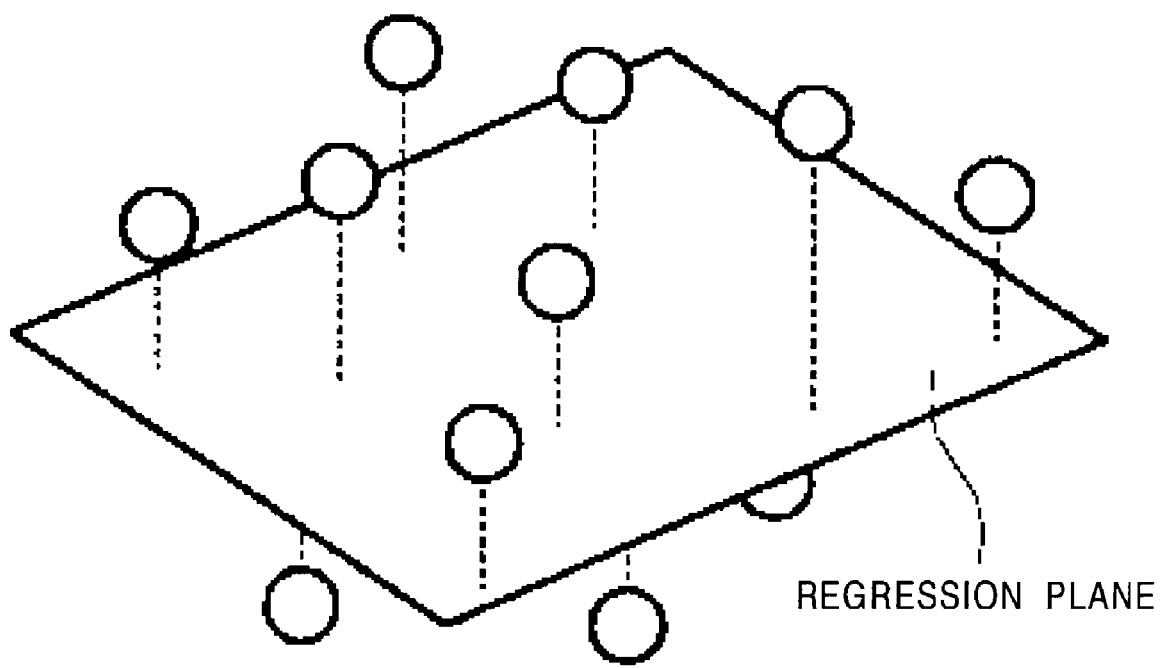
FIG. 21 is an illustration of a regression plane that has been fitted on the basis of observation points contained in each cell.

In plane integration, the least squares method is performed on the basis of altitude information at observation points included in a corresponding plane and a plane to be integrated with the corresponding plane (hereinafter referred to as a partner plane) to estimate corresponding regression planes (see FIG. 21). If a correlation coefficient exceeds a predetermined value, the two planes are identified as the same plane and are thus integrated with each other.

Figure 26:
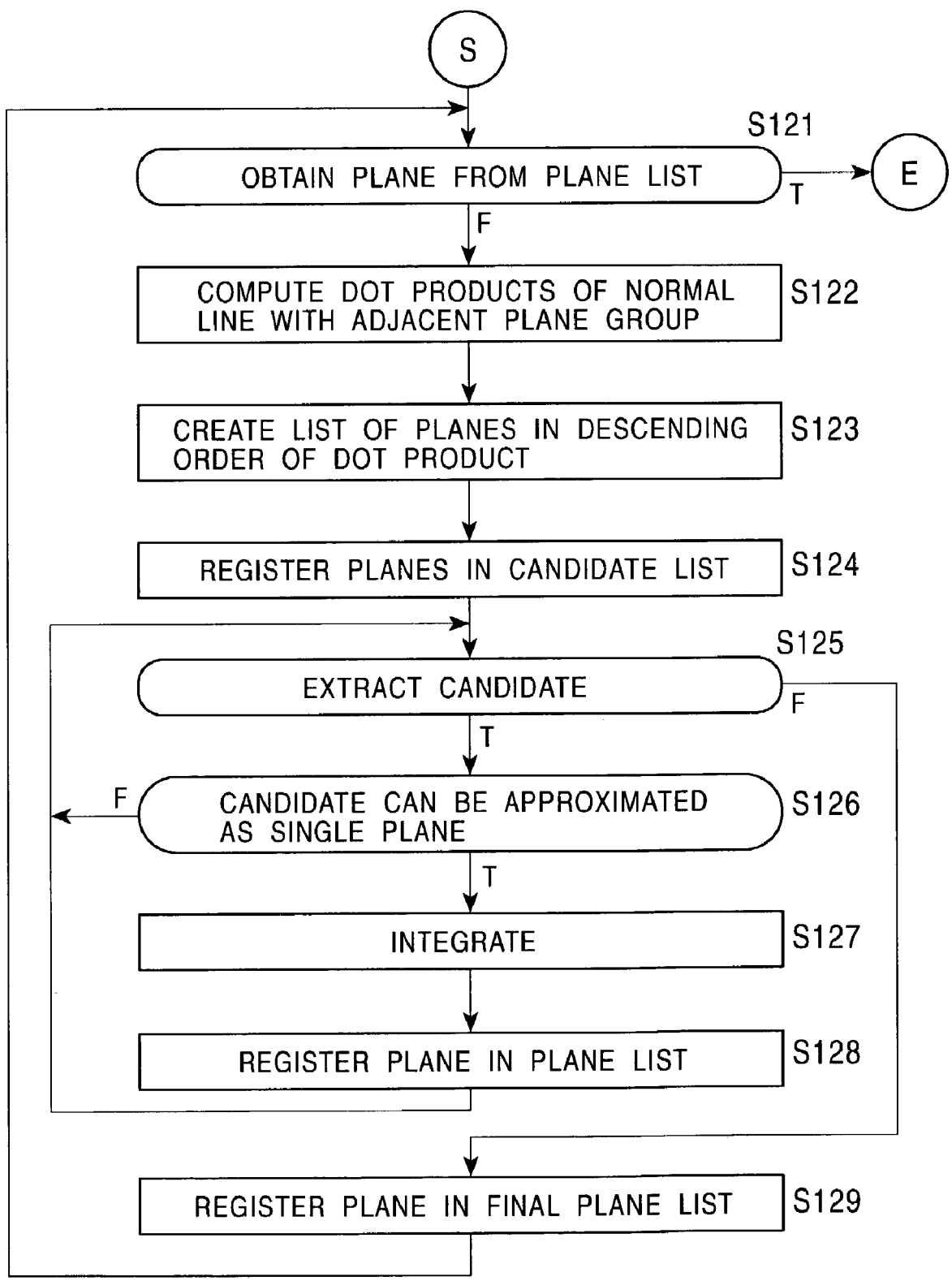
FIG. 26 is a flowchart showing a process of performing plane integration.

FIG. 26 is a flowchart showing a process of performing plane integration.

The process obtains a plane from the plane list (step S121). The planes in the plane list are arranged in ascending order of area. When planes have the same area, the process obtains the older one first. Accordingly, the plane integration process is designed to process the planes, starting with that with the smallest area first.

As indices of the plane integration, the process calculates the dot products of the normal vector of the plane and the normal vectors of a group of adjacent planes (step S122).

Excluding planes located along the border of the observation area and planes having ridges that are determined to be not capable of plane integration, the process creates a candidate list for the plane integration, which contains candidate planes arranged in descending order of the dot product (step S123), and the process registers the candidate planes (step S124). Since cells located at the border of the observation area contain a fewer observation points and are susceptible to noise, these cells are not integrated with the other planes. Accordingly, noise propagation is prevented.

The process extracts candidates one at a time from the candidate list, starting with that having the largest index of plane integration (step S125), and conducts an integration test to determine whether or not the candidate can be approximated as a single plane (step S126). The integration test is conducted by estimating regression planes by the least squares method on the basis of altitude information at each observation point included in the corresponding plane and the partner plane and determining whether or not a correlation coefficient thereof exceeds a predetermined value.

When the plane is integrated with the partner plane (step S127), the partner plane is deleted from the plane list, and the resultant plane is added to the plane list (step S128). When the plane cannot be integrated with any other plane in the plane list (step S125), the plane is registered in a final plane list (step S129).

In this manner, all the planes in the plane list are integrated as much as possible, and the resultant planes are registered in the final plane list (step S129).

A cell has its vertices v and cell boundary e. A plane is described in terms of the structure of ridges generated by linking vertices, using the vertices v and cell boundary e of a cell constructing the plane. When a plane is integrated with an adjacent cell or plane, the plane links the vertices of the adjacent cell or plane to create a new ridge structure.

Figure 27:
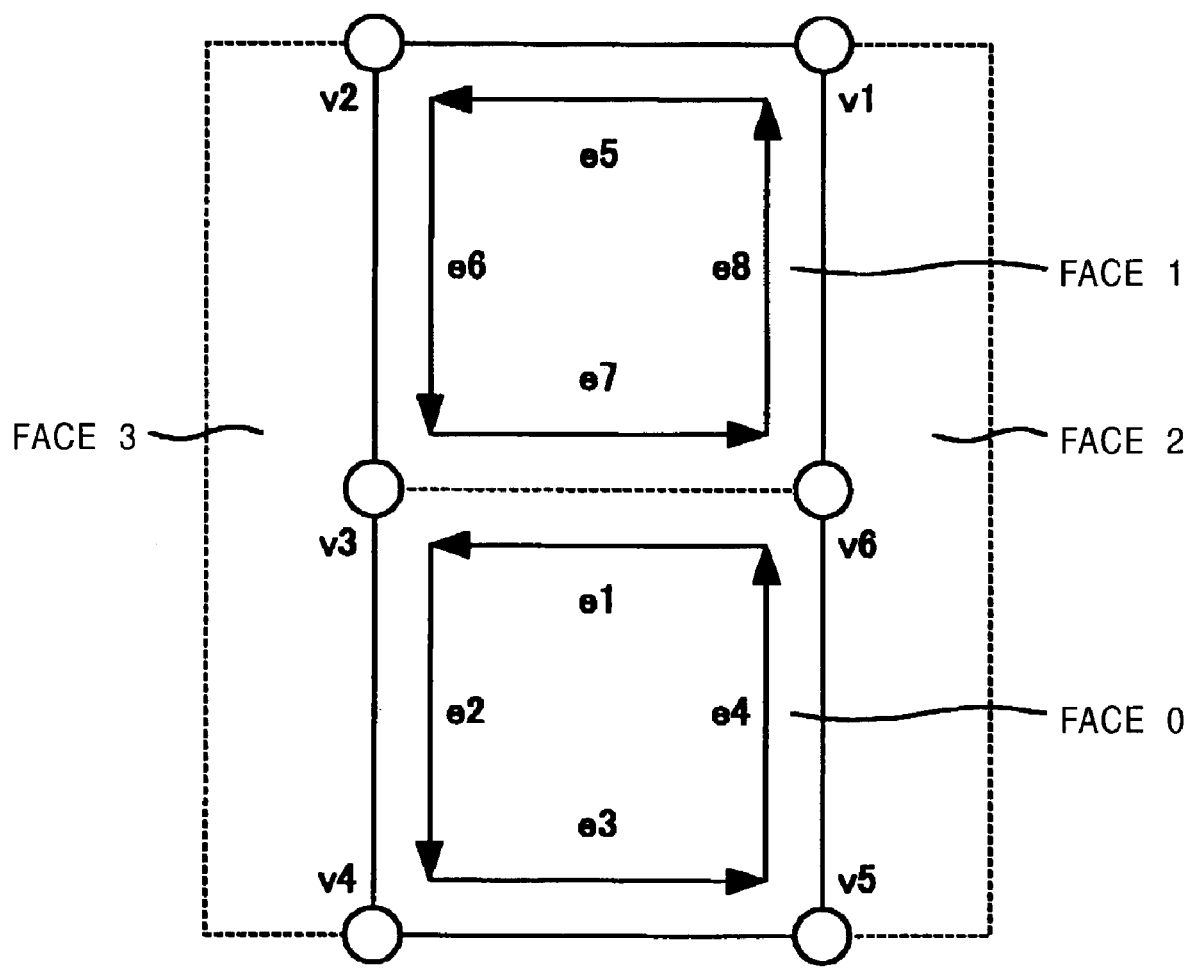
FIG. 27 is an illustration of the manner in which the linked-vertices (ridges) structure changes as a result of plane integration.

FIG. 27 shows the manner in which the linked-vertices (ridges) structure changes as a result of plane integration. Referring to FIG. 27, four faces (face 0 to face 3) are shown. Having passed the integration test (described above), face 0 and face 1 are integrated with each other. Face 0 has vertices v3, v4, v5, and v6 and ridges e1, e2, e3, and e4 connecting the vertices v3, v4, v5, and v6. Face 1 has vertices v1, v2, v3, and v6 and ridges e5, e6, e7, and e8 connecting the vertices v1, v2, v3, and v6. The boundary between face 0 and face 1 includes ridge e1 and ridge e7. Face 0 and face 1 share vertices v3 and v6.

Figure 28:
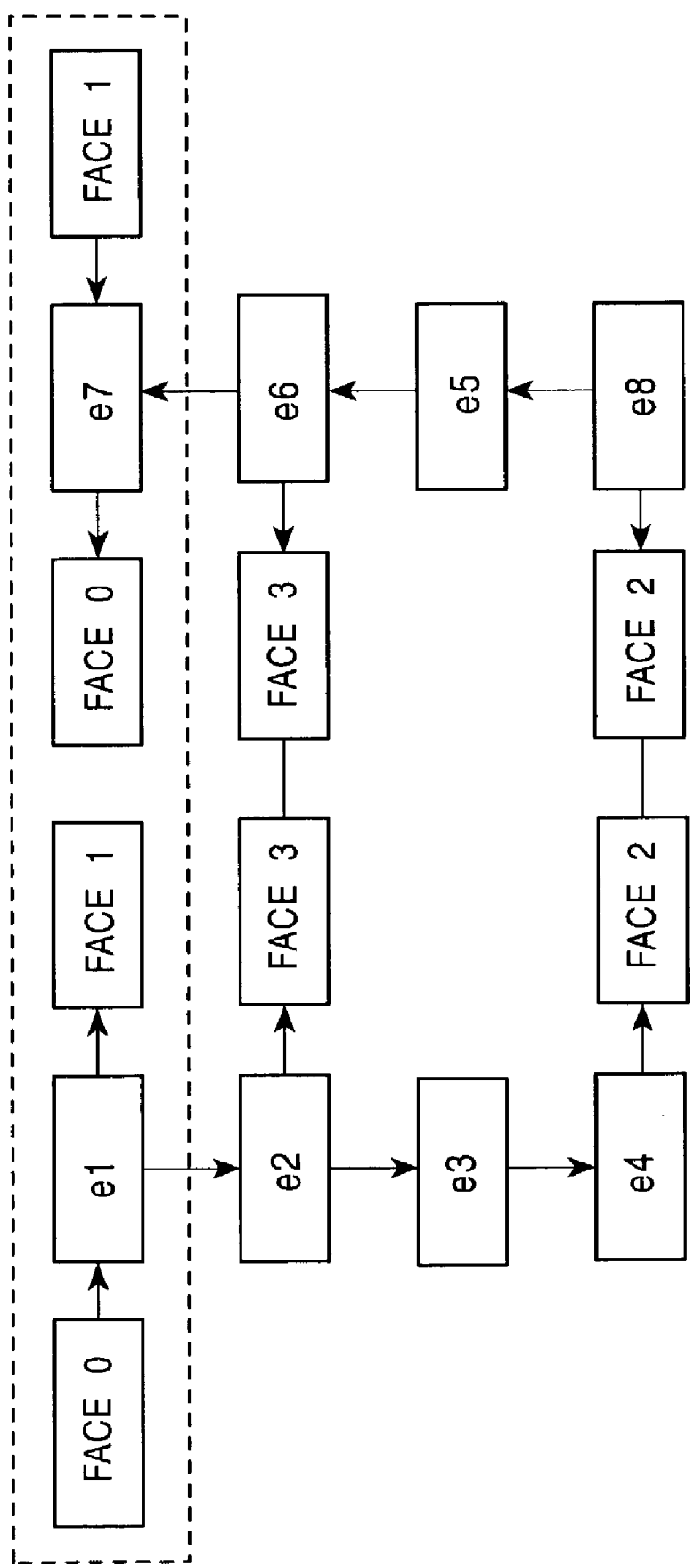
FIG. 28 is a diagram of the ridge structure of face 0 and face 1 prior to the plane integration.

FIG. 28 shows the ridge structure of face 0 and face 1 prior to the plane integration. As shown in FIG. 28, face 0 has ridges e1, e2, e3, and e4 and is in contact with face 1 at ridge e1. Face 0 is also in contact with face 3 and face 2 at ridges e2 and e4, respectively. Face 1 has ridges e5, e6, e7, and e8 and is in contact with face 0 at ridge e7. Face 1 is also in contact with face 3 and face 2 at ridges e6 and e8, respectively. As is clear from a portion surrounded by the broken line, face 0 and face 1 are linked by ridges e1–e7.

Figure 29:
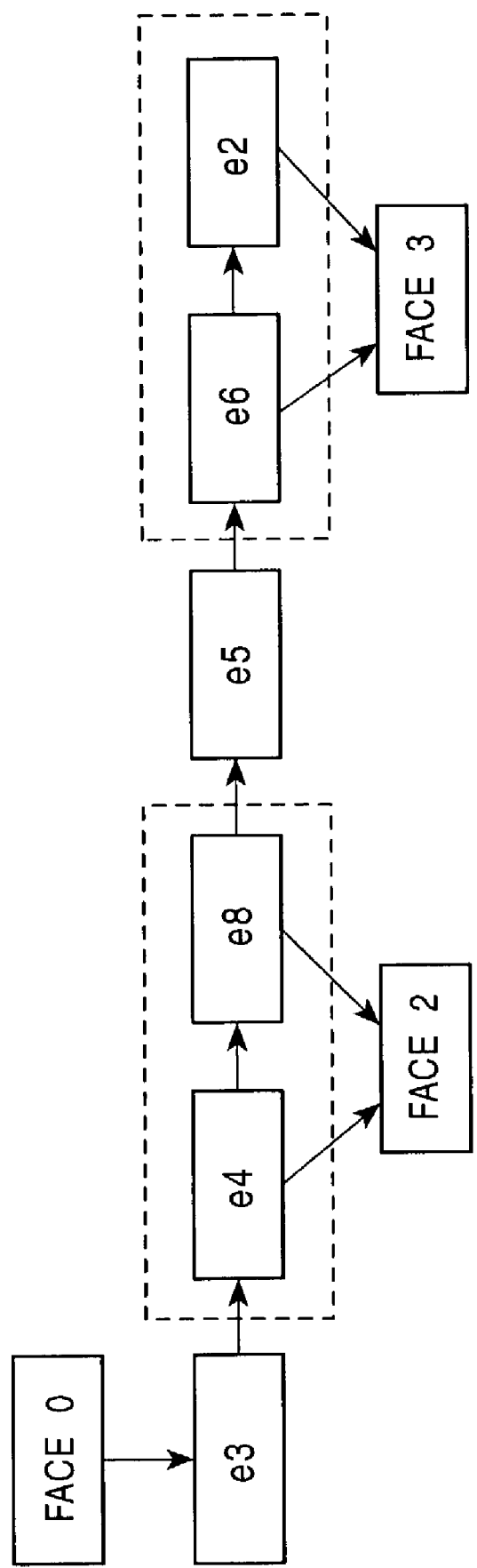
FIG. 29 is a diagram of the ridge structure during the plane integration.

FIG. 29 shows the ridge structure during the plane integration. Referring to FIG. 29, ridges e2 and e6 share face 3, and ridges e4 and e8 share face 2. These ridges thus need to be integrated with each other.

Figure 30:
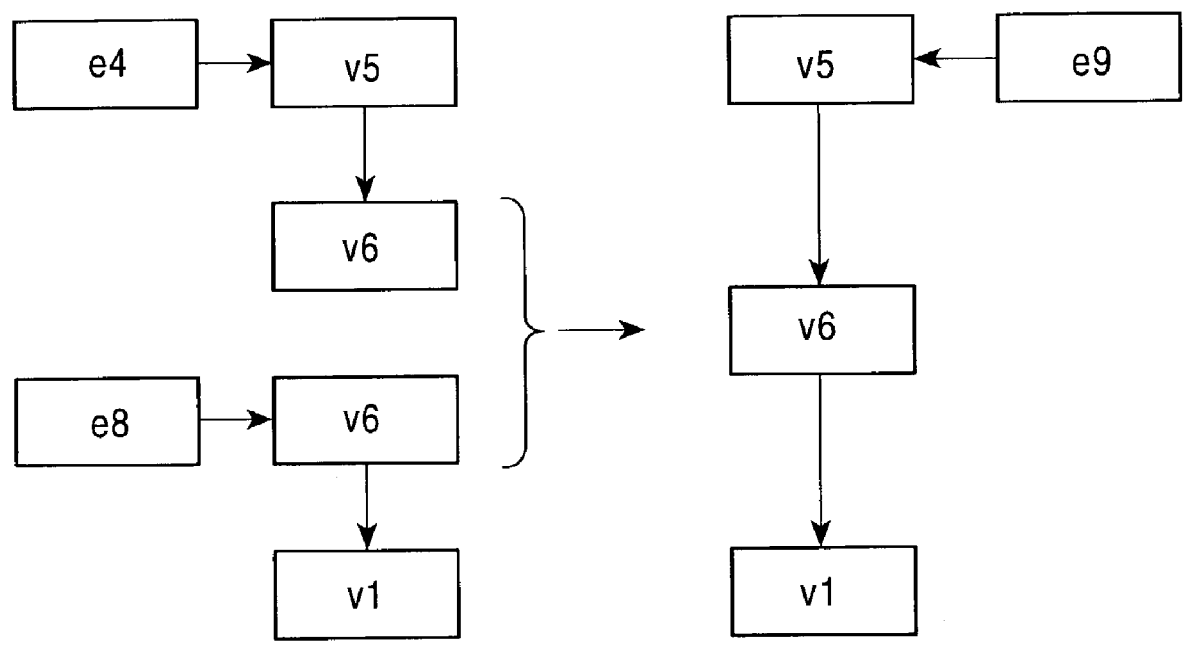
FIG. 30 is a diagram of the manner in which adjacent ridges are integrated with each other.
Figure 31:
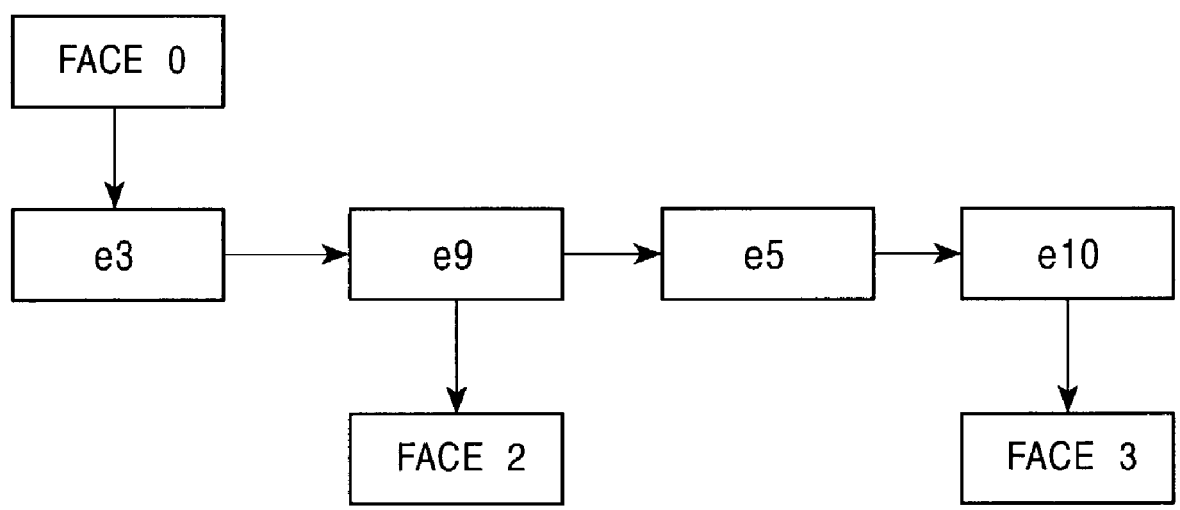
FIG. 31 is a diagram of the ridge structure including a new ridge generated by integrating the adjacent ridges.

FIG. 30 shows integration of the adjacent ridges with each other. Referring to FIG. 30, ridges e4 and e8 are integrated into one ridge. Since ridges e4 and e8 share vertex v6, ridges e4 and e8 are integrated into new ridge e9. The resultant ridge structure is shown in FIG. 31.

Figure 32:
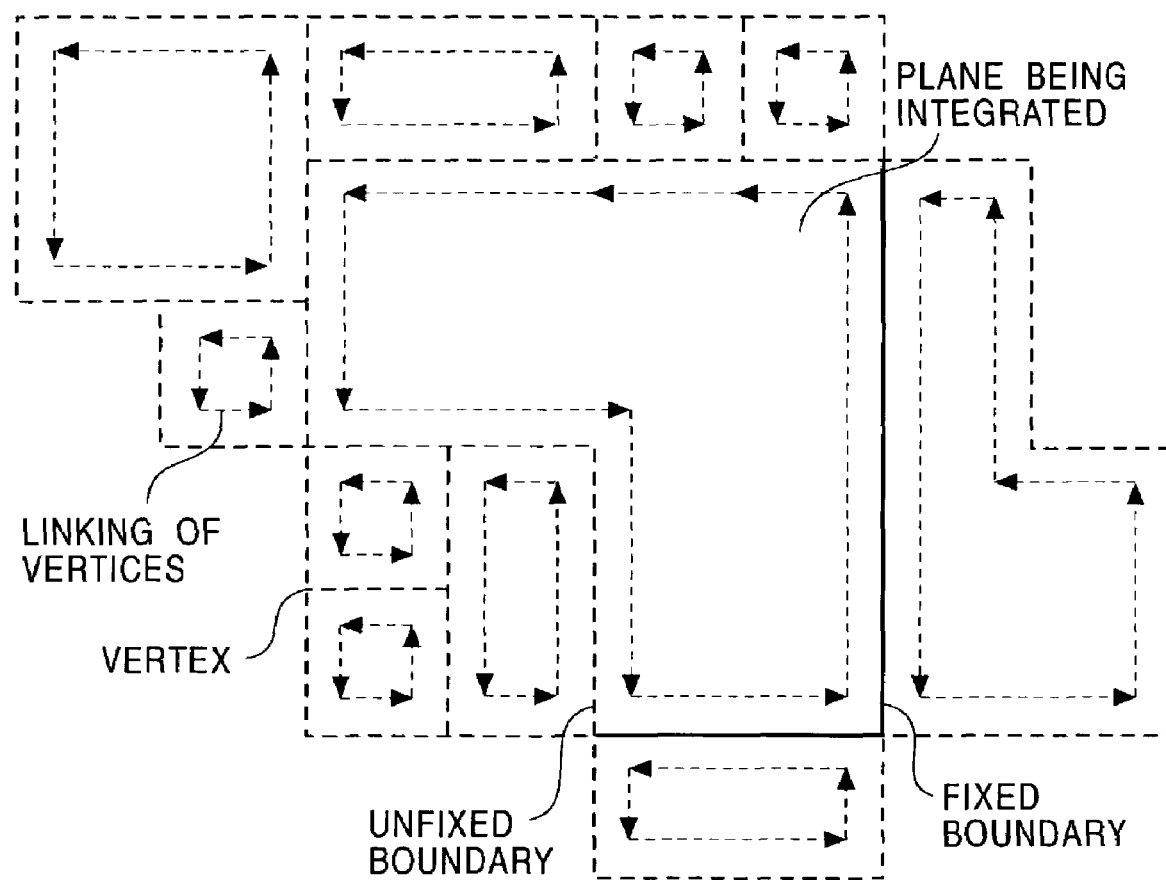
FIG. 32 is an illustration of the observation area during the plane integration.

FIG. 32 shows the observation area during the plane integration. Integration of the planes results in a change in the plane boundaries and linking of vertices. When a plane cannot be integrated with an adjacent plane, part of the plane's boundary may be fixed. The planes adjacent to each other across the fixed boundary cannot be integrated with each other.

Figure 33:
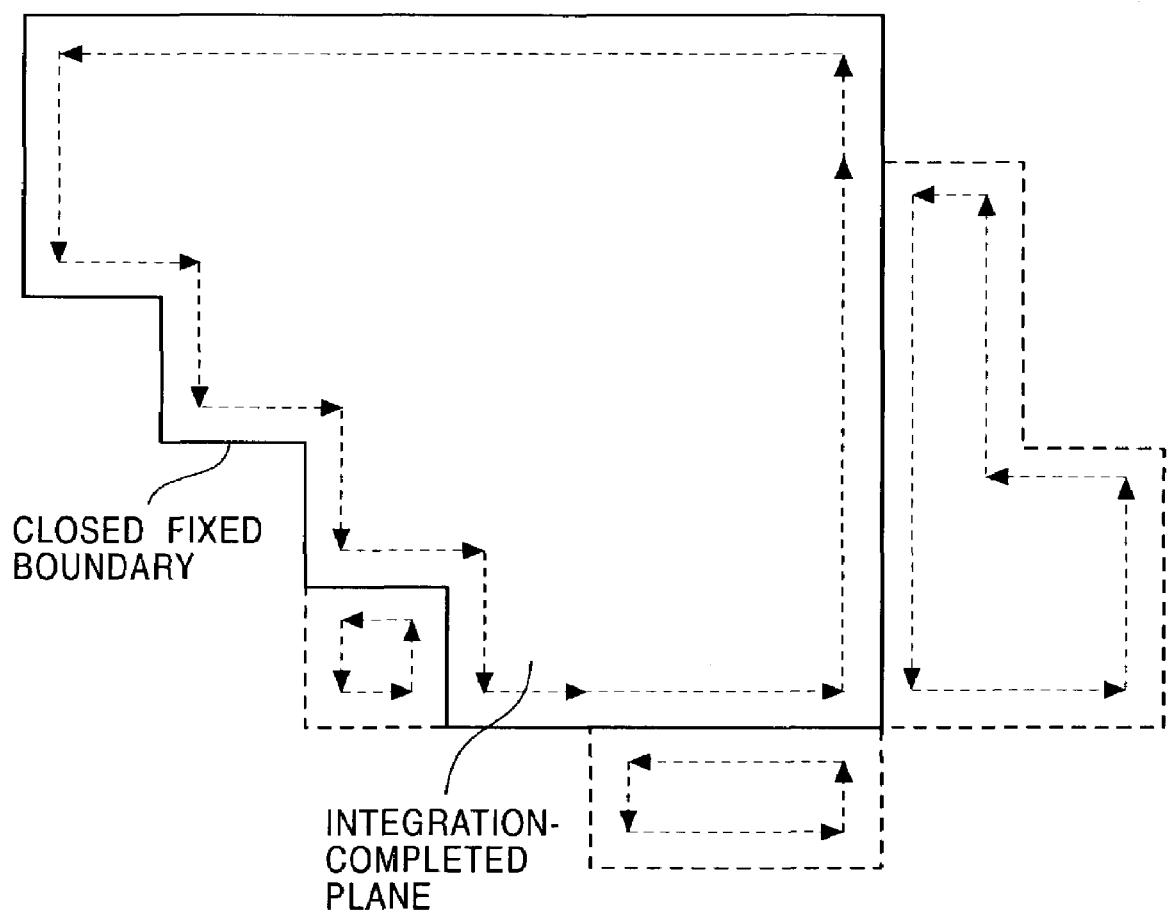
FIG. 33 is an illustration of the observation area subsequent to completion of the plane integration.

FIG. 33 shows the observation area subsequent to completion of the plane integration. Referring to FIG. 33, there is no longer an unfixed boundary. The resultant plane is registered in the final plane list.

When planes sharing the fixed boundary are subjected to integration, the fixed boundary cannot be released to integrate the planes with each other.

E. Extraction of Boundary Line (2D)

For each plane registered in the final plane list, a polyline that corresponds to the fixed boundary obtained in the previous section D and that has the minimum number of bends is obtained. At this point, the polyline is an area for specifying a two-dimensional area, and each vertex is two-dimensional.

Figure 34:
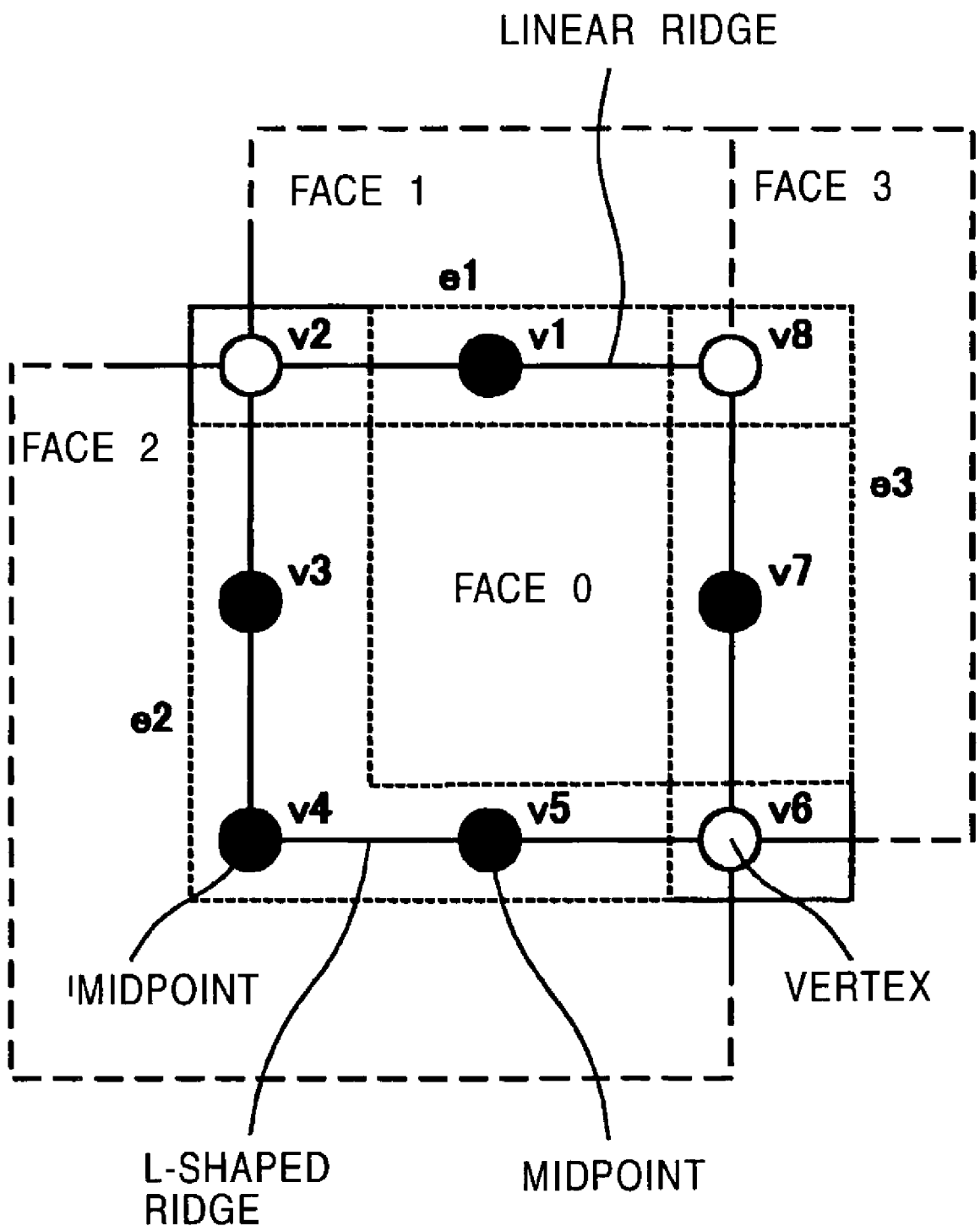
FIG. 34 is an illustration of the structure of a plane's boundary line.

FIG. 34 shows the structure of a plane's boundary line. In the example shown in FIG. 34, face 0 has ridges e1, e2, and e3 that are in contact with face 1, face 2, and face 3, respectively. Reference can be made to the adjacent planes via the corresponding ridges.

Due to the plane integration, vertices shared with the partner planes are linked (described above). In the example shown in FIG. 34, a linking of vertices v8–v1–v2 is registered with ridge e1. Similarly, a linking of vertices v2–v3–v4–v5–v6 is registered with ridge e2, and a linking of vertices v6–v7–v8 is registered with ridge e3. Ridges e1 and e3 are straight-line ridges, whereas ridge e2 is an L-shaped ridge.

Vertices v2, v6 and v8 are endpoints of the corresponding ridges and in contact with three or more planes. Therefore, vertices v2, v6 and v8 serve as the endpoints or vertices of a boundary line (2D) to be obtained by this process. Vertices v1, v3, v4, v5, and v7 other than the endpoints are treated as "midpoints" of the corresponding ridges.

Figure 35:
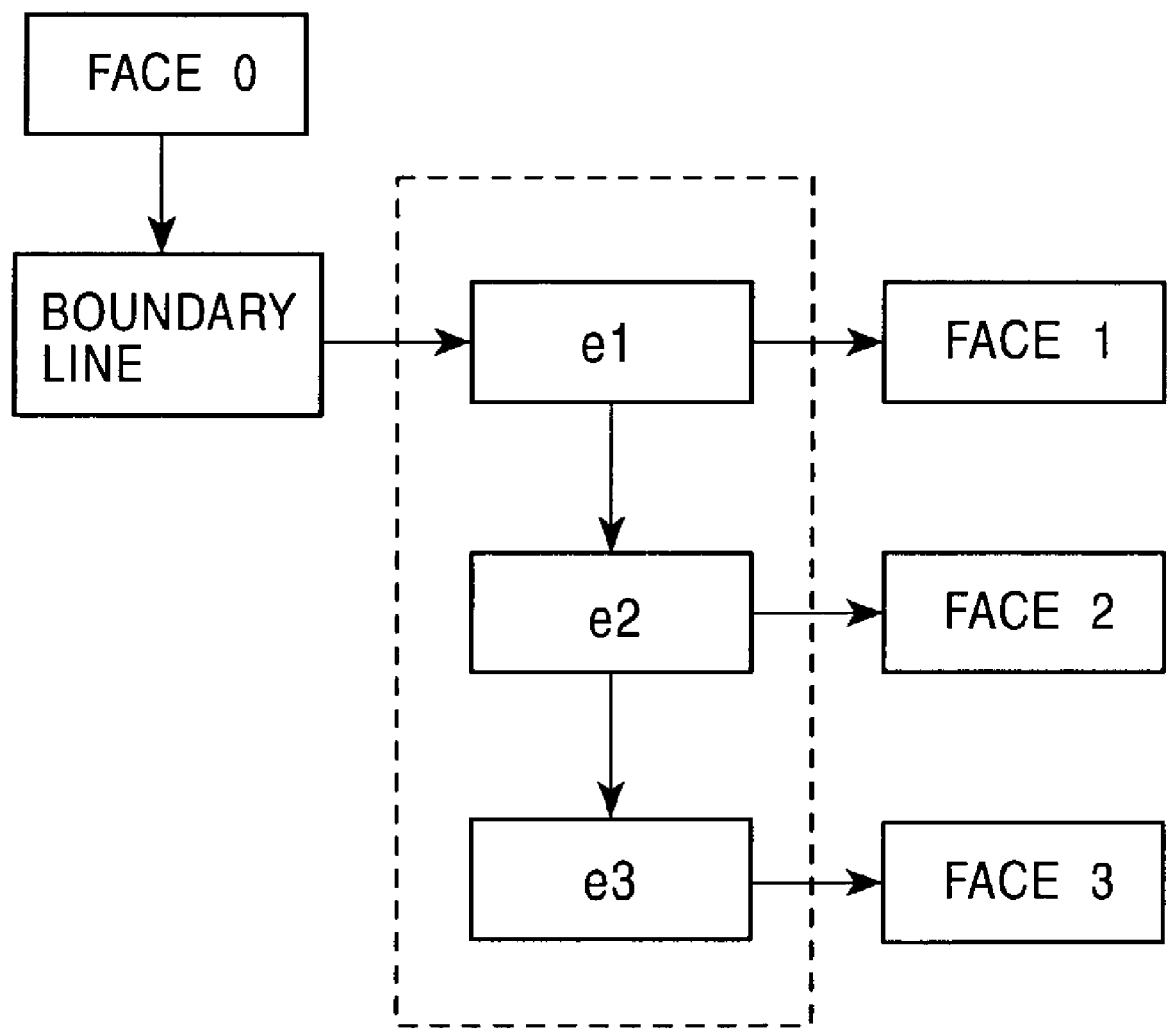
FIG. 35 is a diagram showing the linking of vertices of ridges defining a face.

FIG. 35 shows the linking of vertices of the ridges defining face 0 shown in FIG. 34. In the example shown in FIG. 35, a list of ridges e1–e2–e3 is provided via the boundary line. Ridges e1, e2, and e3 indicate faces to which reference can be made, namely, face 1, face 2, and face 3, respectively.

Figure 36:
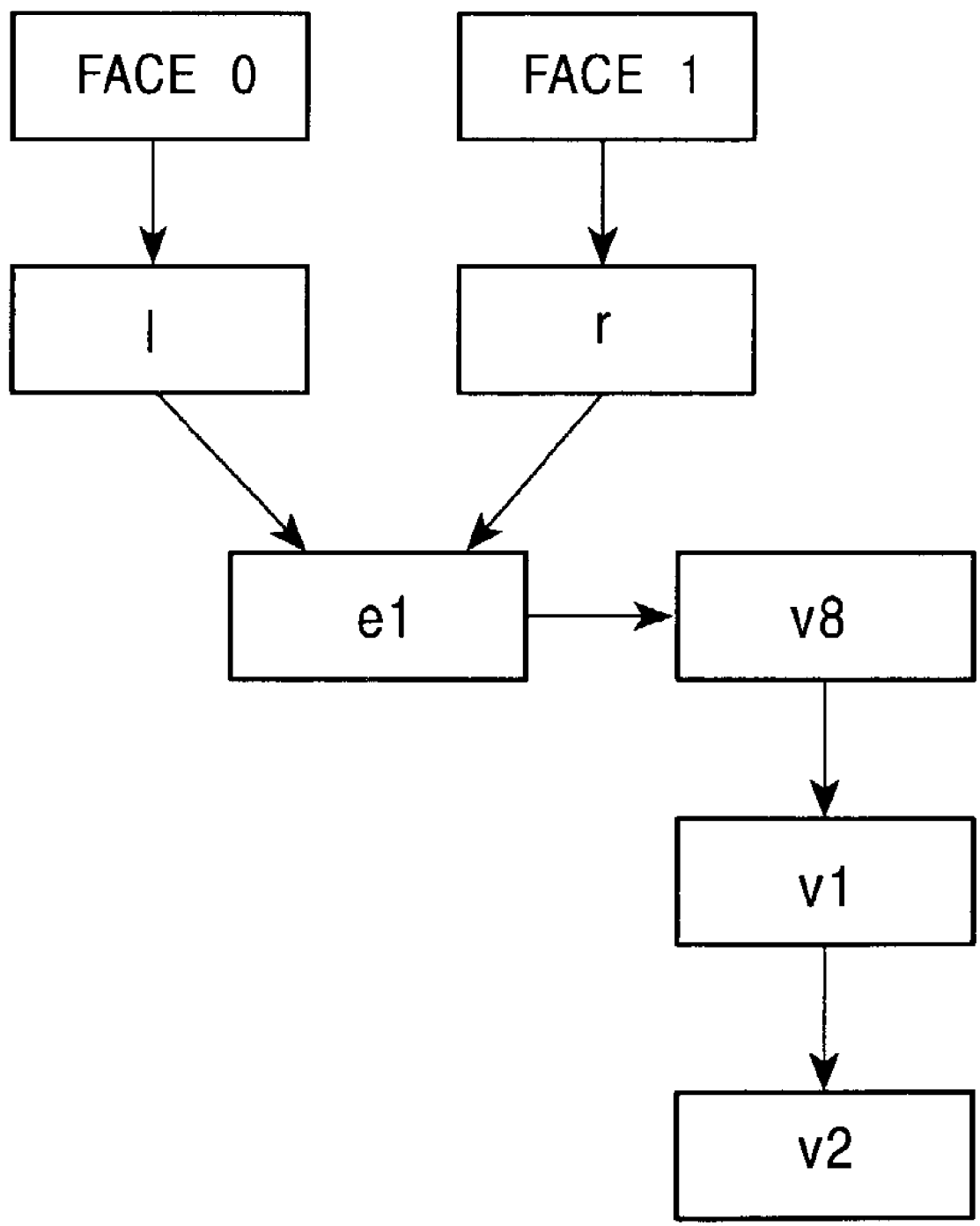
FIG. 36 is a diagram showing the linking of vertices.

FIG. 36 shows the linking of vertices of face 0 shown in FIG. 34. A ridge is shared by two planes. The linked vertices constructing the ridge are accessed in the counterclockwise direction when the planes are viewed from above.

Figure 37:
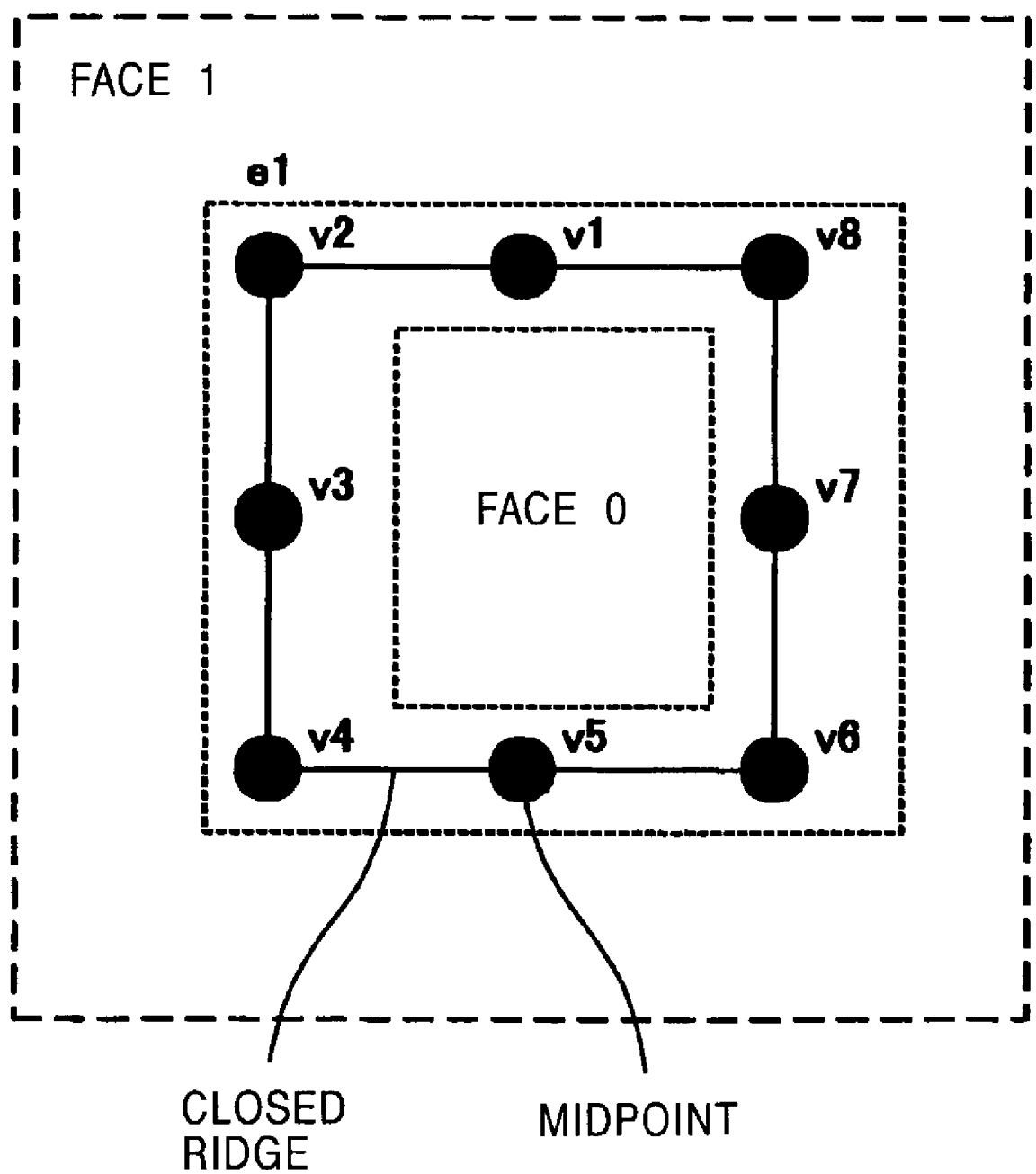
FIG. 37 is an illustration of the structure of a plane's looped boundary line.

The boundary line between the planes may be a loop such as that shown in FIG. 37. In the example shown in FIG. 37, face 0 is isolated, as if it were an island, from the surrounding face 1 by ridge e1 generated by linking vertices v1 to v8.

Figure 38:
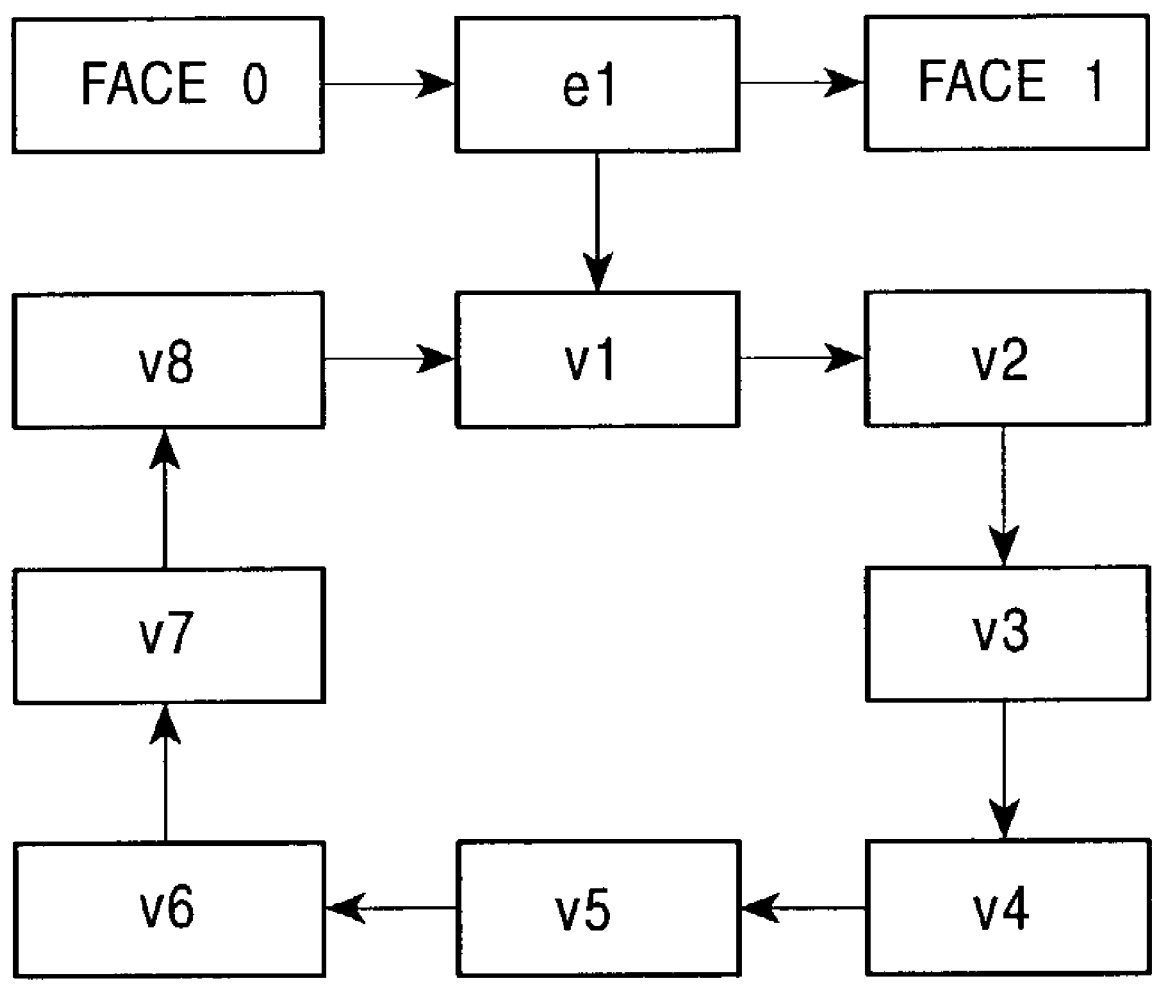
FIG. 38 is a diagram showing the structure of a vertices list of the plane defined by the looped boundary line.

FIG. 38 shows the structure of a vertices list in this case. Referring to FIG. 38, face 0 has ridge e1 and can refer to the adjacent face 1 via ridge e1. Ridge e1 consists of the linked eight vertices v1 to v8.

Figure 39:
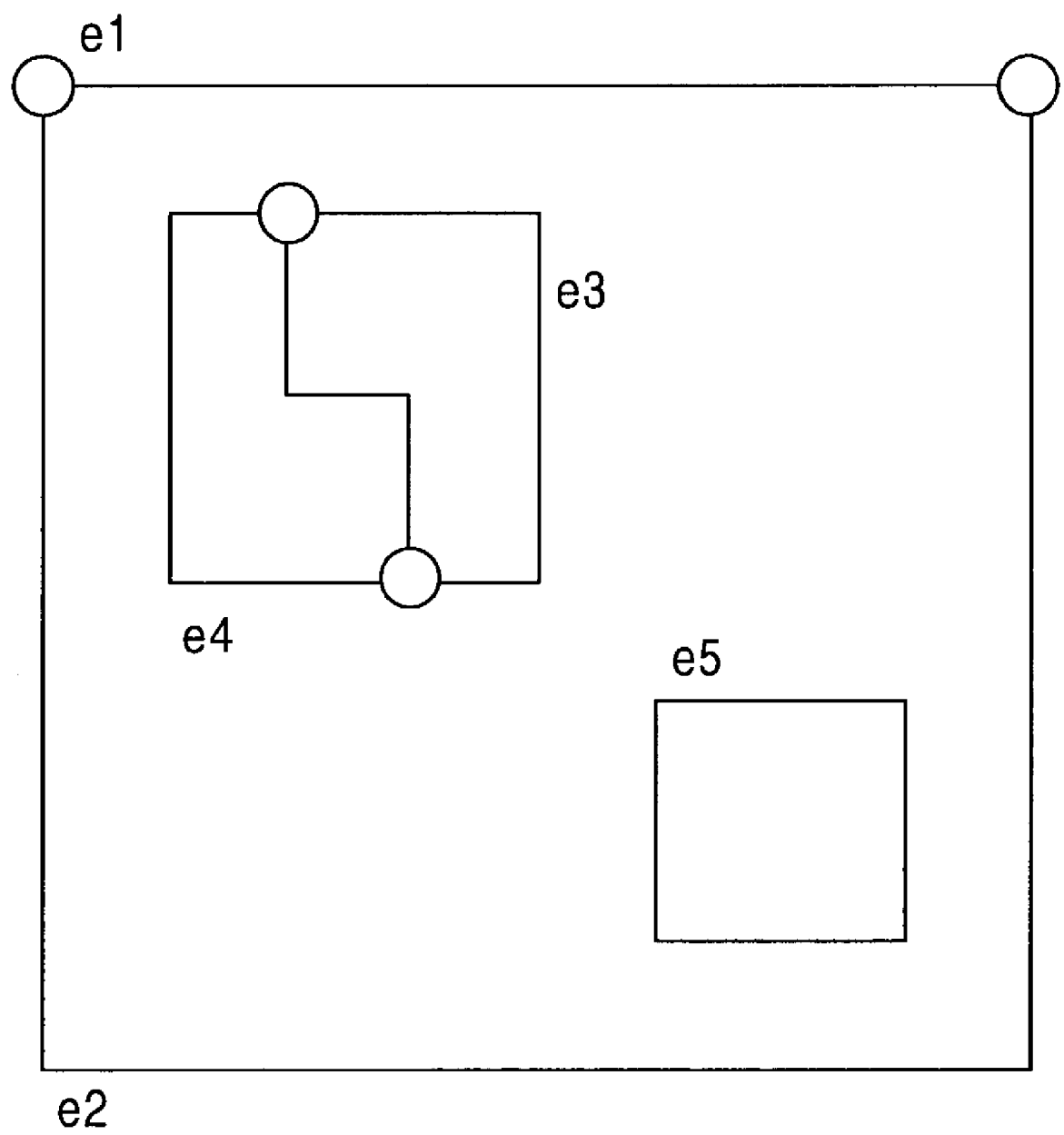
FIG. 39 is an illustration of a case in which one plane has a plurality of ridges to configure island-shaped planes.
Figure 40:
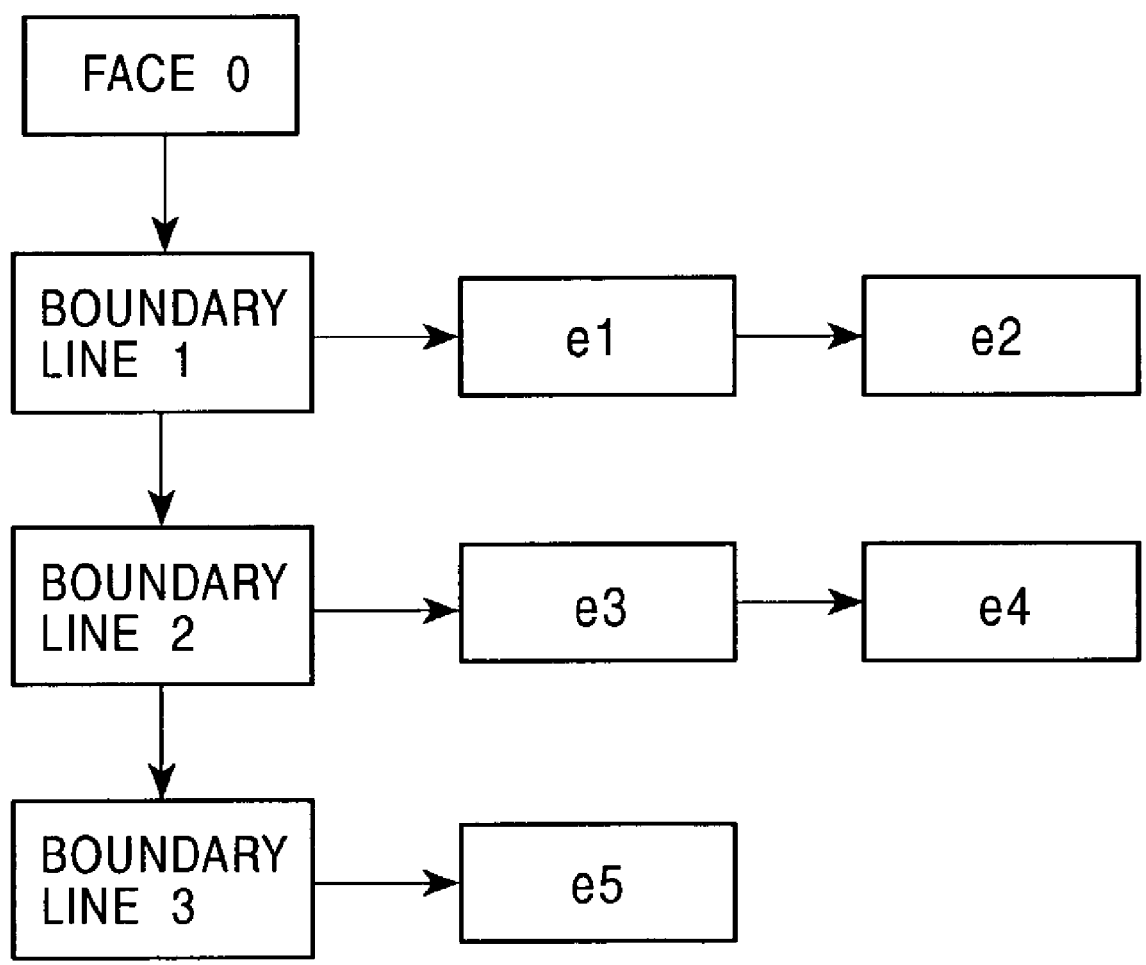
FIG. 40 is a diagram of the data structure for representing the boundary lines of the island-shaped planes.

In contrast, as shown in FIG. 39, one plane may have a plurality of ridges defining island shapes. FIG. 40 shows the data structure for representing island-like boundary lines of a plane. Referring to FIG. 40, face 0 has boundary lines 1 to 3 corresponding to the individual islands. Boundary line 1 consists of ridges e1–e2. Boundary line 2 consists of ridges e3–e4. Boundary line 3 consists of ridge e5.

Figure 41:
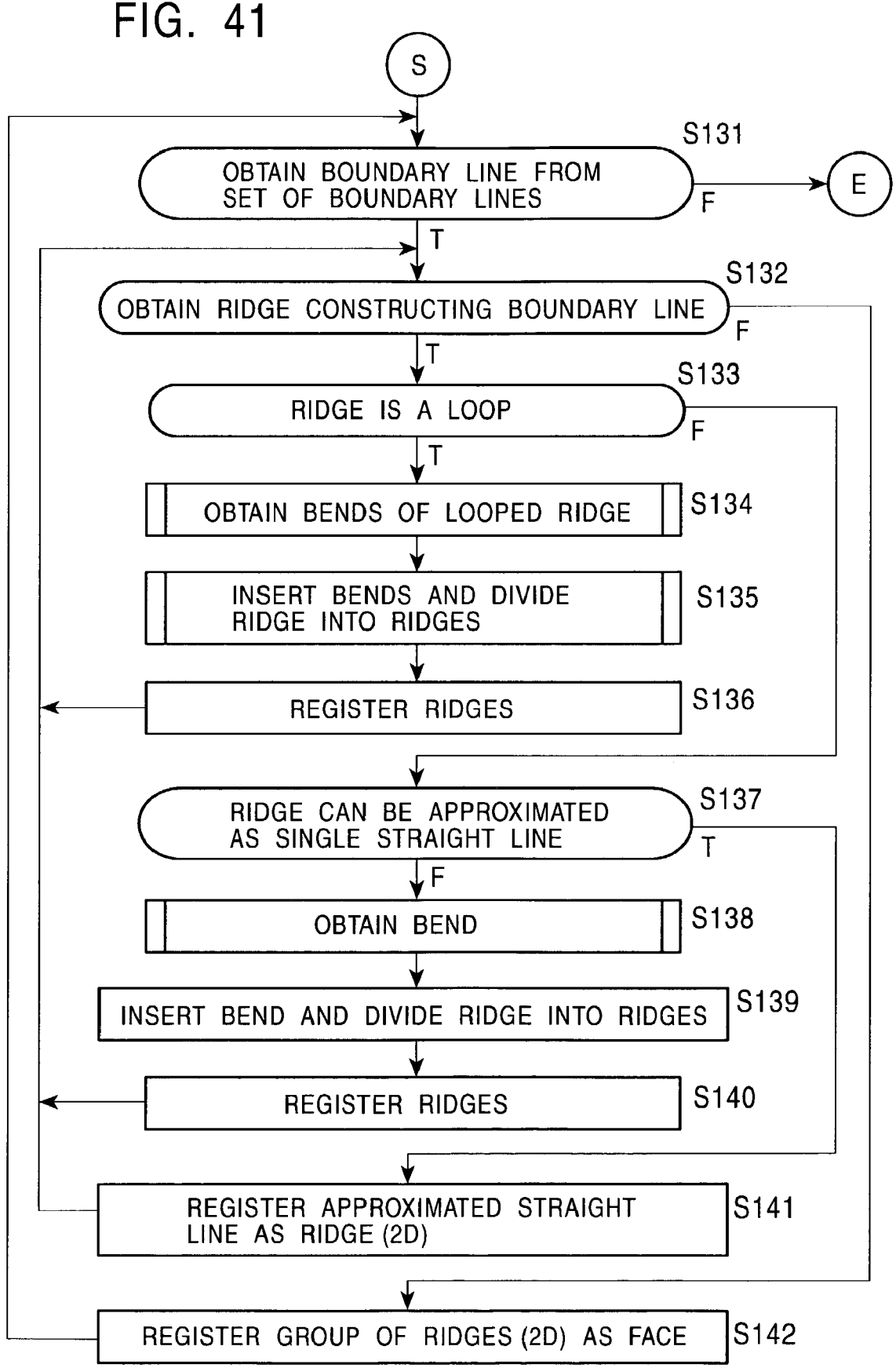
FIG. 41 is a flowchart showing a process of extracting each plane's boundary line (2D)

FIG. 41 is a flowchart showing a process of extracting each plane's boundary line (2D).

The process obtains a boundary line from a set of boundary lines constructing a plane (see FIG. 35 or FIG. 40) (step S131). The obtained boundary line is a closed polyline consisting of at least one ridge.

The process obtains the ridge constructing the boundary line (step S132) and processes the ridge, depending on whether the ridge is a loop (see FIG. 37) or not (see FIG. 34) (step S133).

When the ridge is a loop as in the former case, the process searches for bends (step S134), divides the ridge at the bends into a plurality of ridges (step S135), and registers the obtained ridges (step S136).

Figure 42:
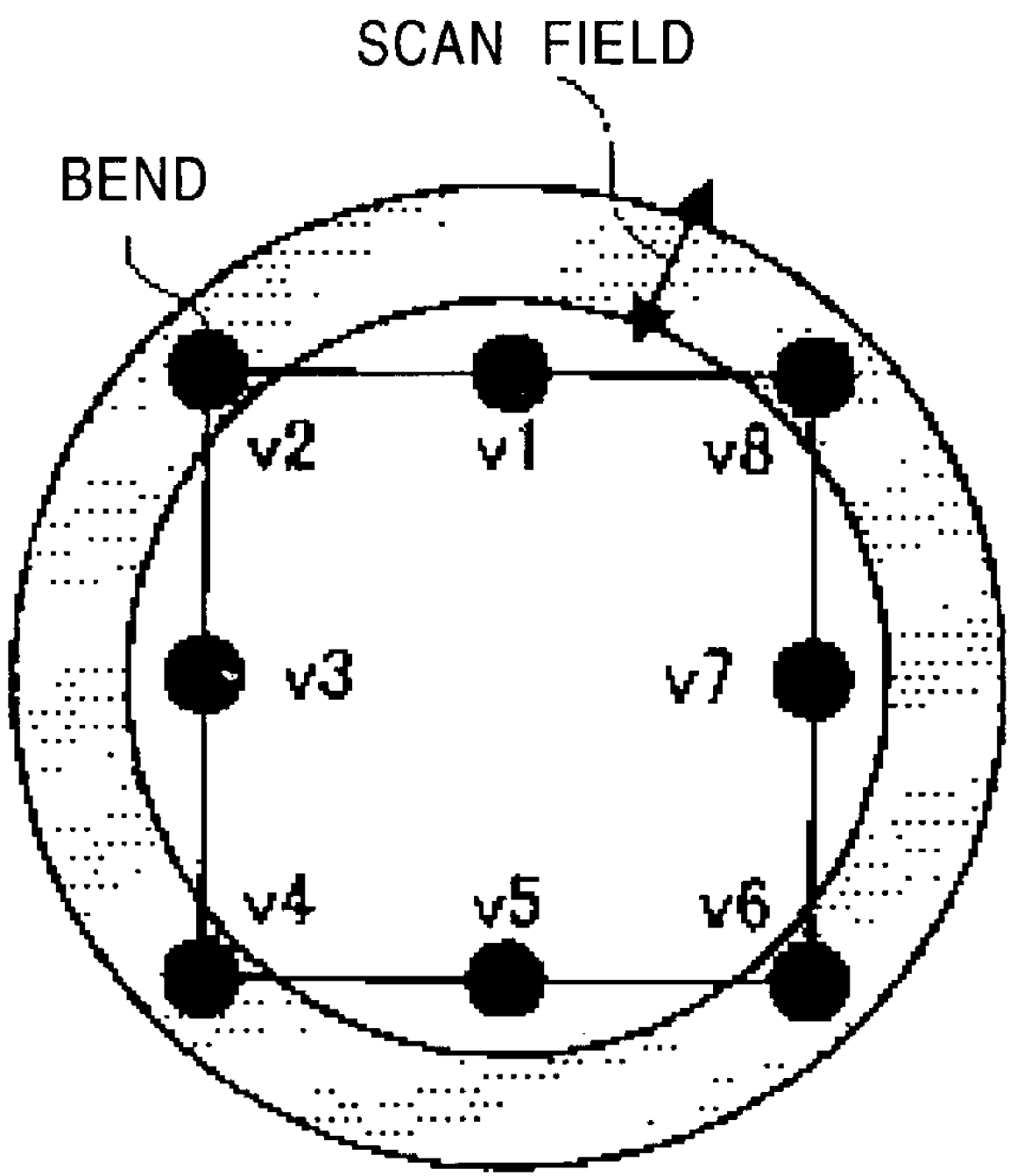
FIG. 42 is an illustration of a method for searching the looped ridge for a bend.

A method for searching a looped ridge for bends will now be described with reference to FIG. 42. As shown in FIG. 42, a circle is drawn around the center of gravity of a group of midpoints (described above) constructing the ridge. The radius of the circle is reduced to shrink the scan field down to include some midpoints, which are then adopted as bends. Two or more bends are detected, and the detected bends are inserted into the boundary line to divide the boundary line into two or more ridges. Subsequently, as in ridges adjacent to other planes, the ridges are fitted to straight lines.

Figure 44:
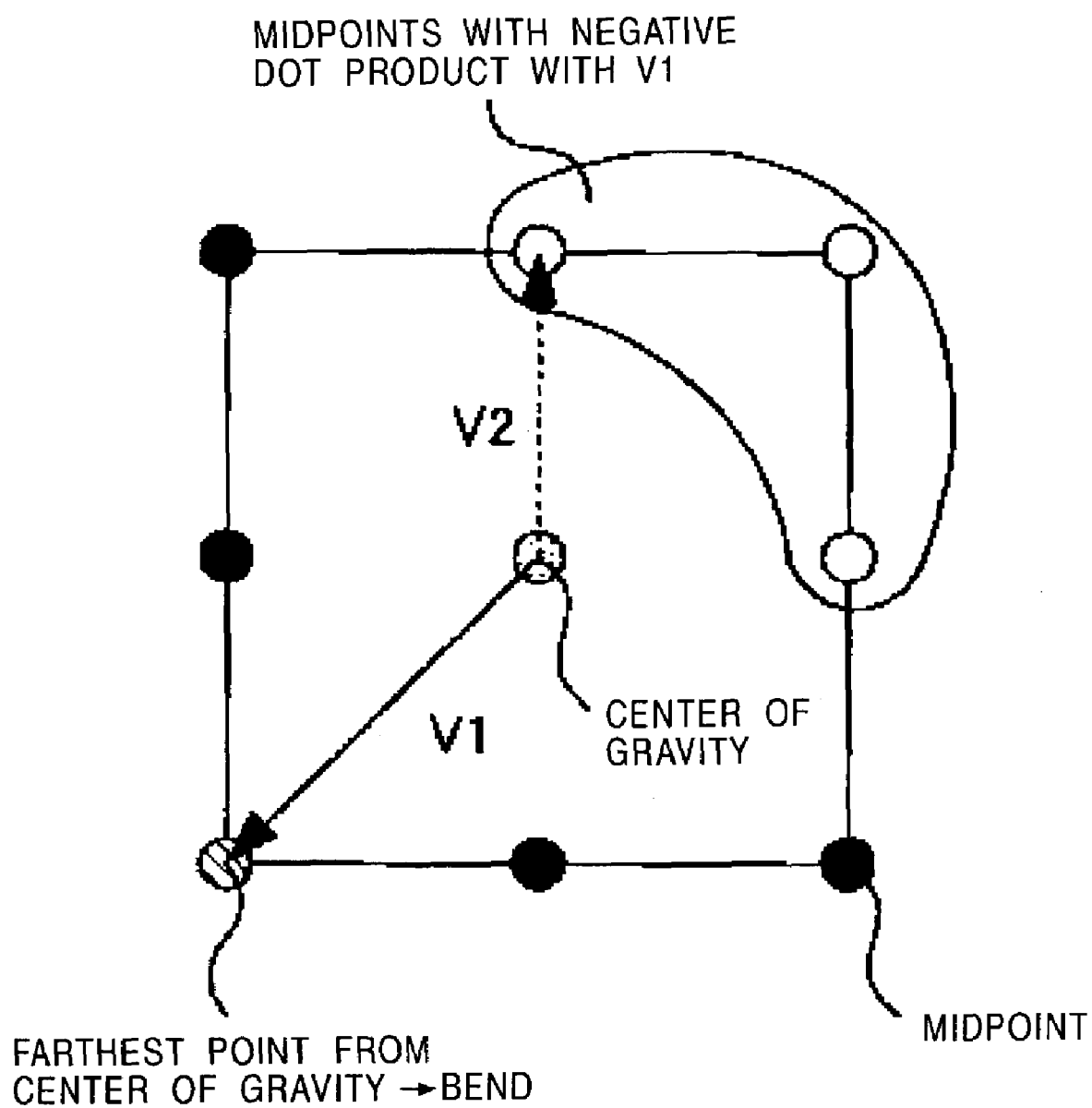
FIG. 44 is an illustration of the process shown in FIG. 43.
Figure 45:
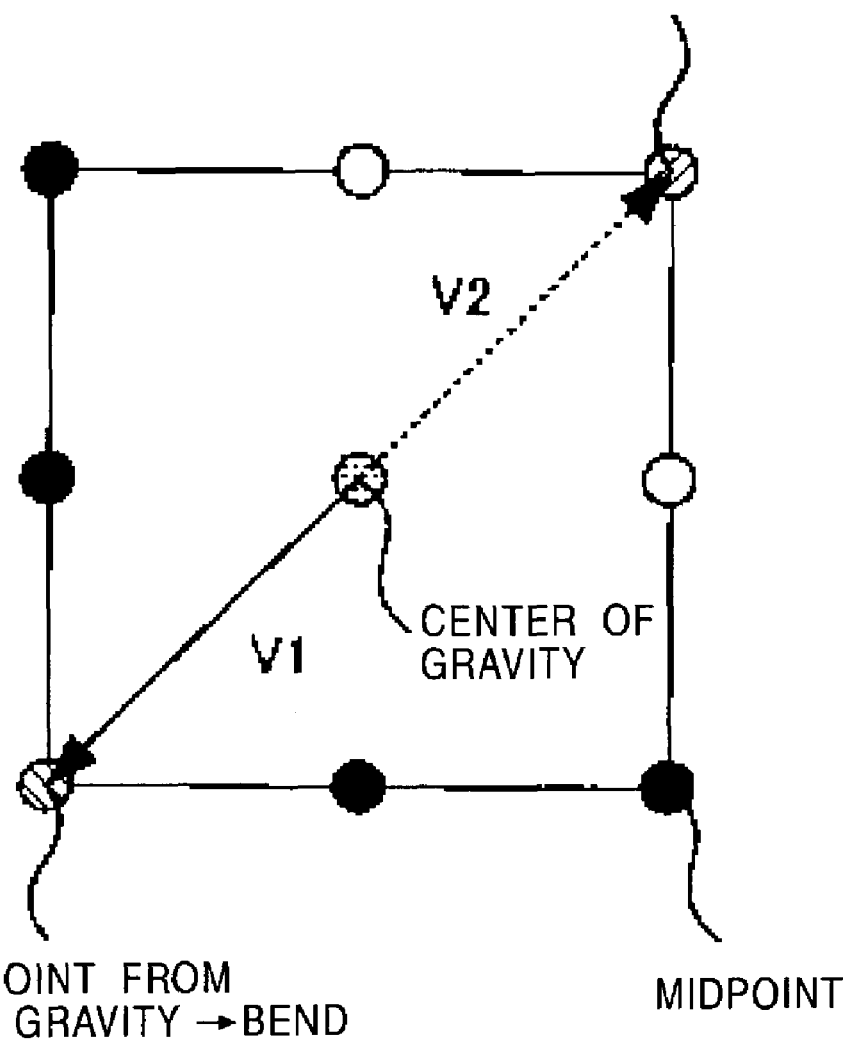
FIG. 45 is an illustration of the process shown in FIG. 43.

Two or more bends are obtained from the looped ridge. In this case, it is preferable that the bends be extracted at positions that are far from each other. An example of a process of searching a looped ridge for two or more bends will now be described with reference to FIGS. 43 to 45.

Figure 43:
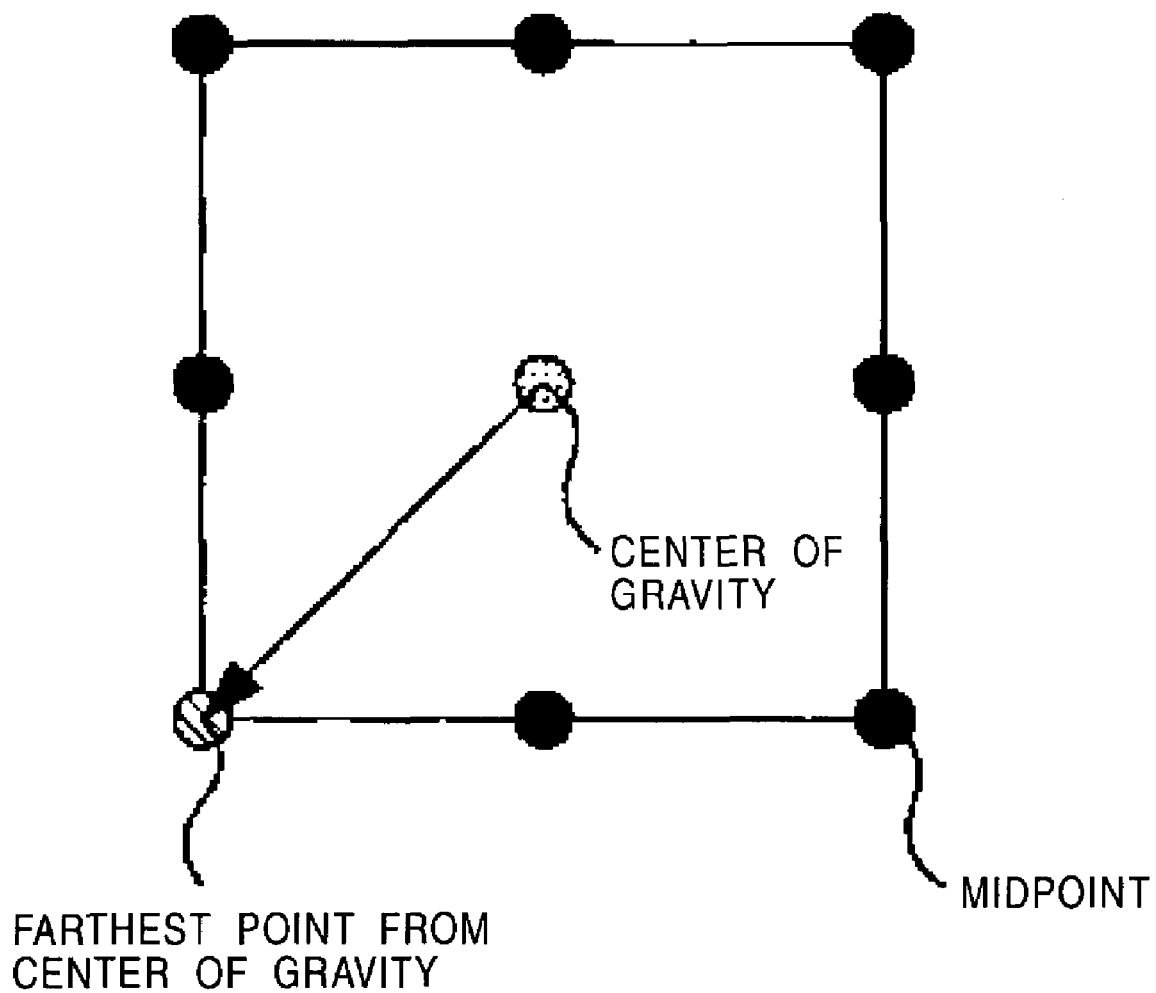
FIG. 43 is an illustration of a process of searching the looped ridge for two or more bends.

A looped ridge consists of a ridge and a plurality of midpoints on the ridge (see FIG. 43). From the midpoints on the ridge, the midpoint that is farthest from the center of gravity, that is, the farthest point, is extracted, and the extracted midpoint is set as a bend. The process then searches for midpoints having negative dot products with vector V1 directed from the center of gravity toward the farthest point (see FIG. 44). From the midpoints having negative dot products, the process selects the farthest point and sets this farthest point as a bend.

When the ridge is not a loop as in the latter case, it is determined whether or not the ridge can be approximated as a single straight line (step S137). When the ridge can be approximated as a single straight line, the approximated straight line is registered as a ridge (2D) (step S141).

When the ridge cannot be approximated as a single straight line, at least one bend is obtained on the ridge (step S138). The obtained bend is inserted into the ridge to divide the ridge into a plurality of ridges (step S139). The obtained ridges are registered (step S140).

In the example shown in FIG. 34, ridge e2 consisting of vertices v2–v3–v4–v5–v6 is L-shaped and cannot be fitted to a straight line. In such a case, a bend is detected to divide the ridge into a plurality of ridges. Division of the ridge is repeated until each separate ridge can be approximated as a straight line.

Figure 46:
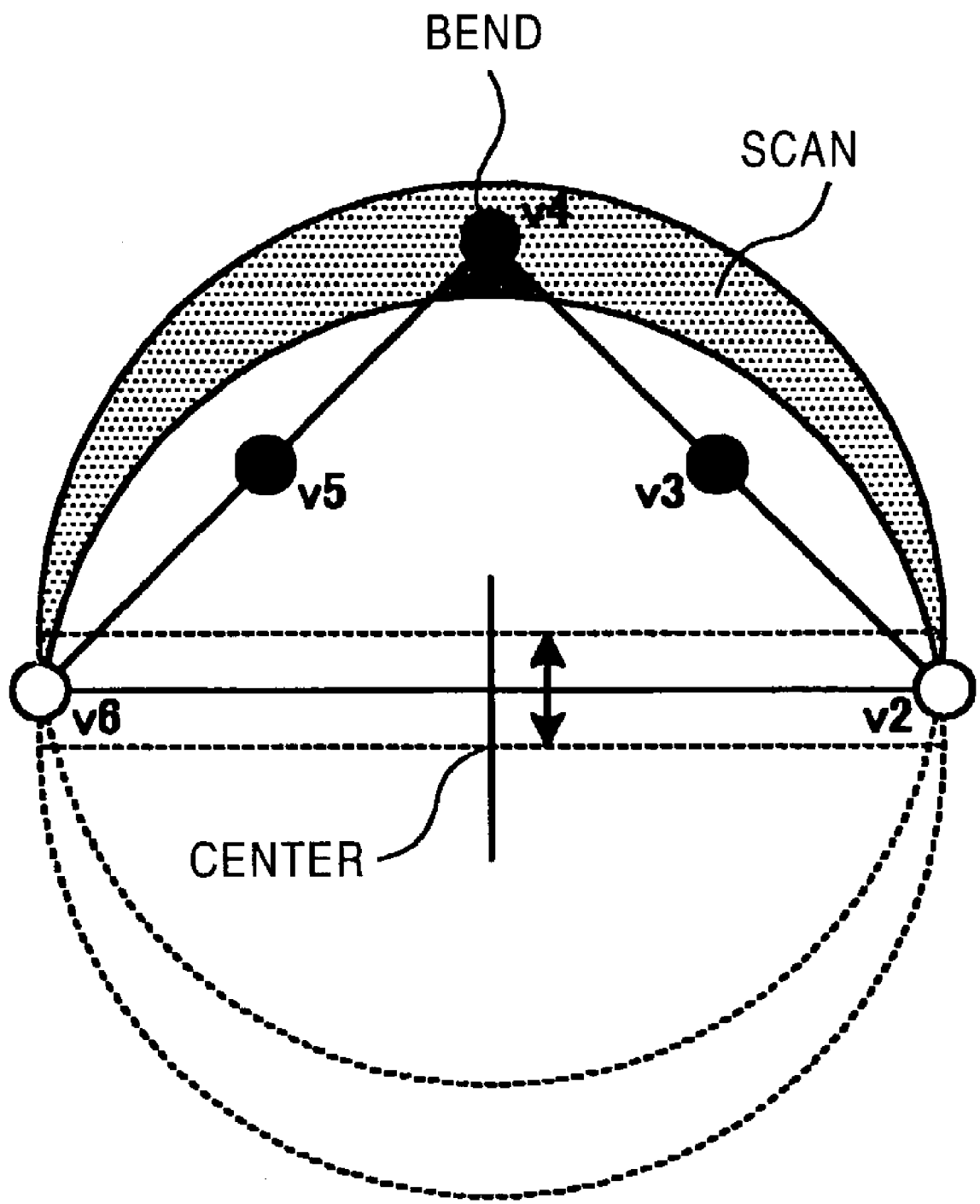
FIG. 46 is an illustration of the manner in which a ridge that is not a loop is searched for a bend.

FIG. 46 shows the manner in which a ridge that is not a loop is searched for a bend. As shown in FIG. 46, the process draws a perpendicular bisector of a line segment having vertices v2 and v6 as endpoints. The ridge is scanned with an arc that has the center on the perpendicular bisector and that passes through the endpoints to extract a bend. The ridge is then divided into two ridges at the obtained bend.

In this manner, all ridges included in one boundary line are fitted to straight lines. When this is completed, the resultant plane is registered (step S142).

Taking the actual building as an example, a process of extracting straight lines constructing a boundary line will now be described with reference to FIGS. 47 to 51.

Figure 47:
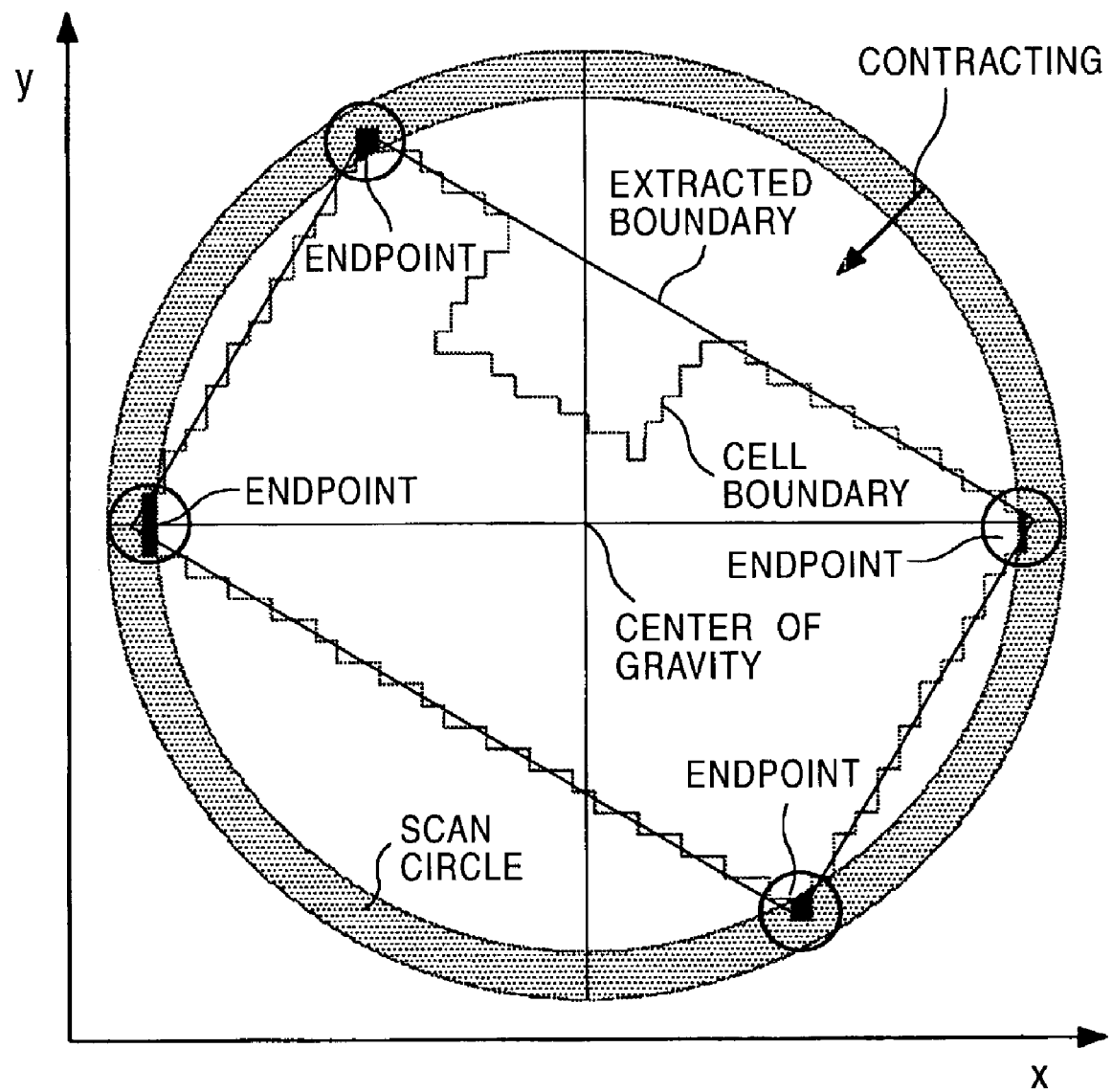
FIG. 47 is an illustration of a process of extracting straight lines constructing a boundary line from an observation area containing the actual building.

Referring to FIG. 47, a boundary line is a loop. A circle is drawn around the center of gravity of vertices. The radius of the circle is reduced to search for bends of the ridges of the loop. In the example shown in FIG. 47, four bends are detected. The original boundary line is divided into four ridges.

The four ridges obtained by the process shown in FIG. 47 are fitted to straight lines. In the example shown in FIG. 47, the three ridges are normally fitted to straight lines. On the other hand, the upper ridge has a concave portion and cannot be fitted to a straight line.

Accordingly, the upper ridge is again searched for an additional bend and repeatedly divided. As a result, as shown in FIG. 48, a bend is detected, and the ridge is divided into two ridges.

Figure 48:
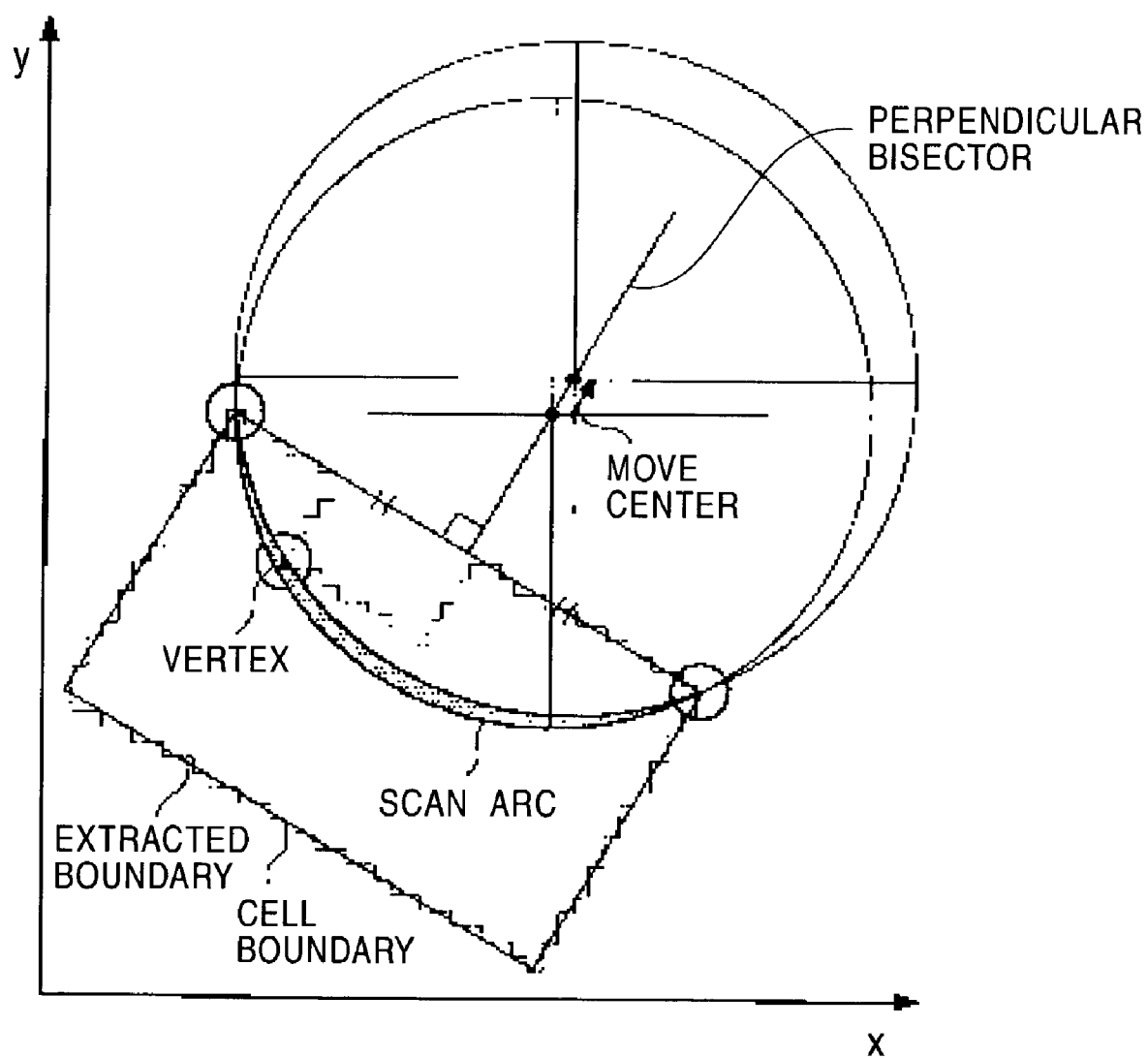
FIG. 48 is an illustration of the process shown in FIG. 47.

The two ridges obtained by the process shown in FIG. 48 are tried to be fitted to straight lines, though the fitting fails. Each of the ridges is again searched for a bend. As a result, as shown in FIG. 49, an additional bend is detected from each of the ridges, and the ridges are divided into a total of four ridges.

Figure 49:
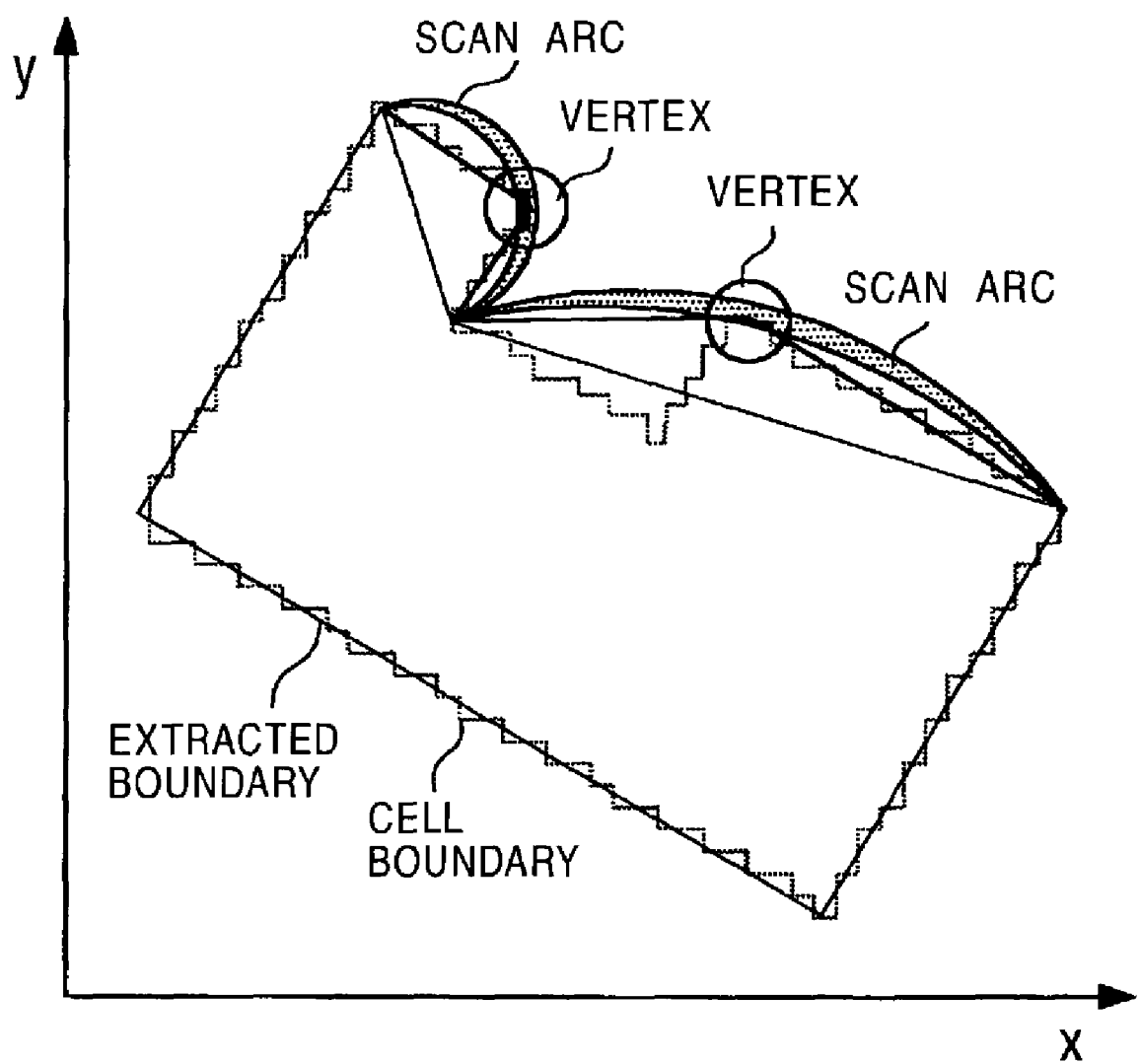
FIG. 49 is an illustration of the process shown in FIG. 47.
Figure 50:
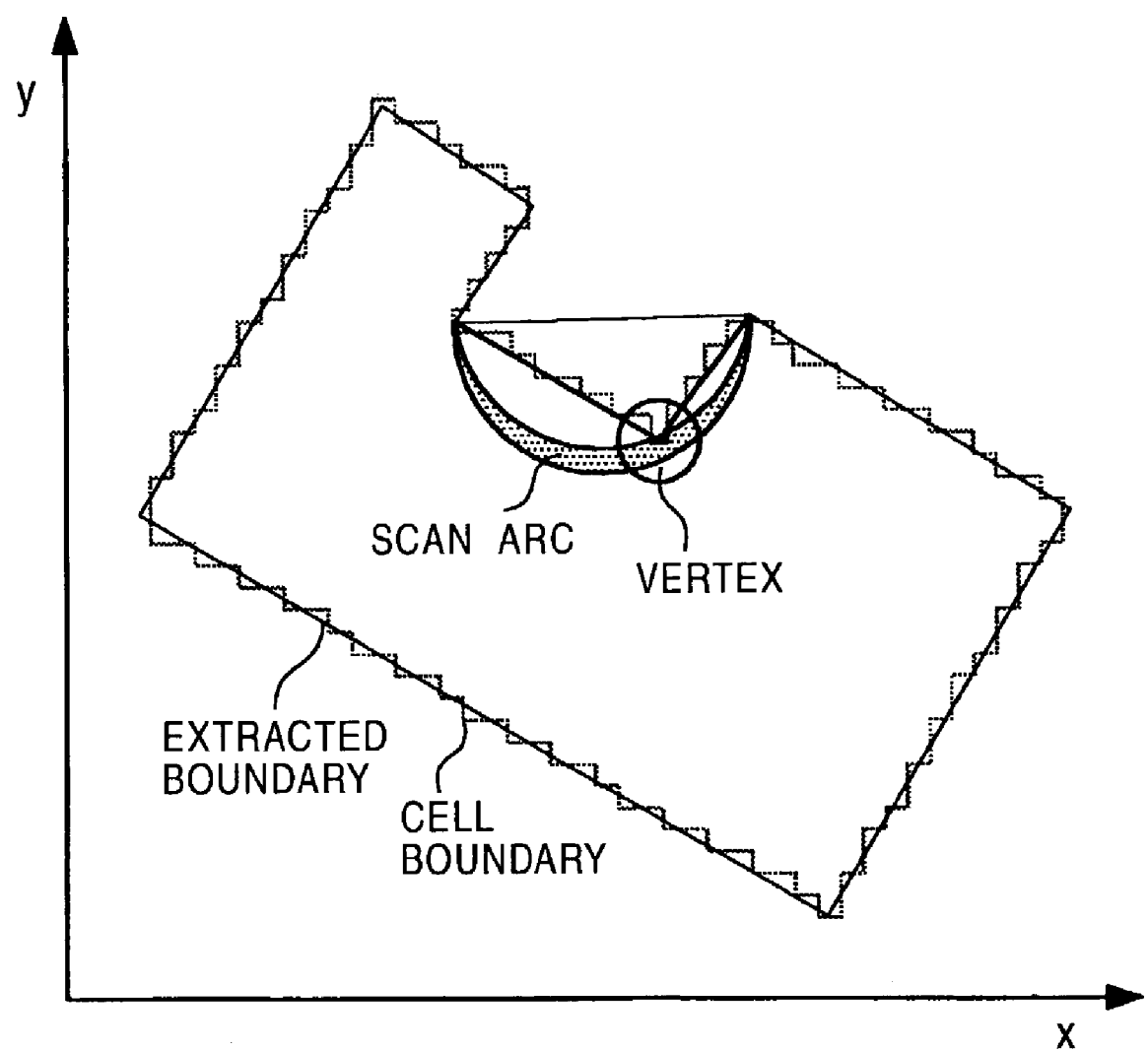
FIG. 50 is an illustration of the process shown in FIG. 47.

Subsequently, three of the four ridges obtained by the process shown in FIG. 49 are successfully fitted to straight lines, whereas the remaining ridge cannot be fitted to a straight line. Accordingly, as shown in FIG. 50, the remaining ridge that cannot be fitted to a straight line is again searched for a bend, and the ridge is divided into two ridges.

Subsequently, the ridges obtained by the process shown in FIG. 40 are successfully fitted to straight lines. Accordingly, the process of fitting all ridges to straight lines is completed.

Figure 51:
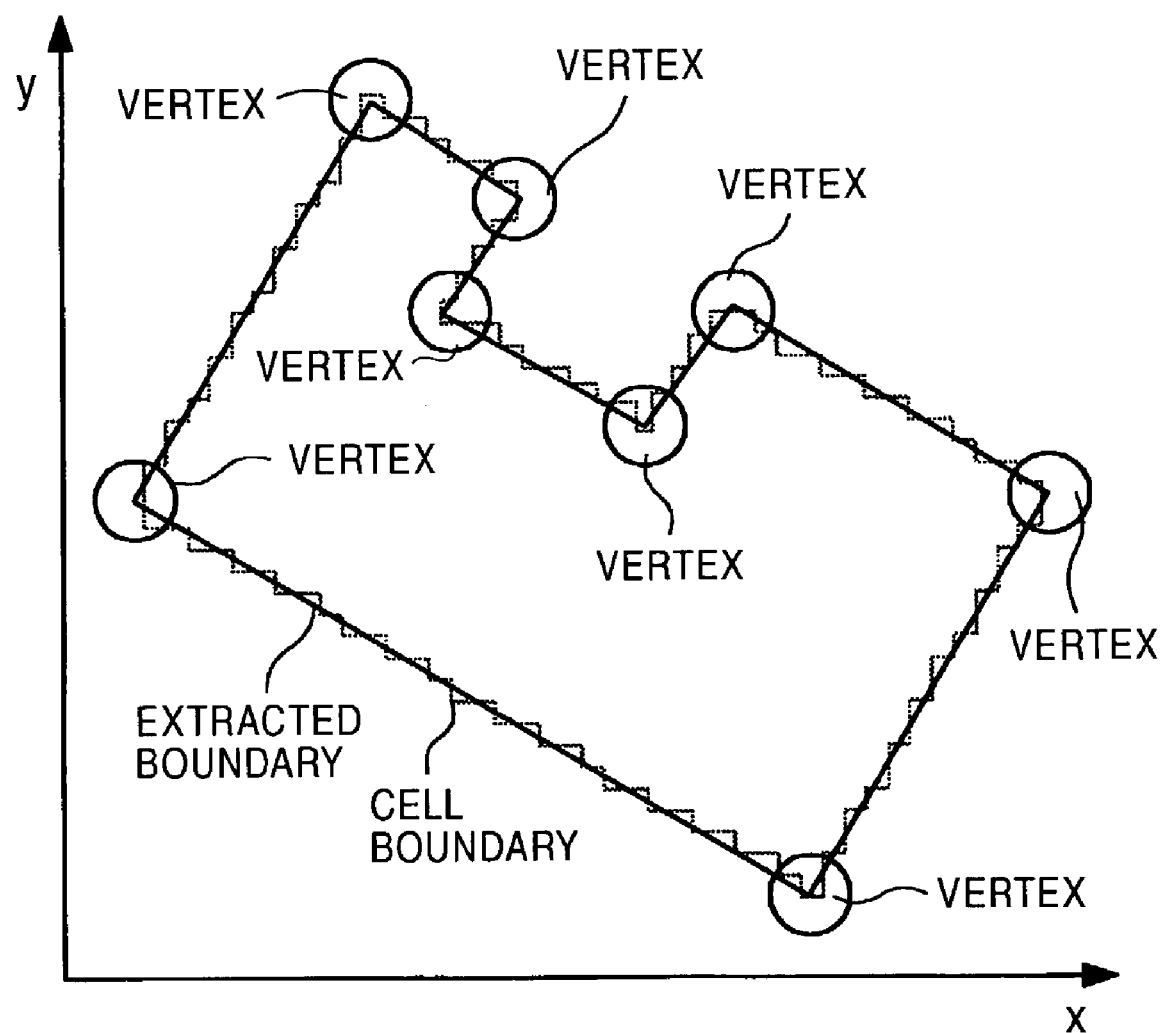
FIG. 51 is an illustration of the process shown in FIG. 47.

As discussed above, repetition of the fitting of ridges to straight lines, bend detection, and ridge division consequently results in, as shown in FIG. 51, extraction of a plane defined by a boundary line that has eight bends and that is fitted to straight lines.

F. Creation of Three-dimensional Plane

In the previous section E, when the observation area is viewed from above, the area is divided so that a set of observation points constructs as large a single plane as possible. Each plane has an altitude state. When two planes adjacent to each other across the obtained boundary line are different in altitude at the boundary line portion, a three-dimensional plane creating process of inserting a vertical face at this portion is performed.

Figure 52:
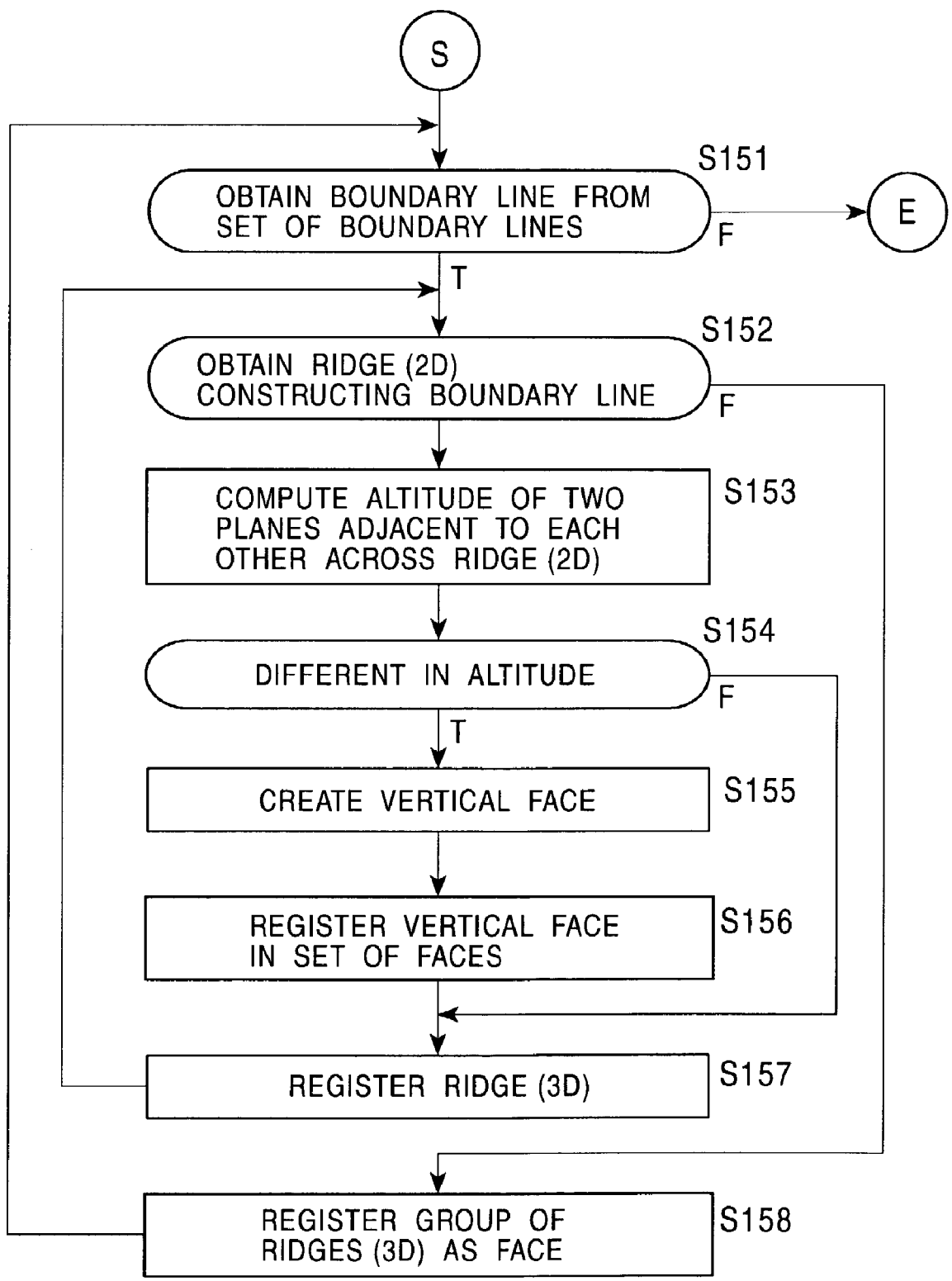
FIG. 52 is a flowchart showing a process of creating a three-dimensional plane.

FIG. 52 is a flowchart showing a process of creating a three-dimensional plane.

When a plane has boundary lines corresponding to a plurality of "islands", as shown in FIG. 39, all of the islands are regarded as a set of boundary lines, and the individual islands are represented as boundary lines. A plane is created for each of the islands (step S151).

The process obtains a ridge (2D) constructing a boundary line (step S152), obtains the altitude of two planes adjacent to each other across the boundary line (step S153), and creates a corresponding three-dimensional ridge (step S154).

When the two planes adjacent to each other across the boundary line are different in altitude, a vertical face is created at the boundary line portion (step S155), and the vertical face is registered in a set of faces (step S156).

A ridge (3D) having altitude information is registered (step S157). The process then returns to step S152 and processes the next ridge included in the boundary line.

When all ridges included in the boundary line are processed (step S152), a group of ridges (3D) is registered as a face (step S158). The process then returns to step S151 and processes the next boundary line.

When all the boundary lines included in the set of boundary lines are processed (step S151), the entire process routine is completed.

Figure 53:
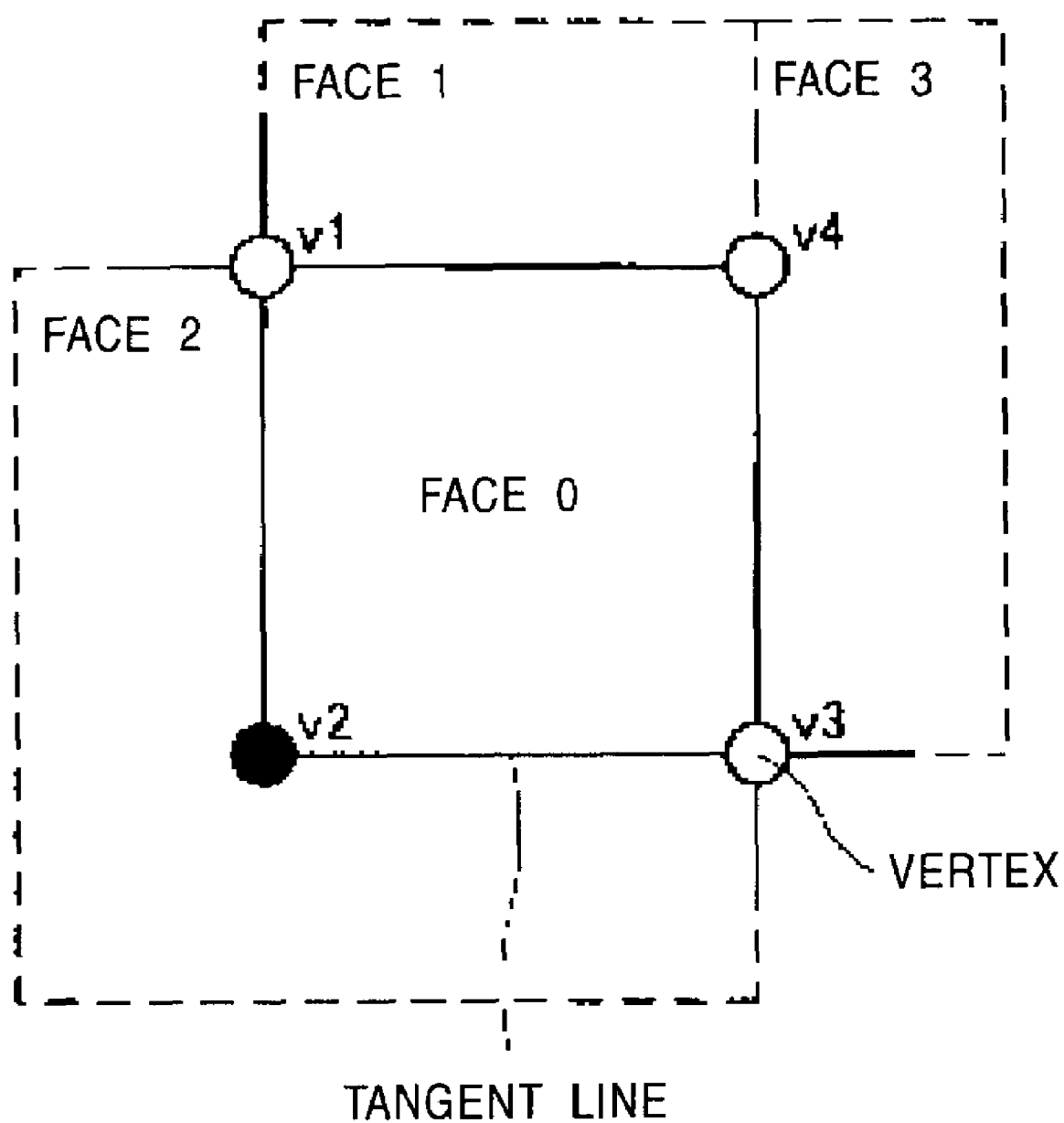
FIG. 53 is an illustration of the state of connection between a boundary line (2D) and faces.

FIG. 53 shows an example of the state of connection between a boundary line (2D) and faces. In the example shown in FIG. 53, face 0 is adjacent to face 1, face 2, and face 3. Face 1 is bordered by a ridge connecting v4–v1. Face 2 is bordered by a ridge connecting v1–v2–v3. Face 3 is bordered by a ridge connecting v3–v4.

Figure 54:
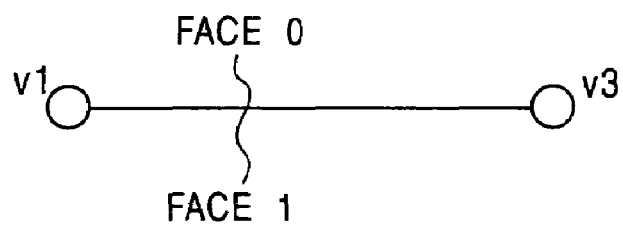
FIGS. 54A and 54B are an elevation view and a side view, respectively, of a case in which two planes adjacent to each other across ridges are connected to each other.
Figure 54:
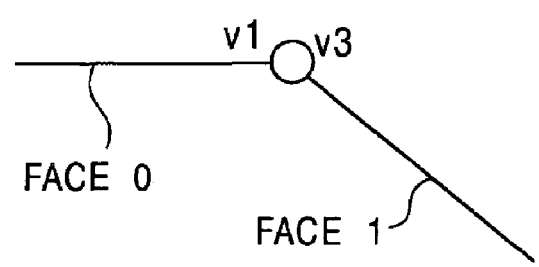

FIGS. 54A and 54B are an elevation view and a side view, respectively, of a case in which there is no altitude difference at the boundary line portion, that is, two planes adjacent to each other across ridges are connected (or share one ridge). In this case, no vertical face is inserted at a portion between vertices v1 and v3, and a three-dimensional ridge shared by the two planes is created.

Figure 55A:
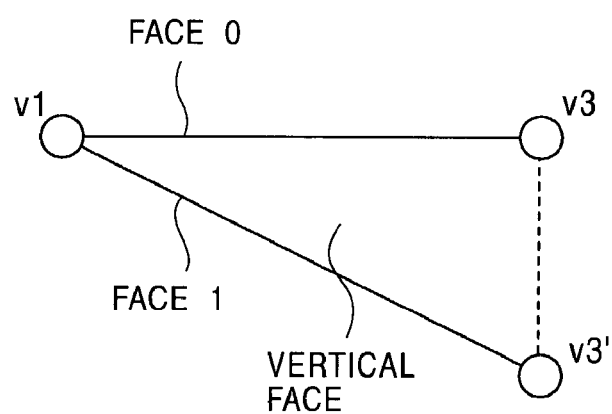
FIGS. 55A and 55B are an elevation view and a side view, respectively, of a case in which two planes adjacent to each other across ridges share only one vertex of the ridges.
Figure 55B:
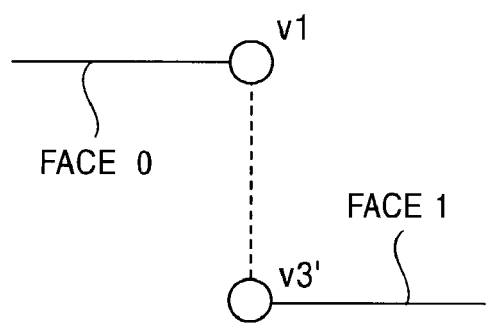

FIGS. 55A and 55B are an elevation view and a side view, respectively, of a case in which two planes adjacent to each other across ridges share only one vertex v1 of each ridge. In this case, a three-dimensional vertex corresponding to vertex v1 is shared. A vertical face to be pasted is created on the basis of two vertices v3 and v3' differing in altitude, and the vertical face is registered in the set of faces. The three-dimensional vertices v1 and v3 are used to define a ridge of face 0, and the three-dimensional vertices v1 and v3' are used to define a ridge of face 1.

Figure 56A:
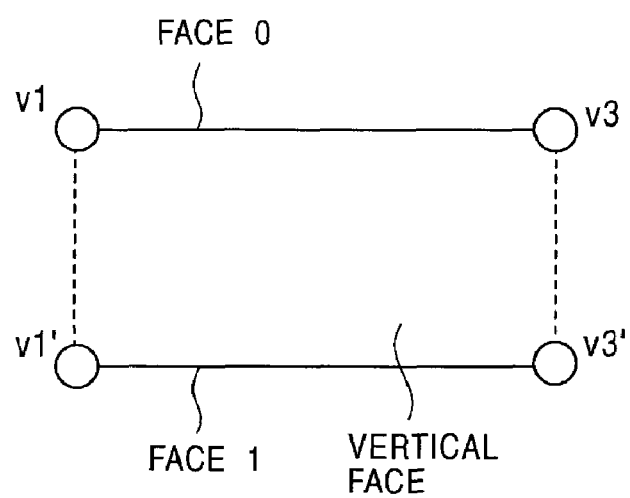
FIGS. 56A and 56B are an elevation view and a side view, respectively, of a case in which two planes adjacent to each other across ridges share no vertex.
Figure 56B:
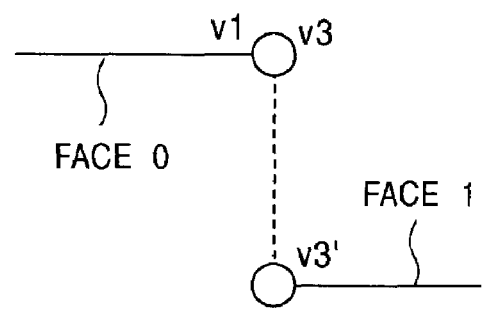

FIGS. 56A and 56B are an elevation view and a side view, respectively, of a case in which two planes adjacent to each other across ridges share no vertex. In this case, a vertical face defined by v1–v1'–v3–v3' is created, and the vertical face is registered in the set of faces. The three-dimensional vertices v1 and v3 are used to define a ridge of face 0, and the three-dimensional vertices v1' and v3' are used to define a ridge of face 1.

A case in which a ridge (2D) to be processed has at least one bend will now be described.

When a ridge has at least one bend, the connection state shown in FIGS. 54A and 54B is impossible. When two adjacent planes are in contact with each other in this state, they are always integrated into one plane.

Figure 57A:
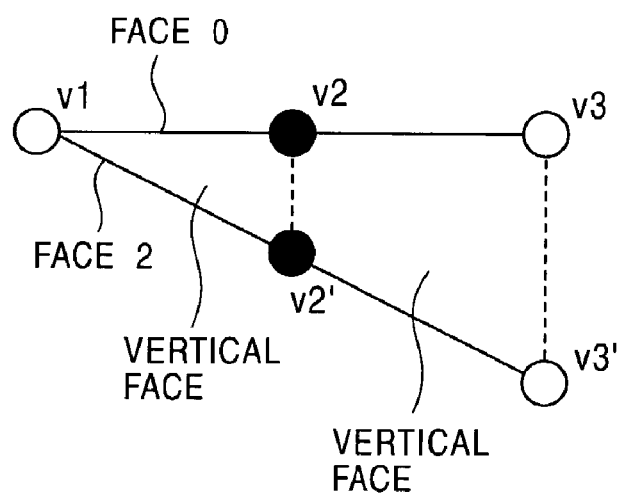
FIGS. 57A and 57B are an elevation view and a side view, respectively, of a case in which two planes adjacent to each other across ridges, each having at least one bend, share one vertex.
Figure 57B:
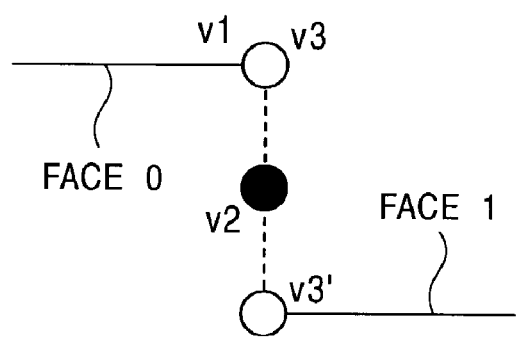

FIGS. 57A and 57B are an elevation view and a side view, respectively, of a case in which two planes adjacent to each other across ridges, each ridge having at least one bend, share one vertex. In this case, the three-dimensional vertex v1 is shared, and a vertical face defined by v1–v2'–v2 and a vertical face defined by v2–v2'–v3'–v3 are created and registered in the set of faces. The three-dimensional vertices v1, v2, and v3 are used to define a ridge of face 0, and the three-dimensional vertices v1, v2', and v3' are used to define a ridge of face 2.

Figure 58A:
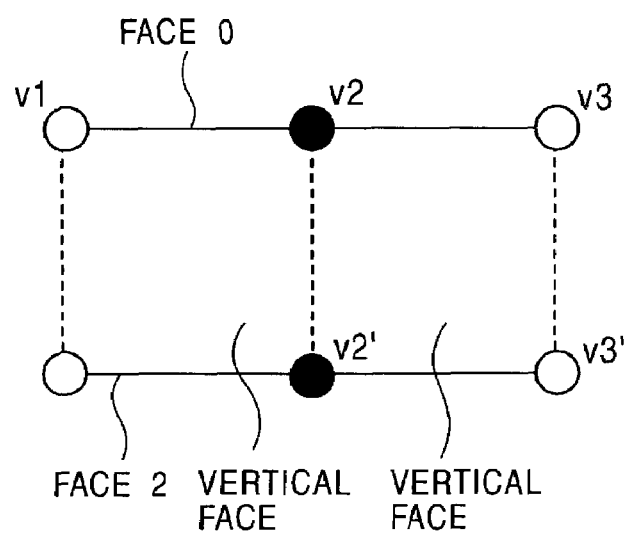
FIGS. 58A and 58B are an elevation view and a side view, respectively, of a case in which two planes adjacent to each other across ridges, each having at least one bend, share no vertex.
Figure 58B:
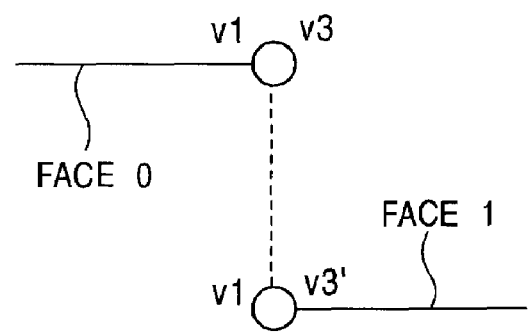

FIGS. 58A and 58B are an elevation view and a side view, respectively, of a case in which two planes adjacent to each other across ridges, each ridge having at least one bend, share no vertex. In this case, a vertical face defined by v1–v1'–v2'–v2 and a vertical face defined by v2–v2'–v3'–v3 are created and registered in the set of faces. The three-dimensional vertices v1, v2, and v3 are used to define a ridge of face 0, and the three-dimensional vertices v1', v2', and v3' are used to define a ridge of face 2.

The three-dimensional model can be generated by various methods other than that described in the above-described embodiment. For example, JP Application No. 2002-089967 (filed on Mar. 27, 2002) discloses three-dimensional modeling of a building portion using information on ground areas, information on other areas that can be distinguished from the ground, and elevation data; and JP Application No. 2002-089966 (filed on Mar. 27, 2002) discloses three-dimensional modeling of a terrain portion using information on ground areas, information on other areas that can be distinguished from the ground, and elevation data. Both of the JP applications are applicable to three-dimensional modeling of the embodiment. Under the law, the entire contents of the JP applications are incorporated herein by reference.

While the present invention has been described with reference to the specific embodiments, it is to be understood that modifications and substitutions can be made by those skilled in the art without departing from the scope of the present invention. In other words, the present invention has been described using the embodiments only for illustration purposes and should not be interpreted in a limited manner. The scope of the present invention is to be determined solely by the appended claims.

What is claimed is:

1. An information presentation apparatus in a three-dimensional virtual space, comprising:
    object selecting means for specifying an object to be displayed at a location in a three-dimensional map image, the location being found on a basis of an information search result in accordance with a search condition input by a user;
    animation creating means for creating a deformed animation of the object shape; and
    animation playing means for playing the deformed animation of the object shape in the three-dimensional virtual space,
    wherein the object selecting means is further configured to obtain the location of the object satisfying the search condition, and the animation playing means is further configured to play the deformed animation at the location.

2. An information presentation method in a three-dimensional virtual space, comprising:
    selecting an object by specifying an object to be displayed at a location in a three-dimensional map image, the location being found on a basis of an information search result in accordance with a search condition input by a user;
    creating an animation by deforming the object shape; and
    playing an animation by showing the deforming object shape in the three-dimensional virtual space,
    wherein the selecting further includes obtaining the location of the object satisfying the search condition, and the playing further includes showing the animation at the location.

3. An information presentation method according to claim 2, wherein the creating step, further includes creating a control solid defined by multiple control points that are arranged in a lattice around the object shape, and creating the animation by mapping a deformation of the control solid onto a deformation of the object shape.

4. An information presentation method according to claim 2, wherein the creating step includes at least one of:
    an animation of the object appearing from a ground upward in the three-dimensional virtual space,
    an animation of the object vertically expanding and contracting,
    an animation of the object swaying from side to side, and/or
    an animation of the object disappearing into the ground in the three-dimensional virtual space.

5. An information presentation method according to claim 2, wherein the object has a shape of a building, and
    in the playing step, the animation is shown at a corresponding place in the three-dimensional virtual space on a basis of map data.

6. An information presentation method according to claim 2, wherein the creating step, further includes creating a plurality of patterns of animations of the object shape, and
    the playing further includes switching from one animation being played to another animation, in accordance with a result of the selecting step.

7. An information presentation method according to claim 2,
    wherein, in the selecting step, an information presentation intensity showing a goodness of fit with respect to the search condition is added to the search result, in the creating step, a plurality of patterns of deformed animations of the object shape is created, and in the playing step, an emphasized animation pattern is selected according to the level of the information presentation intensity.

8. An information presentation method according to claim 2, wherein the object represents a target geographic location, and the three dimensional virtual space represents buildings and houses.

9. An information presentation method according to claim 2, wherein the search condition is at least one of a geographic location or a name of a location.

10. A computer program written in a computer-readable format to perform on a computer system a process for presenting information in a three-dimensional virtual space, comprising:
    selecting an object by specifying an object to be displayed at a location in a three-dimensional map image, the location being found on basis of an information search result in accordance with a search condition input by a user;

creating an animation by deforming the object shape; and playing an animation by showing the animation of the object shape in the three-dimensional virtual space, wherein the selecting step further includes obtaining the location of the object satisfying the search condition, and the playing step further includes showing the animation at the location.

* * * * *